United States Patent [19]
Cummiskey et al.

[11] Patent Number: 5,418,778
[45] Date of Patent: May 23, 1995

[54] LOCAL AND REMOTE ECHO CANCELING APPARATUS PARTICULARLY ADAPTED FOR USE IN A FULL DUPLEX MODEM

[75] Inventors: Peter Cummiskey, Clark, N.J.; Marvin A. Epstein, Monsey, N.Y.; Bryan S. Majkrzak, Clifton; Richard Kim, Bloomfield, both of N.J.

[73] Assignee: ITT Corporation, New York, N.Y.

[21] Appl. No.: 98,639

[22] Filed: Jul. 28, 1993

Related U.S. Application Data

[63] Continuation of Ser. No. 836,131, Feb. 14, 1992, abandoned.

[51] Int. Cl.[6] .................................... H04B 3/23
[52] U.S. Cl. ................................ 370/32.1; 379/406; 379/411
[58] Field of Search ................. 370/32, 32.1; 379/406, 379/410, 411

[56] References Cited

U.S. PATENT DOCUMENTS

| | | | |
|---|---|---|---|
| 4,947,425 | 8/1990 | Grizmala et al. | 370/32.1 |
| 5,007,044 | 4/1991 | Miyoshi et al. | 370/32.1 |
| 5,084,865 | 1/1992 | Koike | 370/32.1 |

*Primary Examiner*—Wellington Chin
*Attorney, Agent, or Firm*—Arthur L. Plevy; Patrick M. Hogan

[57] ABSTRACT

An echo cancellation apparatus is included in a variable rate modem. The echo cancellation apparatus includes a local echo canceler, a remote echo canceler and a quadrature echo canceler unit. The local and remote echo cancelers both operate to cancel echoes in a similar manner employing topped delay lines or transversal filters wherein the taps of each delay line are adjusted to accommodate both local and remote echo cancellation. The local echo canceler and the remote echo canceler share many programs in common. However, the remote echo canceler operates with a phase lock loop which essentially derives a signal obtained from the quadrature and local echo cancelers which signal is further correlated with the output residuals from the local echo canceler to develop samples applied to the remote echo canceler and to derive a frequency which is indicative of a offset carrier frequency to enable the remote echo canceler to cancel remote echoes. Remote echoes are due to frequency shifts occurring remote from the modem, such as those caused by changes in satellite positions or changes in frequency sources. The remote echo canceler operates to cancel echoes which are greater than 15 milliseconds in delay, as compared to local echoes, which are canceled by the local echo canceler responding to echoes which are delayed 15 milliseconds or less.

41 Claims, 52 Drawing Sheets

```
0048  CODE    EQU  TAP1 + MTAPS     ON-CHIP PROGRAM
      *
      * ======================================
      * B1DM LOCATIONS
      * ======================================
      *
0000  ECMODE  EQU  0                ECHO CANCELLER MODE
0001  PLLSW   EQU  ECMODE +1        PLL SWITCH
      *
0002  P9FR    EQU  PLLSW +1         PARAMETER TBL
0002  NVECS   EQU  PBFR  +0         # OF VECTORS-1
0003  NTAPG   EQU  PBFR  +1         # OF TAPS PER PHASE GROUP-1
0004  NPHAS   EQU  PBFR  +2         #OF PHASE-1
0005  NSMPG   EQU  PBFR  +3         # OF SAMPLES PER PHASE GROUP-1
0006  IVCOFF  EQU  PBFR  +4         IMAG VECTOR COMPONENT OFFSET
0007  VECPTR  EQU  PBFR  +5         VECTOR BFR OTR ADDR
0008  TAPPTR  EQU  PBFR  +6         TAP BFR PTR
0009  SMRPTR  EQU  PBFR  +7         SAMPLE BFR READ PTR ADDR
000A  SMWPTR  EQU  PBFR  +8         SAMPLE BFR WRITE PTR ADDR
0009  PSIZ    EQU  9                PARAMETER TBL SIZE
      *
000B  PTBLP   EQU  PBFR + PSIZ      PARAMETER TBL PTR.
000C  VECRBP  EQU  PTBLP +1         OFF-CHIP REAL VECTOR BFR PTR
000D  VECIBP  EQU  VECRBP +1        OFF-CHIP IMAG VECTOR BFR PTR
000E  VECRP   EQU  VECIBP +1        ON-CHIP REAL VECTOR BFR PTR
000F  VECIP   EQU  VACRP +1         ON-CHIP IMAG VECTOR BFR PTR
0010  SMPRP   EQU  VECIP +1         OFF-CHIP SAMPLE BFR READ PTR
0011  SMPWP   EQU  SMPRP +1         OFF-CHIP SAMPLE BFR WRITE PTR
0012  PGINCR  EQU  SMPWP +1         PHASE GROUP SAMPLE INCREMENT
0013  IREEST  EQU  PGINCR +1        IMAGINARY REMOTE ECHO ESTAMATE
0014  METRCH  EQU  IREEST +1        PLL METRIC MSW
0015  METRCL  EQU  METRCH +1        PLL METRIC LSW
0016  TWOEXP  EQU  METRCL +1        PLL METRIC INTEGRATION EXPONENT
0017  ALPHA   EQU  TWOEEXP +1       PLL ALPHA
0018  BETA    EQU  ALPHA +1         PLL BETA
      *
0019  VECR    EQU  BETA +1          REAL VECTOR COMPONENTS
0049  VECI    EQU  VECR + MVECS     IMAG VECTOR COMPONENTS
0079  B1SIZE  EQU  VECI + MVECS     BLOCK B1 USAGE
      *
      **************************************************
```

FIG. 4C

| PARAMETER | INITIALIZATION PROCEDURE |
|---|---|
| LECTSI | LOCAL ECHO CANCELLER TRAIN |
| VECSVI | REMOTE SEARCH VECTOR SAVE |
| SMPSVI | REMOTE SEARCH SAMPLE SAVE |
| SSLCST | LOCAL ECHO CANCELLATION ON SAVED SAMPLES |
| SSLCBI | ADJUST LOCAL CANCELLER SAMPLE POINT |
| RESCSI | COARSE SEARCH |
| RESFSI | FINE SEARCH |
| RESFBI | FINE SEARCH BLOCK ADJUSTMENT |
| RECTSI | REMOTE CANCELLER TRAIN |
| RECTBI | REMOTE CANCELLER TRAIN BLOCK ADJUSTMENT |
| RUN241 | 2400 BPS TRAFFIC |

FIG. 12D

| | |
|---|---|
| RSMPBF | $S_\tau$ |
| RSMPBF + 1 | $S_\tau$ + 1 |
| ⋮ | ⋮ |
| RSMPBF + 719 | $S_\tau$ + 719 |
| RSMPBF + 720 | $S_\tau$ + 1080 |
| ⋮ | ⋮ |
| RSMPBF + 1079 | $S_\tau$ + 1439 |
| RSMPBF + 1080 | $S_\tau$ + 2160 |
| ⋮ | ⋮ |
| RSMPBF + 1439 | $S_\tau$ + 2519 |
| RSMPBF + 1440 | $S_\tau$ + 3600 |
| ⋮ | ⋮ |
| RSMPBF + 1799 | $S_\tau$ + 3950 |

REMOTE ECHO SEARCH
SAMPLE STORE

FIG. 15

| | |
|---|---|
| RVECBF | X ' 0 |
| RVECBF + <br> • <br> • <br> • <br> RVECBF + | X ' 1 <br><br><br><br> X ' 179 |
| RVECBF + <br> • <br> • <br> • | = <br> = <br> = |
| RVECBF + <br> RVECBF + <br> • <br> • <br> • <br> RVECBF + | Y ' 0 <br> Y ' 1 <br><br><br><br> Y ' 179 |
| RVECBF + <br> • <br> • <br> • <br> RVECBF + | = <br> = <br> = |

COARSE SEARCH VECTORS

FIG. 16

SMPPTR = RSMPBF + SOFF
RVEBP1 = RVECBF + VOFF
RVEBP2 = RVECBF + 480 + VOFF
RESBP1 = RESBF1 + COFF
RESBP2 = RESBF2 + COFF

WHERE

| CORCTR | SOFF | VOFF | COFF |
|--------|------|------|------|
| 0 | 6 | 0 | 1 |
| 1 | 3 | 0 | 2 |
| 2 | 186 | 30 | 359 |
| 3 | 183 | 30 | 362 |
| 4 | 366 | 60 | 719 |
| 5 | 363 | 60 | 722 |
| 6 | 546 | 90 | 1079 |
| 7 | 543 | 90 | 1083 |

NVLFR = 60
NSLFR = 3
NSMPS = 30

ECSCOR PARAMETERS
FOR THE COARSE SEARCH

FIG. 18

| | | | |
|---|---|---|---|
| RESBF1 + 0 ↓ RESBF1 + 359 | RCOR(0, τ + 5) ↓ RCOR(0, τ + -354) | | 0,1 |
| RESBF1 + 360 ↓ RESBF1 + 719 | RCOR(180, τ + 5) ↓ RCOR(180, τ - 354) | | 2,3 |
| RESBF1 + 720 ↓ RESBF1 + 1079 | RCOR(360, τ + 5) ↓ RCOR(360, τ - 354) | | 4,5 |
| RESBF1 + 1080 ↓ RESBF1 + 1439 | RCOR(540, τ + 5) ↓ RCOR(540, τ - 354) | | 6,7 |
| RESBF2 + 0 ↓ RESBF2 + 359 | ICOR(0, τ + 5) ↓ ICOR(0, τ + 354) | | 0,1 |
| RESBF2 + 360 ↓ RESBF2 + 719 | ICOR(180, τ + 5) ↓ ICOR(180, τ - 354) | | 2,3 |
| RESBF2 + 720 ↓ RESBF2 + 1079 | ICOR(360, τ + 5) ↓ ICOR(360, τ - 354) | | 4,5 |
| RESBF2 + 1080 ↓ RESBF2 + 1439 | ICOR(540, τ + 5) ↓ ICOR(540, τ - 354) | | 6,7 |

TIME POSITION   CORRELATION LAG.

COARSE SEARCH CORRELATIONS

FIG. 19

```
20 MACRO ASSEMBLER 1.1 86.040   11:10:06   5/1/90
    MAG SQUARE AND SPIN DSP1                PAGE 0011
************************************************************
    ECSMAG TABLES
************************************************************

===============================================
    COARSE SEARCH PARAMETER TABLE
===============================================
PTBL EQU    $
     DATA   4-1       NBLKS  - # OF BLOCKS -1
     DATA   360       NSMBL  - # OF SAMPLES CORRS PER BLOCK
     DATA   90-1      NSSMFR - # OF SAMPLES CORRS PER FRAME -1
     DATA   2-1       NFRQS  - (# OF FREA) /2 - 1
     DATA   16-1      TRIGS  - TRIG TBL SIZE - 1
===============================================

===============================================
OTBL EQU    $
     DATA   0000-1              FRM 0
     DATA   0090-1              FRM 1
     DATA   0180-1              FRM 2
     DATA   0270-1              FRM 3
===============================================

===============================================
TRIG EQU    $
     DATA   >0000,>2D41,>4000,>2D41      SIN  5.00 Hz
     DATA   >4000,>2D41,>0000,>D2BF      COS  5.00 Hz
     DATA   >0000,>1090,>2000,>2D41      SIN  1.67 Hz
     DATA   >4000,>3DD2,>376D,>2D41      COS  1.67 Hz
```

COARSE SEARCH MAGNITUDE SQUARES
PARAMETERS TABLES

FIG. 21

| ADDRESS | | CONTENTS |
|---|---|---|
| RESBF1 + | 0 | MAGSQH ( 5.00 HZ , $\tau$ +5 ) |
| ↓ | | ↓ |
| RESBF1 + | 359 | MAGSQH (5.00 1-Z , $\tau$ −354) |
| RESBF1 + | 360 | MAGSQH ( 5.00 1-Z , $\tau$ +5 ) |
| ↓ | | ↓ |
| RESBF1 + | 719 | MAGSQH (5.00 HZ , $\tau$ −354 |
| RESBF1 + | 720 | MAGSQH ( 1.67 HZ , $\tau$ +5 ) |
| ↓ | | ↓ |
| RESBF1 + | 1079 | MAGSQH (1.67 HZ , $\tau$ −354 |
| RESBF1 + | 1080 | MAGSQH ( -1.67 HZ , $\tau$ +5 ) |
| ↓ | | ↓ |
| RESBF1 + | 1439 | MAGSQH (-1.67 HZ, −354 |
| ⋮ | | ⋮ |
| RESBF2 + | 0 | MAGSQL( 5.00 HZ , $\tau$ +5 ) |
| ↓ | | ↓ |
| RESBF2 + | 359 | MAGSQL( 5.00 HZ , $\tau$ −354) |
| RESBF2 + | 360 | MAGSQL(-5.00 HZ , $\tau$ +5 ) |
| ↓ | | ↓ |
| RESBF2 + | 719 | MAGSQL( - 5.00 HZ , $\tau$ −354) |
| RESBF2 + | 720 | MAGSQL( 1.67 HZ , $\tau$ +5 ) |
| ↓ | | ↓ |
| RESBF2 + | 1079 | MAGSQL( 1.67 HZ , $\tau$ −354) |
| RESBF2 + | 1080 | MAGSQL(-1.67 HZ , $\tau$ +5 ) |
| ↓ | | ↓ |
| RESBF2 + | 1439 | MAGSQL( - 1.67 HZ , $\tau$ −354) |

COARSE SEARCH MAGNITUDE SQUARES

FIG. 22

ECSMAX

| NFQFR | 2 |
|-------|---|
| NSMSM | 36 |
| NSMFQ | 325 |

| MAXCTR | ROFF | JFQ |
|--------|------|-----|
| 0      | 0    | 0   |
| 1      | 720  | 2   |

–COARSE SEARCH
PARAMETERS FOR ECSMAX

FIG. 24

| FRAME | 0 – 2 | 3 – 5 | 6 – 8 | 9 – 11 | 12 – 14 |
|---|---|---|---|---|---|
| RVECBF → RVECBF + 1 | X 0' → X 1' | X 60' → X 61' | X 180' → X 181' | X 360' → X 361' | X 600' → X 601' |
| RVECBF + 95 | X 95' | X 155' | X 275' | X 455' | X 695' |
| RVECBF + 90 → RVECBF + 215 | → | → | → | → | → |
| RVECBF + 216 → RVECBF + 217 | Y 0' → Y 1' | Y 60' → Y 61' | Y 180' → Y 181' | Y 360' → Y 361' | Y 600' → Y 601' |
| RVECBF + 311 | Y 95' | Y 155' | Y 275' | Y 455' | Y 695' |
| RVECBF + 312 → RVECBF + 331 | → | → | → | → | → |

VECTOR BUFFER FOR FINE SEARCH

FIG. 25

SMPPTR = RSMPBF + SOFF
RVEBP1 = RVECBF + VOFF
RVEBP2 = RVECBF + 480 + VOFF
RESBP1 = RESBP1 + COFF
RESBP2 = RESBP2 + COFF

WHERE

| CORCTR | SOFF | VOFF | COFF |
|--------|------|------|------|
| 0      | 6    | 0    | −1   |
| 1      | 4    | 0    | 1    |
| 2      | 2    | 0    | 3    |
| 3      | 366  | 96   | 215  |
| 4      | 364  | 96   | 217  |
| 5      | 362  | 96   | 219  |
| 6      | 726  | 192  | 431  |
| 7      | 724  | 192  | 433  |
| 8      | 722  | 192  | 435  |
| 9      | 1086 | 288  | 647  |
| 10     | 1084 | 288  | 649  |
| 11     | 1082 | 288  | 651  |
| 12     | 1446 | 384  | 863  |
| 13     | 1444 | 384  | 865  |
| 14     | 1442 | 384  | 867  |

NVLFR = 36
NSLFR = 2
NSMPS = 60

ECSOR PARAETERS
FOR THE FINE SEARCH

FIG. 26

| ADDRESS | CORRELATION COMPONENT | | | PRCESSING FRAMES |
|---|---|---|---|---|
| RESBF1 + 0 ↓ RESBF1 + 215 | RCOR ( ↓ RCOR ( | 0 , 0 , | $\tau$ +5 ) $\tau$ -210 ) | 0,1,2 |
| RESBF1 + 216 ↓ RESBF1 + 431 | RCOR ( ↓ RCOR ( | 360 , 360 , | $\tau$ +5 ) $\tau$ -210 ) | 3,4,5 |
| RESBF1 + 432 ↓ RESBF1 + 647 | RCOR ( ↓ RCOR ( | 1080 , 1080 , | $\tau$ +5 ) $\tau$ -210 ) | 6,7,8 |
| RESBF1 + 648 ↓ RESBF1 + 863 | RCOR ( ↓ RCOR ( | 2160 , 2160 , | $\tau$ +5 ) $\tau$ -210 ) | 9,10,11 |
| RESBF1 + 864 ↓ RESBF1 +1079 | RCOR ( ↓ RCOR ( | 3600 , 3600 , | $\tau$ +5 ) $\tau$ -210 ) | 12,13,14 |

| ADDRESS | CORRELATION COMPONENT | TIME BLOCK POSITION | CORRELATION LAG | PRCESSING FRAMES |
|---|---|---|---|---|
| RESBF1 + 0 ↓ RESBF1 + 215 | ICOR ( ↓ ICOR ( | 0 , 0 , | $\tau$ +5) $\tau$ -210) | 0,1,2 |
| RESBF1 + 216 ↓ RESBF1 + 431 | ICOR ( ↓ ICOR ( | 360 , 360 , | $\tau$ +5) $\tau$ -210) | 3,4,5 |
| RESBF1 + 432 ↓ RESBF1 + 647 | ICOR ( ↓ ICOR ( | 1080 , 1080 , | $\tau$ +5) $\tau$ -210) | 6,7,8 |
| RESBF1 + 648 ↓ RESBF1 + 863 | ICOR ( ↓ ICOR ( | 2160 , 2160 , | $\tau$ +5) $\tau$ -210) | 9,10,11 |
| RESBF1 + 648 ↓ RESBF1 + 863 | ICOR ( ↓ ICOR ( | 3600 , 3600 , | $\tau$ +5) $\tau$ -210) | 12,13,14 |

FINE SEARCH CORRELATIONS  TIME  CORRELATION LAG

FIG. 27

```
*==================================
* FINE SEARCH PARAMETER TABLE
*==================================
FPTBL   EQU     $
        DATA    5-1         NBLKS   - # OF BLOCKS -1
        DATA    216         NSHBL   - # OF SAMPLE CORRS PER BLOCK
        DATA    36-1        NSHFR   - # OF SAMPLES CORRS PER FRAME -1
        DATA    5-1         NFRQS   - (# OF FREA)/2-1
        DATA    50-1        TRIGSZ  - TRIG TBL SIZE -1
*==================================
* FINE SEARCH PARAMETER TABLE
*==================================
FCIBL   EQU     $
        DATA    0000-1      FRM 0
        DATA    0036-1      FRM 1
        DATA    0072-1      FRM 2
        DATA    0103-1      FRM 3
        DATA    0144-1      FRM 4
        DATA    0180-1      FRM 5
```

FINE SEARCH MAGNITUDE
SQUARES PARAMETERS TABLES

FIG. 28A

```
===================================================
  FINE SEARCH TRIG TBL
===================================================
TRIG    EQU     $
                BLK0    BLK1    BLK2    BLK3    BLK4

DATA    >0000,>3002,>23F9,>C47F,>33C7       SIN 2.70 $H_Z$

DATA    >4000,>2A53,>CB11,>178F,>DA62       COS 2.70 $H_Z$

DATA    >0000,>273A,>3ABC,>D159,>13C7       SIN 2.10 $H_Z$

DATA    >4000,>3292,>E695,>D430,>3CDE       COS 2.10 $H_Z$

DATA    >0000,>1D0E,>3F36,>13C7,>0000       SIN 1.50 $H_Z$

DATA    >4000,>3906,>0A03,>C322,>0000       COS 1.50 $H_Z$

DATA    >0000,>11DB,>3002,>3F7F,>13C7       SIN 0.90 $H_Z$

DATA    >40000,>3D75,>2A53,>F7FB,>C322      COS 0.90 $H_Z$

DATA    >0000,>060,>11DB,>224B,>33C7        SIN 0.30 $H_Z$

DATA    >4000,>3FBF,>3D75,>3609,>259E       COS 0.30 $H_Z$
```

FINE SEARCH MAGNITUDE
SQUARES TABLES

FIG. 28B

| ADDRESS | | CONTENTS |
|---|---|---|
| RESBF1 + <br> ↓ <br> RESBF1 + | 0 <br><br> 215 | MAGSQH ( 2.7 HZ , $\tau'+5$ ) <br> ↓ <br> MAGSQH ( 2.7 HZ , $\tau'-210$ ) |
| RESBF1 + <br> ↓ <br> RESBF1 + | 216 <br><br> 431 | MAGSQH (-2.7 HZ , $\tau'+5$ ) <br> ↓ <br> MAGSQH (-2.7 HZ , $\tau'-210$ ) |
| RESBF1 + <br> ↓ <br> RESBF1 + | 432 <br><br> 647 | MAGSQH ( 2.1 HZ , $\tau'+5$ ) <br> ↓ <br> MAGSQH ( 2.1 HZ , $\tau'-210$ ) |
| RESBF1 + <br> ↓ <br> RESBF1 + | 648 <br><br> 836 | MAGSQH (-2.1 HZ , $\tau'+5$ ) <br> ↓ <br> MAGSQH (-2.1 HZ , $\tau'-210$ ) |
| RESBF2 + <br> ↓ <br> RESBF2 + | 864 <br><br> 1079 | MAGSQH ( 1.5 HZ , $\tau'+5$ ) <br> ↓ <br> MAGSQH ( 1.5 HZ , $\tau'-210$ ) |
| RESBF2 + <br> ↓ <br> RESBF2 + | 1080 <br><br> 1295 | MAGSQH (-1.5 HZ , $\tau'+5$ ) <br> ↓ <br> MAGSQH (-1.5 HZ , $\tau'-210$ ) |
| RESBF2 + <br> ↓ <br> RESBF2 + | 1296 <br><br> 1511 | MAGSQH ( 0.9 HZ , $\tau'+5$ ) <br> ↓ <br> MAGSQH ( 0.9 HZ , $\tau'-210$ ) |
| RESBF2 + <br> ↓ <br> RESBF2 + | 1512 <br><br> 1727 | MAGSQH (-0.9 HZ , $\tau'+5$ ) <br> ↓ <br> MAGSQH (-0.9 HZ , $\tau'-210$ ) |
| RESBF2 + <br> ↓ <br> RESBF2 + | 1728 <br><br> 1943 | MAGSQH ( 0.3 HZ , $\tau'+5$ ) <br> ↓ <br> MAGSQH ( 0.3 HZ , $\tau'-210$ ) |
| RESBF2 + <br> ↓ <br> RESBF2 + | 1944 <br><br> 2159 | MAGSQH (-0.3 HZ , $\tau'+5$ ) <br> ↓ <br> MAGSQH (-0.3 HZ , $\tau'-210$ ) |

FINE SEARCH MAGNATUDE SQUARES

FIG. 29

| NFQFR | 2 |
|-------|-----|
| NSMSM | 36 |
| NSMFQ | 181 |

| MAXCTR | ROFF | JFQ |
|--------|------|-----|
| 0 | 0 | 0 |
| 1 | 432 | 2 |
| 2 | 864 | 4 |
| 3 | 1296 | 6 |
| 4 | 1728 | 8 |

—FINE SEARCH
PARAMETERS FOR ECSMAX

FIG. 30

| ADDRESS | | CONTENTS |
|---|---|---|
| RESBF1 + | 0 | $\Sigma$ MAGSQH ( 2.7 HZ , $\tau'+5$ , $\tau'-30$) |
| ↓ | | ↓ |
| RESBF1 + | 180 | $\Sigma$ MAGSQH (2.7 HZ, $\tau'-175$ , $\tau'-210$) |
| RESBF1 + | 216 | $\Sigma$ MAGSQH (-2.7 HZ , $\tau'+5$ , $\tau'-30$) |
| ↓ | | ↓ |
| RESBF1 + | 396 | $\Sigma$ MAGSQH (-2.7 HZ, $\tau'-175$ , $\tau'-210$) |
| RESBF1 + | 432 | $\Sigma$ MAGSQH ( 2.1 HZ , $\tau'+5$ , $\tau'-30$) |
| ↓ | | ↓ |
| RESBF1 + | 612 | $\Sigma$ MAGSQH ( 2.1 HZ, $\tau'-175$ , $\tau'-210$) |
| RESBF1 + | 648 | $\Sigma$ MAGSQH (-2.1 HZ , $\tau'+5$ , $\tau'-30$) |
| ↓ | | ↓ |
| RESBF1 + | 828 | $\Sigma$ MAGSQH (-2.1 HZ $\tau'-175$ , $\tau'-210$) |
| RESBF1 + | 864 | $\Sigma$ MAGSQH ( 1.5 HZ , $\tau'+5$ , $\tau'-30$) |
| ↓ | | ↓ |
| RESBF1 + | 1044 | $\Sigma$ MAGSQH (1.5 HZ , $\tau'-175$ , $\tau'-210$) |
| RESBF1 + | 1080 | $\Sigma$ MAGSQH (-1.5 HZ , $\tau'+5$ , $\tau'-30$) |
| ↓ | | ↓ |
| RESBF1 + | 1260 | $\Sigma$ MAGSQH (-1.5 HZ $\tau'-175$ , $\tau'-210$) |
| RESBF1 + | 1296 | $\Sigma$ MAGSQH ( 0.9 HZ , $\tau'+5$ , $\tau'-30$) |
| ↓ | | ↓ |
| RESBF1 + | 1476 | $\Sigma$ MAGSQH (0.9 HZ, $\tau'-175$ , $\tau'-210$) |
| RESBF1 + | 1512 | $\Sigma$ MAGSQH (- 0.9 HZ , $\tau'+5$ , $\tau'-30$) |
| ↓ | | ↓ |
| RESBF1 + | 1692 | $\Sigma$ MAGSQH (- 0.9 HZ $\tau'-175$ , $\tau'-210$) |
| RESBF1 + | 1728 | $\Sigma$ MAGSQH ( .03 HZ , $\tau+5$ , $\tau-30$) |
| ↓ | | ↓ |
| RESBF1 + | 1908 | $\Sigma$ MAGSQH ( .03 HZ , $\tau-175$ , $\tau-210$) |
| RESBF1 + | 1944 | $\Sigma$ MAGSQH (-.03 HZ , $\tau'+5$ , $\tau'-30$) |
| ↓ | | ↓ |
| RESBF1 + | 2124 | $\Sigma$ MAGSQH (- .03 HZ $\tau'-175$ , $\tau'-210$) |

INTEGRATED MAGNITUDE SQUARES

FIG. 31

FREQUENCY INTERPOLATION $$f_{opt} = f_o + 0.3 \left[ \frac{M(f_o+0.6) - M(f_o-0.6)}{2 * M(f_o) - M(f_o+0.6) - M(f_o-0.6)} \right] \quad \text{EQ1.}$$

$$= f_o + 0.15 \left[ \frac{\text{SLOPE}}{\text{CURVE}} \right] \quad \text{EQ2.}$$

LOCAL AND REMOTE ECHO CANCELING APPARATUS PARTICULARLY ADAPTED FOR USE IN A FULL DUPLEX MODEM

This is a continuation of prior application Ser. No. 07,836,131, filed Feb. 14, 1992, abandoned.

FIELD OF THE INVENTION

This invention relates to echo canceling apparatus and more particularly to an echo canceling apparatus employed in a full duplex modem employing both local and remote echo cancelers.

BACKGROUND OF THE INVENTION

Modern communication systems and those which include data transmission capability over telephone lines and the like have resulted in the design and development of modems capable of operating at high frequency rates to accommodate data and further accepting or transmitting both data and voice. A variable rate modem is employed to accommodate both data and voice information where the data is transmitted and received at different bit rates such as 2400 bits per second (bps) or 4800 bps in either the transmission or reception modes.

In utilizing such systems, as for example in conjunction with telephone lines, the quality of the line often limits the maximum data rate available. When voice is involved, the quality of the telephone line is not as significant as for example when data is employed. However, full duplex modems of variable operation are highly desirable. Thus there are modems that are available which achieve full duplex operation for both voice and data transmission and for other purposes as well. Echo cancellation techniques are also employed to improve the quality of the telephone link or transmission path utilized for full duplex transmission of voice and data. Furthermore, through the use of echo cancellation, telephone lines or satellite links of adequate quality for voice may often be successfully employed for the full duplex transmission and reception of data due to echo canceler operation.

A typical modem structure which is indicative of prior art techniques and which employs echo cancellation has been described in U.S. Pat. No. 5,005,168 entitled "MULTI-RATE WIRE LINE MODEM APPARATUS" issued on Apr. 2, 1991 to Peter Cummiskey et al. and assigned to ITT Corporation, the assignee herein. That patent describes a multi-rate wire line modem apparatus operable at either of two rates in either the transmission or reception modes and which provides full duplex operation and echo cancellation for both voice and data.

As the accuracy of data transmission increases, echo cancellation becomes more of a substantial problem and there is therefore a need to provide improved echo cancellation which is capable of removing both local echoes and remote echoes.

Echoes in telephone systems are due to mismatched impedances at 4 wire to/from two wire interfaces known as hybrids. The magnitude of the echo that a talker hears will depend on the echo path loss which is the sum of the return loss at the distant hybrid and the round trip loss in the circuit. Echo suppression or cancellation is basically a concern in telephony. Essentially, echo cancellation is an application of adaptive filtering technology to the control of echoes in the telephone network. As one understands, the telephone network generates echoes at points near the ends of a connection. Echo cancellation is a means which is used to combat the echo for both speech and data transmission. The requirements for speech and data are quite different so that the techniques employed for both are different. When voice is passed in digital form via modem apparatus, the modem apparatus can operate with either voice or data, and a single echo cancellation scheme operates for both voice and data.

In many telephone systems there are two wire segments on the ends of the telephone systems which are manifested in subscriber loops or a portion of a local network in which both directions of transmissions are carried on a single wire pair. The center of the connection is four wire in which the two directions of transmission are segregated on physically different facilities. This is necessary where it is desired to insert carrier terminals, amplifiers, or digital switches.

There is a potential feedback problem around the four wire portion of the connection and without sufficient loss in the path there is degradation of the transmission or in extreme cases oscillation or "singing" occurs. The hybrid is a device which provides a large loss around the loop thereby limiting this impairment. At the same time the hybrid must not insert significant loss in the two talker speech paths. In order that the path not have a large attenuation it is necessary for the hybrid not to have an appreciable attenuation between the two-wire and four-wire port. Talker echo results in the talker hearing a delayed version of his or her own speech while in listener echo the listener hears a delayed version of the talker's speech. Both these echo mechanisms are mitigated if the echo has significant loss between its two four-wire ports. For short delays the talker echo represents an insignificant impairment if the echo attenuation is reasonable. For longer delays, talker echo represents a serious impairment unless the echo is highly attenuated. However, such delays are of greater concern in data transmission, especially at variable rates.

With increasing round trip delay, the objective effect of echo becomes more annoying. The introduction of satellite transmission systems which have found trip delays of 500 milliseconds or more have introduced a significant new source of large transmission delay. Satellite transmission systems require echo control subsystems and these subsystems employ echo cancellation. Echo cancelers provide sophisticated forms of echo control which can effectively eliminate echo as an impairment, even on very long delay channels.

There are many different techniques which are available in the prior art and which implement echo cancellation. See, for example, a text entitled *Advanced Digital Communications*, by K. Feher, Editor, published by Prentice Hall Inc. (1987), a division of Simon & Schuster, New Jersey. Reference is made to Chapter 4 entitled "Echo Cancellation in Speech and Data Transmission" by Dr. David G. Messerschmitt. The use of echo cancellation including non-linear echo cancellation is fairly well understood. However, in order to provide optimum echo cancellation for data transmission it has been determined that one must consider echoes which result from local echo path disturbances as well as echoes which result from remote paths disturbances.

As indicated, modems operate in conjunction with telephone communication systems which also may interface with satellite communication links or trunks. Thus there are multiple sources of echo disturbances including the above-noted hybrid which is a major source of an echo problem and which results in local echo generation. Other sources of echo include frequency shift which may occur by the use of different oscillators or timing controls in the system as well as Doppler shifts which may occur due to different satellite positions or other causes as well. Local echoes are usually echoes which are up to 15 milliseconds in delay time; if the delay is greater than 15 milliseconds the echo is usually a remote echo caused by a remote disturbance.

Based on prior art techniques where delays of more than 45 milliseconds are encountered, echo suppressors were employed. An echo suppressor is a voice operated device which, while one subscriber is talking, inserts as much as 50 db loss in the opposite direction of transmission which is the path over which the echo would return. Such devices effectively suppress echoes but they introduce their own transmission impairments by clipping the beginning and ending of words. Another more serious problem occurs on a multi-link connection where two or more circuits equipped with echo suppressors must be switched together. In these systems it is possible for each subscriber to talk simultaneously and gain control over the echo suppressor nearest him. This causes lock out and all types of problems and such techniques were totally not suitable for data transmission.

A typical echo canceler generates a replica of the echo by applying a reference signal to a transversal filter (tapped delay line). The transversal filter coefficiencies are caused to adapt to the echo transfer function. The transversal filter for echo cancellation is well known. However to accommodate higher digital data rates and to provide greater communication system reliability, improved echo cancellation apparatus and techniques are necessary.

It is an object of the present invention to provide both remote and local echo cancellation adapted to operate with a multi-rate wire line modem apparatus, which modem is operable at either of two rates in either transmission or reception modes while providing full duplex operation. Such a system, including echo cancellation, as indicated has been described in U.S. Pat. No. 5,005,168.

It is a further object of the present invention to provide a remote and a local echo canceler which are useful for operation with a full duplex modem. The echo canceler operates to cancel echoes with delays in excess of one second which is indicative of two satellite hops with frequency offsets up to + or −8 Hz. The echo canceling apparatus to be described operates to cancel both remote and local echoes and can provide an echo compensating signal within a reasonably short period of time as compared to the round trip delay.

SUMMARY OF THE INVENTION

In a modem system for receiving and transmitting data over a communications path, said path having a calculated delay between a near end at which said modem is located and a far end to provide a delay between transmitted and received data which path may undesirably provide remote and local echo disturbances, which disturbances interfere with reliable data transmission and reception, in combination therewith an echo canceling apparatus comprising, local echo canceling means including a tapped delay line having a plurality of adjustable taps said tapped delay line adapted to receive data signal to be transmitted, means responsive to said calculated delay for generating a series of tap coefficients for said delay line and according to the data signal to be transmitted to provide a series of values indicative of said local echo delay of said path and operative to vary the tap coefficients of said line according to said local echo, and means responsive to said signals at said taps as varied to provide a local echo delayed signal, means for combining said local echo delayed signal and a received signal to cancel said local echo signal from said received signal according to said local echo delayed signal at an output of said local echo canceling means, remote echo canceling means coupled to said output of said local echo canceling means for receiving said local echo canceled signal which signal contains remote echo signals not canceled by said local canceler means and including a remote canceler tapped delay line for receiving said local echo canceled received signal and means responsive to said local echo canceled signal to generate a series of new values from both prior transmitted stored data samples and said local echo canceled signal and operative to vary said tap coefficients of said remote echo canceler delay line in accordance with said new values to provide an output remote cancellation signal for remote echo cancellation, and means responsive to said local echo canceled signal and said output remote cancellation signal to provide an output received signal having both the remote and local echo substantially canceled therefrom.

BRIEF DESCRIPTION OF THE FIGURES

For a better understanding of the present invention, reference may be had to the following description of an exemplary embodiment thereof, considered in conjunction with the accompanying drawings, in which:

FIGS. 4A, 4B and 4C are flow charts of a subroutine ECCNCL depicting echo canceler operation with FIG. 4C showing the parameters which are employed from tables addressed by the state machine associated with the echo canceler system.

FIGS. 12A-12D depict a flow chart of the ECRTDC subroutine and the ECRINI subroutine, which routines update parameters for echo canceler and remote echo search operations according to this invention.

FIG. 15 is a table depicting the remote echo search sample storage values.

FIG. 16 is a table depicting the course search vectors employed in a course search.

FIG. 18 is a table showing the ECSCOR parameters employed for a course search.

FIG. 19 is a table showing the course search correlations obtained from the course search.

FIG. 21 is a table depicting the course search magnitude parameters used for the program of FIG. 20.

FIG. 22 is a table depicting the course search magnitude squares obtained from the program of FIG. 20.

FIG. 24 is a table depicting the course search parameters for ECSMAX.

FIG. 25 is a table depicting the vector buffer for the fine search.

FIG. 26 is a table depicting the ECSCOR parameters used for the fine search.

FIG. 27 is a table showing the fine search correlations.

FIGS. 28A and 28B are tables showing the fine search magnitude square parameters used in this invention.

FIG. 29 is a table depicting the fine search magnitude squares.

FIG. 30 is a table depicting the fine search parameters for the ECSMAX subroutine.

FIG. 31 is a table showing the integrated magnitude squares.

DETAILED DESCRIPTION OF THE FIGURES

Figure 1A:
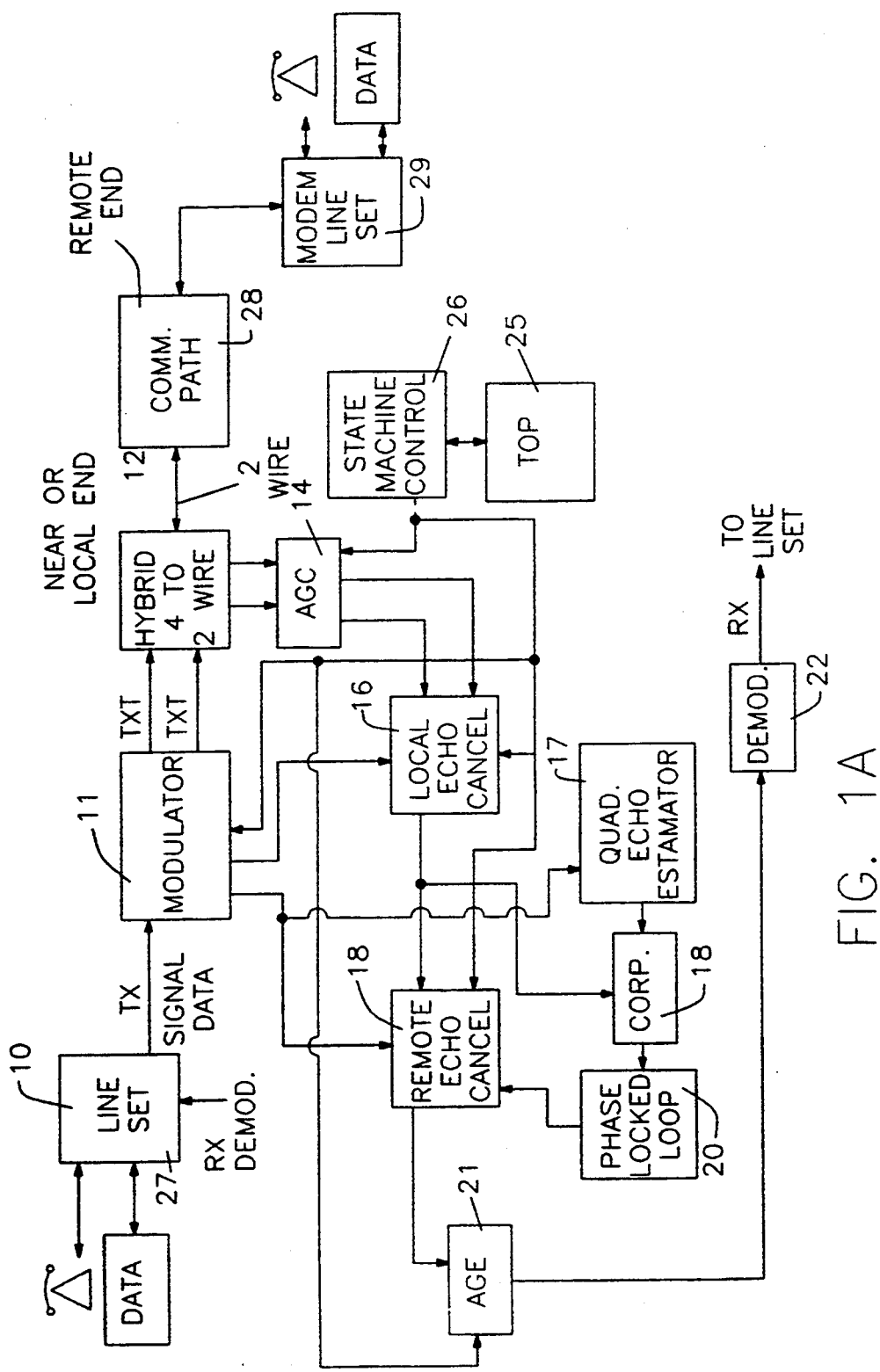
FIG. 1A is a block diagram of an echo cancellation apparatus employing a remote and local echo canceler according to this invention.

Referring to FIG. 1A there is shown a schematic block diagram illustrating the overall details of an exemplary embodiment of an echo canceling apparatus useful in this invention and particularly adapted for operation with a multi-rate modem apparatus. As indicated, the modem apparatus is described in detail in U.S. Pat. No. 5,005,168, entitled "MULTI-RATE WIRE LINE MODEM APPARATUS" issued on Apr. 2, 1991. That patent also describes an echo cancellation apparatus. The apparatus according to this invention differs from the echo cancellation apparatus as described in the above-noted patent. As one will understand, the present echo cancellation apparatus utilizes both a local echo canceler 16 and a remote echo canceler 18 which are operated in conjunction with a quadrature echo estimator 17 as will be more fully described.

In FIG. 1A there is shown a signal designated as $T_x$ which is defined as signal data. The signal $T_x$ may be a dibit signal (bit pair) which is sent from a subscriber line set or data set 27 which includes both voice and data capability, with data rate transmission variable at 2400 bps or 4800 bps. Typically, when operating at 2400 bps the modem transmitter will connect each dibit (a baud being equivalent to a pair of bits) of data into a given phase shift value as will be explained. The line set 27 provides the signal $T_x$ to be transmitted from the near or local end of a communications path 28 over a two wire line 12 to a remote line set or data set 29 at the remote or far end of the path. The line set 27 receives voice or data from a demodulator 22. The received data is also transmitted from the remote line set at modem 29 via the path 28 and via the two-wire line 12 coupled to the near end hybrid 11. The communication path 28 may be a satellite link, telephone or trunk line, radio or microwave link and so on, as part of a telephone or data communication system. The $T_x$ signal is applied to the input of a modulator 10. The modulator 10, as indicated in the above-noted patent, may include a digital signal processor (DSP) and other control units as well. The modulator operates to receive signal data to be transmitted and converts the data into a suitable signal for transmission. The outputs of the modulator which contains the transmitted signal is applied to suitable ports of a hybrid 11. The hybrid is a device which converts a four-wire line (two receive wires and two transmit wires) to a two-wire line and essentially input ports of the hybrid 11 receives the two-wire line 12 and provides from the two-wire line two transmit lines designated as $T_{XT}$ and two receive lines designated as $R_{XR}$. Thus the hybrid 11 converts the two wires into four wires, namely two transmit wires and two receive wires.

Hybrid circuits such as 11 have been traditionally implemented with specially interconnected transformers. More recently electronic hybrids have been employed and developed. Ideally, a hybrid should couple all energy on the incoming branch of the four-wire circuit into the two-wire circuit, and none of the incoming four-wire signal should be transferred to the outgoing four-wire branch. When the impedance matching network exactly matches the impedance of the two-wire circuit near perfect isolation of the two four-wire branches can be realized. However, the two-wire circuit is normally a switched connection. Thus the matching network can only approximate the typical impedance of the two-wire facilities. The effect of an impedance mismatch is to allow some energy on the incoming branch of the four-wire circuit to be coupled to the outgoing branch and return to the source as an echo, as indicated above. Thus, the echo produced by the hybrid 11 is referred to as a local echo, as compared to remote echoes.

The two receive lines $R_{XR}$ are applied to inputs of an AGC circuit 14 which essentially controls the gain of the received channel. The AGC circuit 14 has two receive output lines coupled to a local echo canceler 16. The local echo canceler 16 has an output coupled to remote echo canceler 18. Both echo cancelers 16 and 18 receive output signals from the modulator 10 which are applied to and processed by the echo cancelers 16 and 18 as will be further described. The local echo canceler 16 has an output which is coupled to the remote echo canceler 18. The output from the local echo canceler 16 is also directed to the input of a quadrature echo estimator 17. The quadrature echo estimator 17 has an output coupled to a correlator 18a. Another input from the correlator 18a is derived from the output of the local echo canceler 16. The output of the correlator 18a is coupled to one input of a phase lock loop 20. The output of the phase lock loop provides a phase locked carrier frequency which as will be explained is employed to operate with the remote echo canceler 18. The output from the remote echo canceler 18 is applied to one input of an AGC circuit 21 which receives a threshold at the other input from state machine control processor 26. The output of the AGC circuit 22 is applied to the input of the demodulator 22.

As is known, the combination of the modulator and the demodulator provides the modem. The modulator 10 and demodulator 22 have been described in great detail in the above-noted U.S. Pat. No. 5,005,168 which is incorporated herein by reference.

As one will also see from FIG. 1A, there is shown an input/output processor (IOP) 25 which communicates with a state machine control processor 26. As seen, the state machine control 26 via the input/output processor or IOP 25 communicates with each of the above-noted modules. When referring to a modem it is preferred that a multi-rate modem apparatus as described in the above-noted patent be employed, but any data modem can use the echo cancellation apparatus according to this invention. The schematic block diagram of the modulator and demodulator, including other known modules, is included and described in detail in FIG. 1 of that patent. As one will understand from the above-noted patent, the apparatus as well as the functional aspects thereof are implemented both in hardware and software. Thus there is included in such apparatus two DSP processors which are in turn controlled by the IOP processor 25. The IOP processor may be configured from a conventional processor such as an Hitachi HD6301VI processor. The IOP processor 25 operates to control each of the digital signal processors (DSP 1 and DSP 2) as well as all communications therebetween. Thus the IOP processor 25 operates as a system controller which controls the modulator processor (DSP) and the demodulator processor (DSP) and also communicates with other subsystems.

The state machine control 26 is a conventional block diagram which basically is defined as a high level program which when called operates independently within the distributed multiprocessing environment. For present purposes, the DSPs can be considered part of the state machine control processor 26. Thus, processing capability for present purposes are implemented in the state machine and IOP processors. This operation is described in the above-noted patent and is applicable herein. It is indicated that a primary difference between the apparatus described in U.S. Pat. No. 5,005,168 and the present invention as depicted in block diagram of FIG. 1 is the presence of the unique echo canceling apparatus which includes the local echo canceler 16, the remote echo canceler 18, and the quadrature echo estimator 17 as well as the phase locked loop 20.

The modulator 10 receives a signal to be transmitted and basically generates, among other things, a modulated output signal. Basically, when operating at 2400 bps, the modulator 10 operates to convert each dibit (bit pair) of data to be transmitted into one of four phase shifts corresponding to the four possible values of the dibit. For example, the modulator 10 provides phase shifts of 45, 135, 315 or 225 degrees corresponding to a dibit value of 00, 01, 10 or 11, respectively. The modulator 10 also generates a compressed modulation history which is stored in a TXHSBP buffer included in the modulator 10. Each entry in this buffer contains modulation phase angles, an initial angle and a control bit. These angles are modified by a carrier signal and transformed into in-phase and quadrature coordinates and stored in a local vector buffer to be described. The quadrature echo canceler 17 operates to employ quadrature components for echo cancellation of the remote signals. For present purposes, the modulator 10 provides signals which are sent to the remote echo canceler 18 and the local echo canceler 16. The local echo canceler and the remote echo canceler both receive signals through the AGC 14 and via the hybrid 11. These receive signals are operated on in conjunction with the transmit signals in the echo cancelers 16 and 18 as will be explained further. For local echo cancellation, dot products of the local echo canceler taps and local vectors are taken to obtain a local echo estimate signal. When the estimate is added to the received signal, local echo is reduced and the residual is stored. The residuals are subsequently dotted with the vectors in a local receive buffer contained in the local echo canceler to obtain tap updates. The residuals which are stored in the local echo canceler are processed by the remote echo canceler 18 using the same routines as employed in the local canceler 16. These routines are run with different parameters as will be described.

The remote canceler 18 employs 72 taps in the delay line as opposed to 108 taps in the local canceler 16. A major difference between the local and remote cancelers is the phase lock loop 20 which is activated by software and a vector generator routine. This routine generates 16 bit in phase and quadrature vector components from the compressed modulation history which is stored in the local echo canceler. The delay is determined by the remote echo search program which will be described further. The remote echo canceler 18, in conjunction with the phase lock loop 20 operates to produce a remote echo signal which is applied to the AGC module 21 and which echo signal is subtracted from the received data signal. The received data signal with both remote and local echo cancellation is then applied at the output of the AGC 21 to the demodulator 22. The demodulator 22 demodulates the received data signal to a digital signal format as required by the line set which signal has a substantially reduced echo. Thus the output of the demodulator 22 provides a received data signal with the echo removed, which in turn may be converted to a voice signal by known synthesis techniques.

It is of course understood that many of the above-noted routines are actually implemented in software and essentially are operated or otherwise implemented by means of IOP processor 25 and the state machine control processor 26. Also as indicated, the local echo canceler 16 and remote echo canceler 18 operate on the respective signals utilizing many of the techniques as described in the above-noted patent.

Figure 1B:
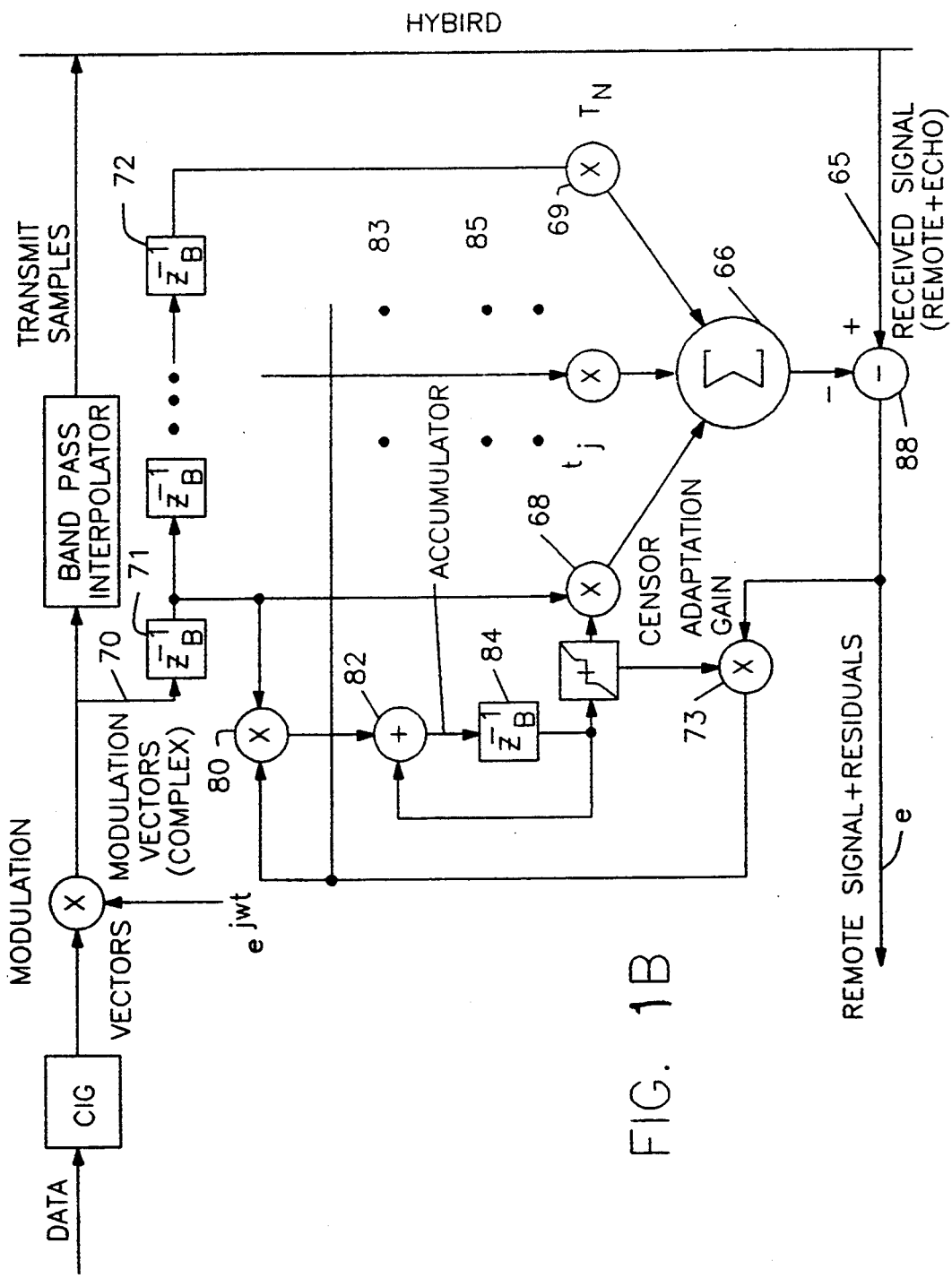
FIG. 1B is a schematic diagram partially in block form of a transversal filter (tapped delay line) apparatus of the type employed for both the local and remote echo cancelers of this invention.

Referring to FIG. 1B, it is immediately noted that both the local and remote echo cancelers are implemented by the use of a complex transversal filter (tapped delay line). The complex transversal filter coefficients are varied to adapt to the echo transfer function using the technique described in U.S. Pat. No. 5,005,168. There are many adaptation algorithms which can be employed to control the transversal filter. Essentially, the transfer function of the echo path from one port to another port is normally not known in advance, particularly with sufficient accuracy to assure a high degree of cancellation. Both the local and remote echo cancelers take the cross-correlation function between the residuals at 65 and the complex vectors on the delay lines 71–72. The correlations are scaled and censored, and then used to adapt the coefficients of the transversal filters in the cancelers. The adaptation algorithm infers, from residual errors, the appropriate correction to the transversal filter coefficients to reduce the echo. Specifically the errors cross-correlate in the successive delays of the far end signal. The summation box (80, 82, 84) is an accumulator, the output of which is the corresponding filter coefficient. The correction to the filter coefficients is scaled by the adaptation gain and censored (i.e. center clipped) at a level proportional to the RMS of the residuals at 88. The adaptation gain controls the speed of adaptation and the asymptotic error.

The circuit shown in FIG. 1B is the same as the vector echo canceler apparatus shown in U.S. Pat. No. 5,005,168 and is the general format employed for both the local and the remote echo cancelers, 16 and 18 in FIG. 1A. The quadrature echo estimator 17 is shown therein for providing quadrature coordinates which are used for remote echo cancellation in conjunction with the correlator 18 and the phase lock loop 20. As shown in FIG. 1A, the local echo canceler 16 and the remote echo canceler 18 possess the general configuration shown in FIG. 1B which essentially is a transversal filter.

A transmitted signal is supplied at the input of delay line 70 to each tap location V1—VN with a one baud or dibit delay indicated by blocks 71 . . . 72 being inserted between each tap. The adaptation gain is supplied multiplier 73, as is signal e which corresponds to the output of the echo cancellation circuit or a signal corresponding to the received signal with the echo estimate removed (local or remote). The output of the multiplier 73 is supplied to correlator multipliers as 80 . . . 81 associated with each tap as $T_o$ to $T_n$ as is the sample delay transmitted signal supplied to the tap via the delay line. This signal is summed by a summing junction 82 . . . 83 with an output from a one sample delay 84 and 85 for each that tap which collectively corresponds to an uncensored control vector column. The resulting sum yields the cross correlation of the transmit signal at the tap involved. The resulting uncensored tap coefficients are censored to create the next set of actual (i.e. censored) coefficients. When a tap is zeroed (i.e. censored out) the value on the accumulator 84 . . . 85 is also zeroed.

The output of gain multipliers, such as 68 and 69, is applied to an accumulator register or a summing device 66 where an echo estimate associated with each tap is provided at the output. This echo estimate is subtracted from the received signal supplied on conductor 65 by the summing device or adder 88 to yield a resulting received signal with the estimate echo removed. This output signal e is the same signal that is supplied back to the gain multiplier 73 for use in subsequent correlations.

Thus as one can see from FIG. 1B, both the local and remote echo cancelers, as shown in FIG. 1A, employ the transversal filter arrangement shown. The delay line shown in FIG. 1B is complex; that is it is comprised of two delay lines, one processing in phase vector components, the other processing quadrature components. Likewise the coefficient multipliers censors and accumulators are complex; that is each coefficient is made up of in phase and quadrature components. In the echo canceler shown in FIG. 1B a weighted sum of transmitted vectors is employed to estimate the return echo. The echo is canceled by adding the dot product of corresponding complex transmit vectors supplied on conductor 70 and complex canceler coefficients so that the resulting signal e may be stored after being modified by the adaptation gain and thereafter the cross correlation components for each tap are formed at the output of the summing junction for each tap.

Figure 7:
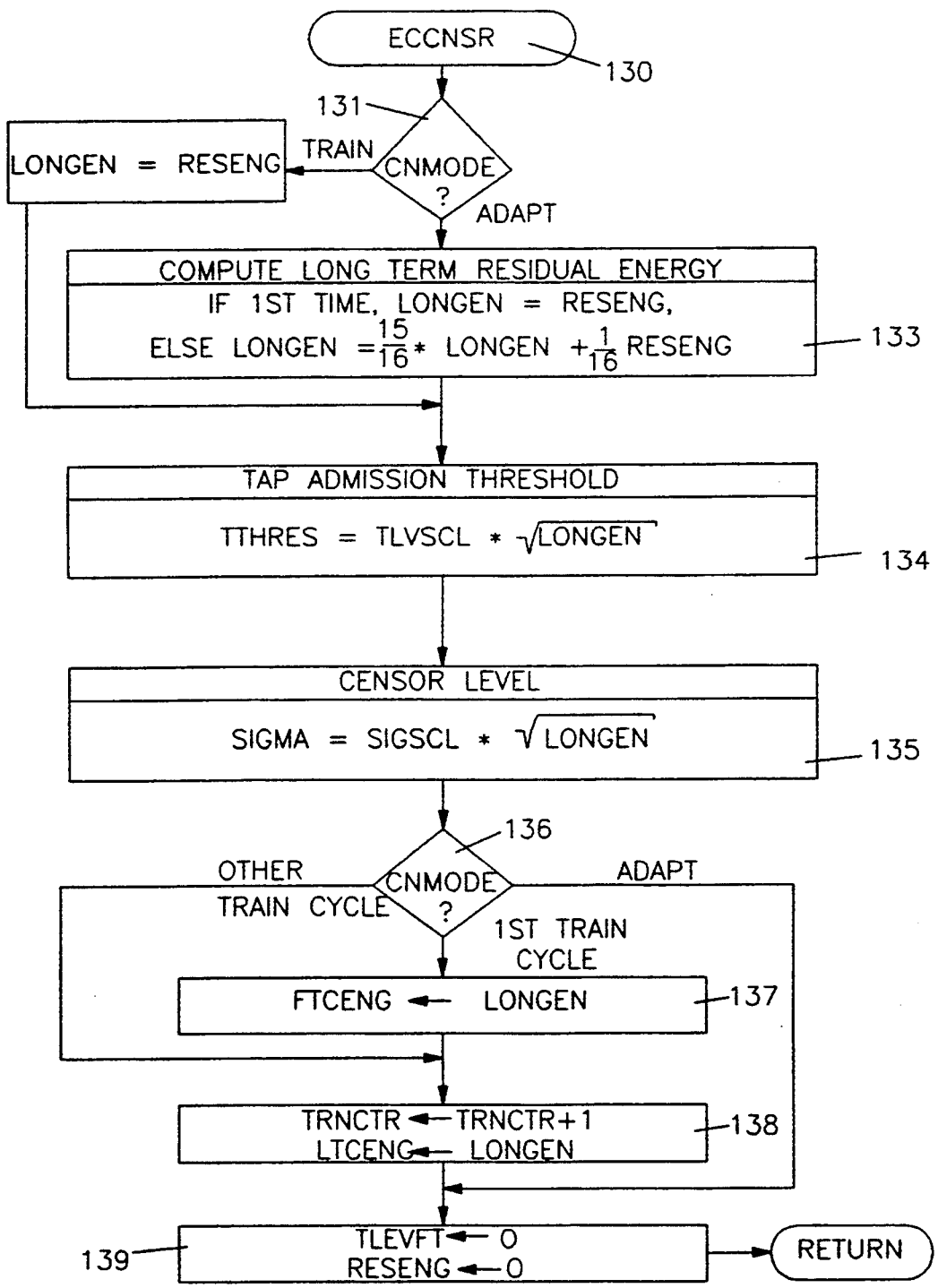
FIG. 7 is program flow chart of ECCNSR depicting a subroutine where censor levels are formulated based on residual energy contained in signal processing.

Another embodiment of an echo canceler is shown in FIG. 7 of U.S. Pat. No. 5,005,168 which employs transmit samples and an inverse to the transmit sample autocorrelation matrix was passed over in the current invention. This embodiment of the canceler may be applied to analog voice signals at some future time.

In the embodiment shown in the present invention, correlation between adjacent vectors is much lower than between samples which results in the convergence of gradient algorithms being faster. Correlation between canceler taps is reduced, thus permitting censoring or the zeroing out of taps having small values. Censoring in turn shortens the effective length of the active canceler, speeds convergence and improves accuracy over longer intervals. Further transmit vector processing is carried out at the baud rate, thus reducing execution time. In addition, since the complex vector domain affords a mechanism for frequency offset compensation, vectors can be rotated to compensate for frequency offset in the echo path.

Thus, as has been explained, the embodiment of the echo cancelers which are employed in the present invention uses a history of transmit vectors which are rotated by the transmit carrier frequency. Thus, each vector has a coefficient, a corresponding to an inphase portion of the echo tap value and a coefficient 1B corresponding to a quadrature portion of the echo tap value.

In this present embodiment the carrier frequency used in conjunction with the remote echo canceler is derived from the phase lock loop 20. In this manner, the transmit vectors which are associated with the remote echo canceler are rotated by the transmit carrier frequency generated by the phase lock loop. The remote echo canceler utilizes the residuals from the local echo canceler to obtain remote echo canceling.

As one will ascertain, the present echo canceler, which employs the remote echo canceler, includes the phase lock loop and provides substantial improvement over the echo cancelers described and discussed in the above noted patent.

Figure 2A:
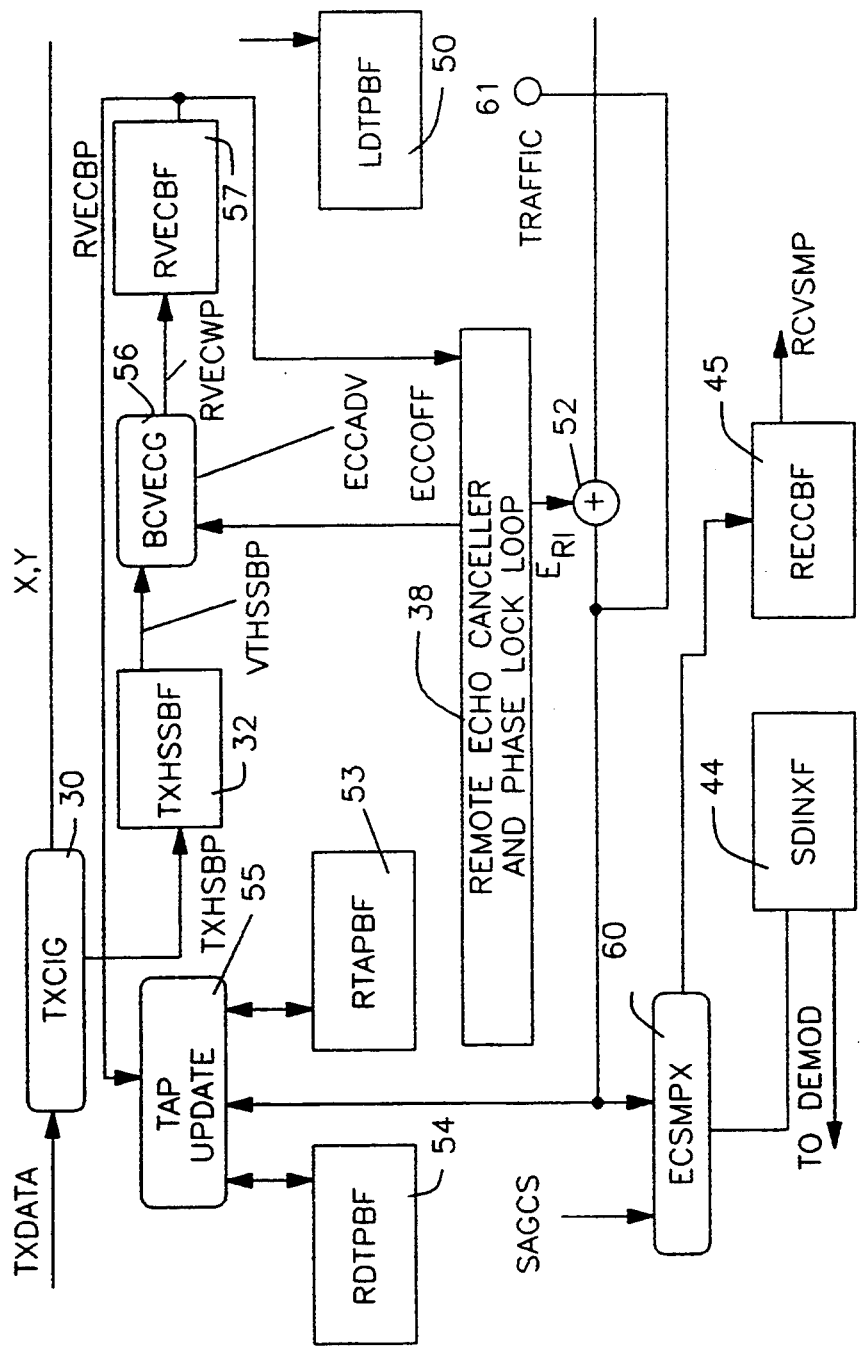
FIG. 2 is a block diagram depicting the operation of the echo cancelers in regard to signal flow, including a complex generator as controlling the taps associated with the echo cancelers.
Figure 2B:
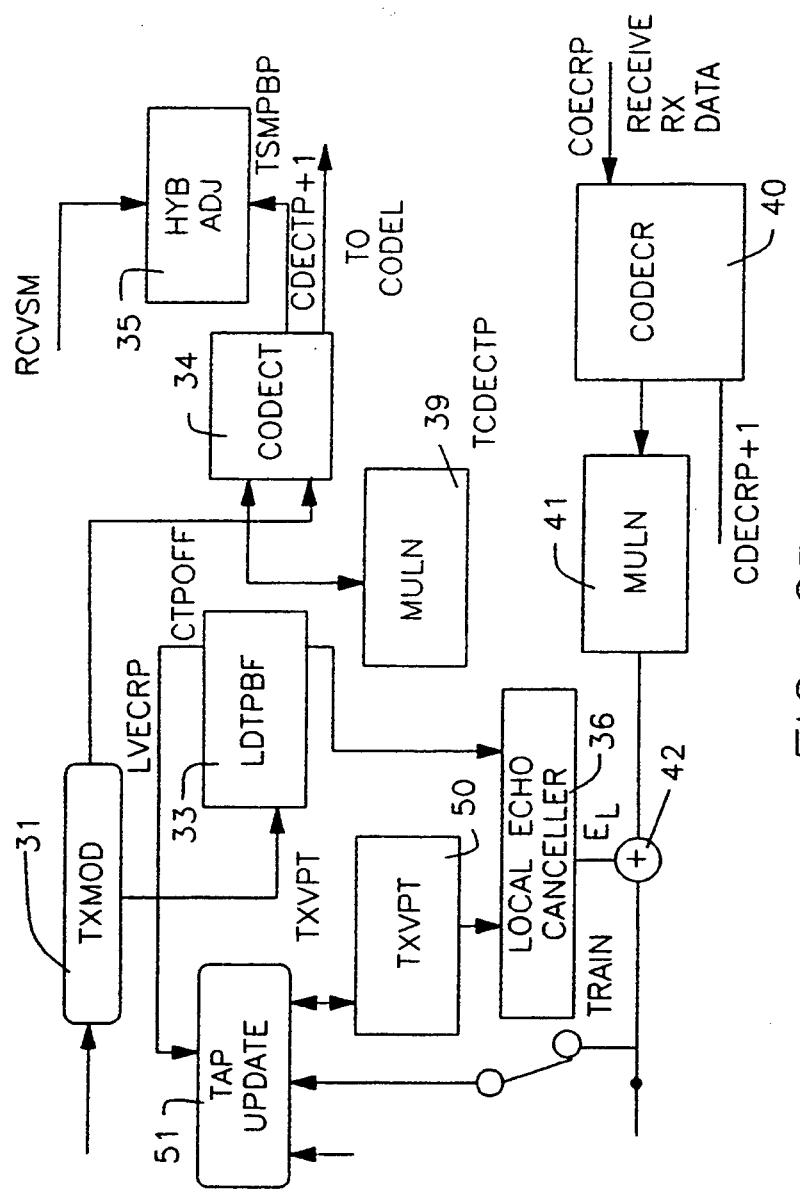

Referring to FIG. 2, there is shown a signal flow and block diagram of the echo canceler subsystem as shown in FIG. 1 and including the remote echo canceler and phase lock loop designated by numeral 38 and the local echo canceler now designated by numeral 36. The transmit or TX data is applied to the input of a complex impulse generator 30 (TXCIG). The TX data consists of digital data which is manifested in bit pairs. The complex impulse generator 30 provides angle modulated outputs designated as X and Y outputs which are applied to the input of the transmit modulator 31 (TXMOD). Thus the complex impulse generator TXCIG 30 receives data to be transmitted in the form of dibits or bit pairs whose value is indicative of one to four angles, and generates the X and Y coordinates on a circle for the angle modulated output. The output X and Y signals from the TXCIG 30 are also applied to the TXHSBF buffer 32 which stores the history of the transmitted signal. Basically, the TXCIG 30 generates a compressed modulation history which is stored in the transmit history buffer TXHSBF 32. Each entry in this buffer contains six modulation phase shifts (12 bits), an initial modulation angle (3 bits), and a control bit. The complex impulse generator TXCIG 30 also provides modulation angles to the transmit modulator 31 (TXMOD). In the TXMOD 31, modulation angles are spun or rotated by a 1800 Hz carrier, transformed into in-phase and quadrature coordinates and stored in a local vector buffer LVECBF 33. The TXMOD 31 also converts modulation angles at 1200 or 2400 baud into in-phase and quadrature components and modulates these with an 1800 Hz carrier at 7200 samples per second. The samples are converted to a MU law format at 8 bits per sample and stored in the output buffer designated as CODECT 34. The CODECT buffer 34 stores the samples for conversion to an analog signal to be applied to the hybrid 35 and transmitted on a telephone line. Also shown connected to the output CODECT buffer 34 is the MU law conversion module 39. As one can understand, the output of the TXMOD 31 is applied to the input CDECTP of the CODECT buffer 34. Samples in the CODECT 34 are converted by module 39 from MU law to 16 bit two's complement linear form by subroutines MULIN to be described.

The transmit analog signal is delayed 1 and a fraction frames in the CODECT buffer 34 before output at TSMPBP is converted to analog samples and put out on the line. The receive samples which emanate from the hybrid 11 (FIG. 1) are delayed one frame in a double buffer CODECR 40. Samples in the delayed side of CODECR 40 (CDECRPT1) are directed to one input of an adder 42 via a MU law converter 41. The local vector pointer LVECRP is positioned somewhat earlier in time than the output of CODECR at 41 at adder 42. The other input to adder 42 is obtained from the local echo canceler 36 as will be described.

Before echo cancelers are trained only the sample transfer routine which is designated as ECSMPX in module 60 runs. This routine transfer linear samples from CODECR 40 at the output CDECRP+1 to the receive cross-correlation buffer RECCBF 45. The TX samples offset by CTPOF=6 in the outputs of CODECT buffer 34 are loaded to an on-chip memory at TSMPBF shown at the output of CODECT 34. The memory may be a RAM or other memory device located in hybrid adjust software program. The transmit and receive samples are then correlated by the hybrid adjust software in module 35 to obtain an optimum hybrid setting. During echo canceler training and run operation, linear samples in CODECR 40 or CDECRP+1 are fed to the echo canceler via the adder 42. For local echo cancellation dot products of the local echo canceler taps in the local buffer or LTAPBF 50 and the local vectors in the local vector buffer LVECBF 33 are taken to obtain a local echo estimate signal designated as $E_L$ from the output of module 36. The estimate $E_L$ is added to the receive signal from CODECT 40 via the adder 42 the local echo is reduced and the residual is put back in CODECR 40. The residuals are subsequently dotted with the vectors in LVECBF 33 to obtain the delta tap updates in the local Δ tap buffer LDTPBF 50 which provides tap updates via the tap update module 51. As will be explained, this process is repeated four times to complete the local echo canceler train mode. During the train mode, Δ tap correlations are taken over 25 frames and added to the taps in the LTAPBF 50. The taps in LTABPF 50 are then censored to eliminate small taps.

During traffic, correlations are added to active taps (non-zero) every 256 frames (1.28 seconds) and to censored (i.e. zeroed) taps every 16×256 frames (20.48 seconds). Following updates, taps are censored, as will be described. The residuals which emanate from the local echo canceler via the output of adder 42 are applied to the input of adder 52 which is associated with the remote echo canceler and phase lock loop 38. The residuals from the local canceler 16 are processed by the remote canceler 38 in exactly the same manner as samples were processed at the local canceler 36. During traffic residuals are obtained from the remote echo canceler at 52 for tap updates at both cancelers; hence, the local canceler does not have to work with remote echo in its feedback loop (See FIG. 2, switch 61).

Figure 3:
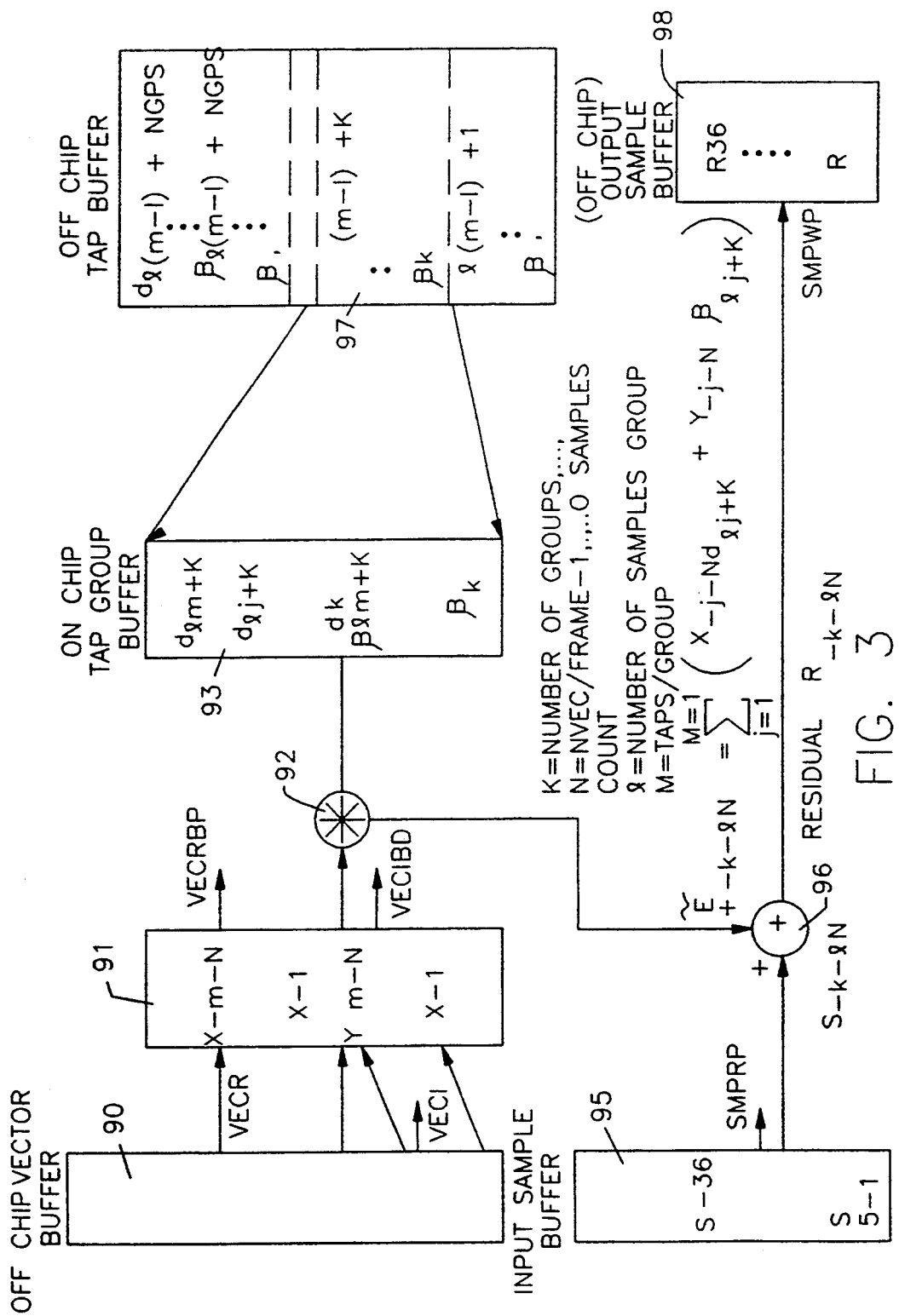
FIG. 3 is a block diagram depicting signal flow and modules employed in both the local and remote echo cancelers.

The same routines are run by the local and remote echo cancelers but are run with different parameters. The remote echo canceler 38 uses 72 taps as opposed to 108 taps for the local canceler 36 and the remote canceler uses remote taps (RTAPBF 53 and RDTPBF 54) in conjunction with the tap update 55. The vectors are generated by the vector generator BCVECG 56 which produces X and Y vectors which are then directed to the RVECBF buffer 57. In both cases the canceler routine is ECCNCL (FIGS. 3 and 4). The delta tap update routine is ECDTPU (FIG. 6), the tap update routine is ECTAPU (FIG. 8), the sensor routine is ECCNSR (FIG. 7), and the sensor tap admission routine is ECTAPA (FIG. 9). The difference between the local and remote cancelers includes the phase lock loop which is activated during the ECCNCL routine and a vector generator routine designated as ECVECG (FIG. 10) which generates 16 bit in phase and quadrature vector components which are stored in RVECBF 57 from the compressed modulation history which is stored in the TXHSBF 32. The delay TXHSBP to RVECWP is determined by the remote echo search software which will be described. After the remote echo is canceled by taking the output of the canceler 38 and applying it to one input of the adder 52, output samples are then multiplied by the AGC scale factor designated as SAGCS and broken into byte format and stored in a transfer buffer SDINXF 44. The SDINXF 44 applies the stored bytes to the demodulator 22 of FIG. 1 where they are demodulated to provide a data or analog signal for use by the line set 27.

Referring to FIG. 3 there is shown the flow diagram for the echo canceler which applies to both the local and remote echo cancelers 16 and 18 as will be explained. The format depicted in FIG. 3 is the ECCNCL signal flow as indicated above. Essentially, vectors occur once every six samples at 2400 bps and once every three samples as 4800 bps. To minimize the dot products, the taps are arranged in phase groups as also described in the above-noted U.S. Pat. No. 5,005,168.

Figure 4A:
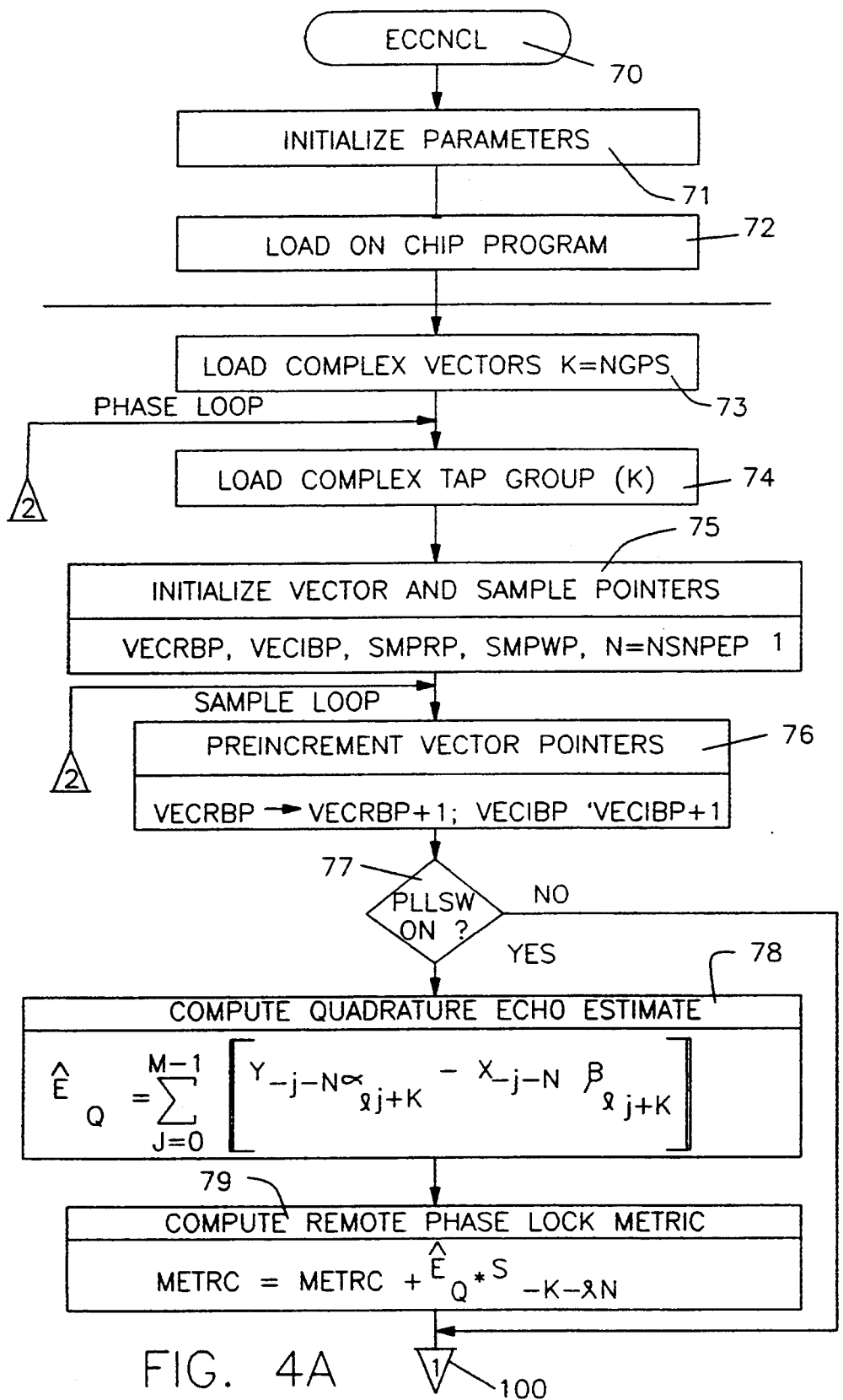
Figure 4B:
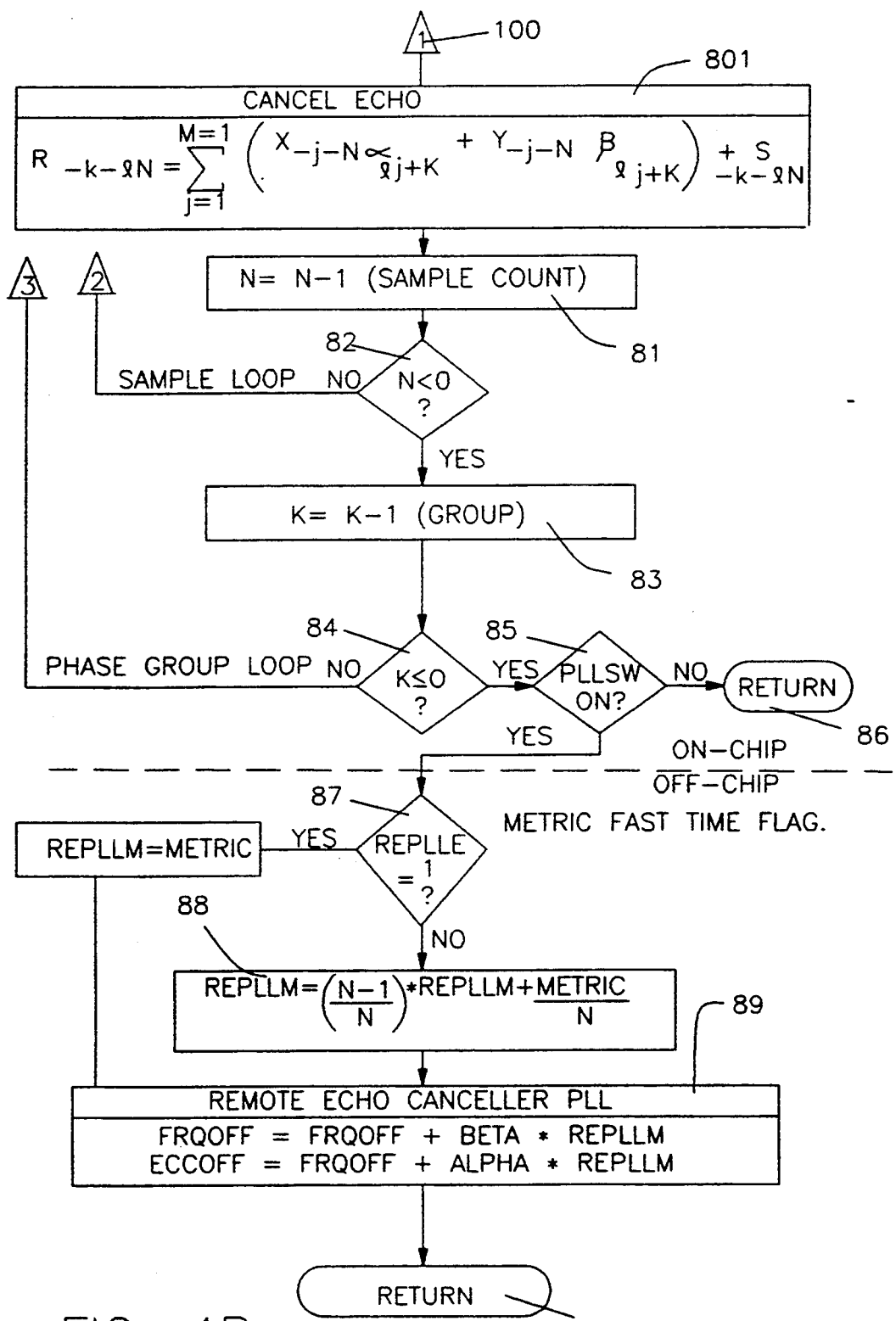

A program flow chart for ECCNCL is depicted in FIGS. 4A, 4B and 4C. Referring to FIG. 4A, one enters the program at module 70 as ECCNCL. Upon entry of the program, the ECCNCL parameters are initialized from tables addressed by arguments appended to the state machine 26 call. The state machine 26, as specified, has been shown in FIG. 1. The parameters are shown in FIG. 4C which essentially shows the ECCNCL parameters and the programming steps will be briefly alluded to. Thus, as seen in module 71, the ECCNCL parameters are initialized and the program is then loaded, as indicated in module 72. The next step is to load the complex vectors which is indicated module 73. FIG. 4A and a number of the following figures show dashed lines as an interface between ON chip and OFF chip functions. It is noted herein that by distributing hardware and software one can achieve faster processing times and more reliable operation. Hence ON chip and OFF chip functions mainly relate to physical layouts and are not part of this invention.

Referring to FIG. 3, there is shown an off-chip vector buffer 90 which receives the complex vectors. The complex vectors from vector buffer 90 are now loaded into and X and Y complex impulse generator 91 which essentially functions as the TXCIG generator 30 of FIG. 2. The bulk of the canceler code is loaded on chip for faster execution. Execution then proceeds to on chip memory where vectors are loaded to memory from the designated vector buffer 90. Thus as seen from FIG. 4A, once the complex vectors are loaded then module 74 indicates that the one now loads the complex tap group or phase group, which is a phase group K. As one can see from FIG. 3, the complex vectors are now applied to a correlator 92 which correlates the tap group equivalents which are stored in the tap group buffers 93 and 97. The correlator 92 receives and transmits data to and from the input sample buffer 95 via an adder 96. One output from the adder 96 is applied to a unidirectional input of correlator 92 which in turn produces a residual output which is again stored in the input sample buffer 95. The on-chip tap group buffers 93 and interfaces with the off-chip tap buffer 97 which essentially stores the remainder of the tap groups. The appropriate algorithm implemented at the adder terminal 96 via correlator 92 is shown in FIG. 3, with the corresponding symbols defined.

It is understood that on-chip and off-chip designations are made for convenience only and all memory and storage modules can be either on-chip or off-chip or both. A typical layout of an echo canceler with the modem structure has been indicated in the above U.S. Pat. No. 5,005,168. The output of the adder 96 is also applied to an output sample buffer 98 which essentially receives output samples SMPWP according to the performed algorithm. The samples stored in buffer 98 are residuals which residuals form the local canceler 16 and are used as samples for the remote canceler 18.

As one can ascertain from FIG. 4A, one loads a tap group as shown in module 74 which requires loading of the tap group buffers 93 and 97 of FIG. 3. After loading the tap group one now initializes the vector and sample pointers as depicted in module 75. It is noted that module 75 refers to particular vector and sample pointers as for example VECRBP which is a receive vector and SMPRP (module 95 of FIG. 3) which is a sample pointer for a receive bit and so on. As one can also see from FIG. 4A the phase loop is implemented between module 73 and 74 and designated by the triangle 3. After initializing the vectors and sample pointers the program then proceeds to preincrement the vector pointers as indicated in module 76, thereby producing delayed vector values as VECRPB which in turn produces (VECRPB+11) as well as VECIPB and the delay vector (VECIPB+1). As one can also ascertain, between modules 75 and 76 there is the sample loop phase designated by triangle 2.

After the preincrementation of the vector pointers one now goes to decision module 77 to determine whether the phase lock loop switch 77 (PLLSW) is on or off. If the phase lock switch is on then one computes the quadrature echo estimate, as indicated in module 78, showing the equation for computing the estimate from the complex values of the Y and X components as respectively multiplied by the $\alpha$ and $\beta$ coefficients which are accordingly summed. The quadrature echo estimate is analogous to the quadrature echo canceler module 17 of FIG. 1. If the phase lock loop is not on then one proceeds to the output designated by reference numeral 100 and shown by the triangle 1. After computing the quadrature echo estimate in module 78 the program then. computes the remote phase lock metric in module 79. This is extremely important to enable the remote echo canceler to operate with the phase lock loop supplying the appropriate offset carrier frequency to develop the appropriate compensating signal.

Referring to FIG. 4B the program now proceeds to compute echo cancellation via module 80. The echo cancellation is essentially provided by the summation of the X and Y components including the tap values at each tap and producing the residual value R. After the cancel echo signal (module 80) is provided one now proceeds to provide operation for samples in each of the frames. One then enters the decision module 82 to deter:mine whether the sample count N is less than zero. If N is not less than zero one reenters the sample loop subroutine which is shown in FIG. 4A and completes that operation. If N is less than zero, then one goes into the group module 83 to decrement K. One then goes into decision module 84 to determine whether the phase group is equal to or less than zero. If a group is not equal to or less than zero, one goes into the phase group loop which is the phase loop depicted by triangle 3 in FIG. 4A. If K is less than or equal to zero then one checks to see whether the phase lock loop switch is on via module 85. If it is on then one goes to decision module 87 to determine the residuals. If there is a residual then one sets that equal to the metric and enters the remote echo canceler module 89 which basically specifies the remote echo canceler phase lock loop frequencies to define the carrier for vector processing at the remote canceler. If the residual is not equal to 1 then one enters module 88 to determine a new residual.

After determining the new residual and replica, as indicated by module 88, one goes to remote echo canceler phase lock loop in module 89 and basically exits the program via module 86. In a similar manner, as seen, if the phase lock loop switch is not on, one also goes to return via module 86.

As indicated above, FIG. 4C shows the parameters used for the ECCNCL program. Thus, simply stated, the program depicted in FIGS. 4A and 4B operates as follows. Upon entry to the ECCNCL parameters which are initialized from tables addressed by the state machine as indicated in modules 71 and 72, the vectors are loaded from the designated vector buffers as shown in module 73. The program then enters the phase loop where it loads a tap group as indicated by module 74. After initialization of pointers, as indicated in module 75, execution proceeds into the sample loop.

If the remote canceler is being run, PLLSW, as indicated in module 77, is ON. If this is so then one computes the quadrature echo estimate as indicated in module 78 and the correlation of the quadrature estimate with the input sample is added to the phase metric METRC as depicted in module 79. The echo on sample $S_{-k-1N}$) is canceled as indicated in module 80 of FIG. 4B. The sample count N is decremented and the sample loop is repeated. Samples with echo canceled are stored in the designated output buffer which is buffer 98 shown in FIG. 3 and these samples with echo cancellation are generated in modules 87, 88 and 89. The samples with echo canceled occur at intervals of one sample/baud. At 2400 bps 1=6 and at 4800 bps 1=3. When all samples in the phase group have been processed, for example six samples at 2400 bps or 12 samples at 4800 bps, the phase count k is decremented and the next group of samples is processed. This is shown in modules 83 and 84. When all phase group k have been processed, the phase group k is decremented to zero and all 36 samples in a frame have had echo cancellation and have been stored in the output buffer 98 in time sequence. If the remote echo canceler is being executed, then PLLSW equals 1 and the phase lock loop is run. Otherwise the program returns control to the state machine executive which is designated by return modules 86. As indicated, FIG. 4C shows a list of parameters which are initialized upon entry to ECCNCL.

Echo canceler taps are trained through calls to the delta tap update (ECDTPU), the censor (ECCNSR), and the tap update (ECTAPU) sub-routines. Echo canceler taps are updated in traffic. This process is carried out over longer intervals, as for example 1.28 to 20.48 seconds as opposed to 100 to 500 milliseconds for initial training. This requires another sub-routine referred to as ECTAPA.

Figure 5:
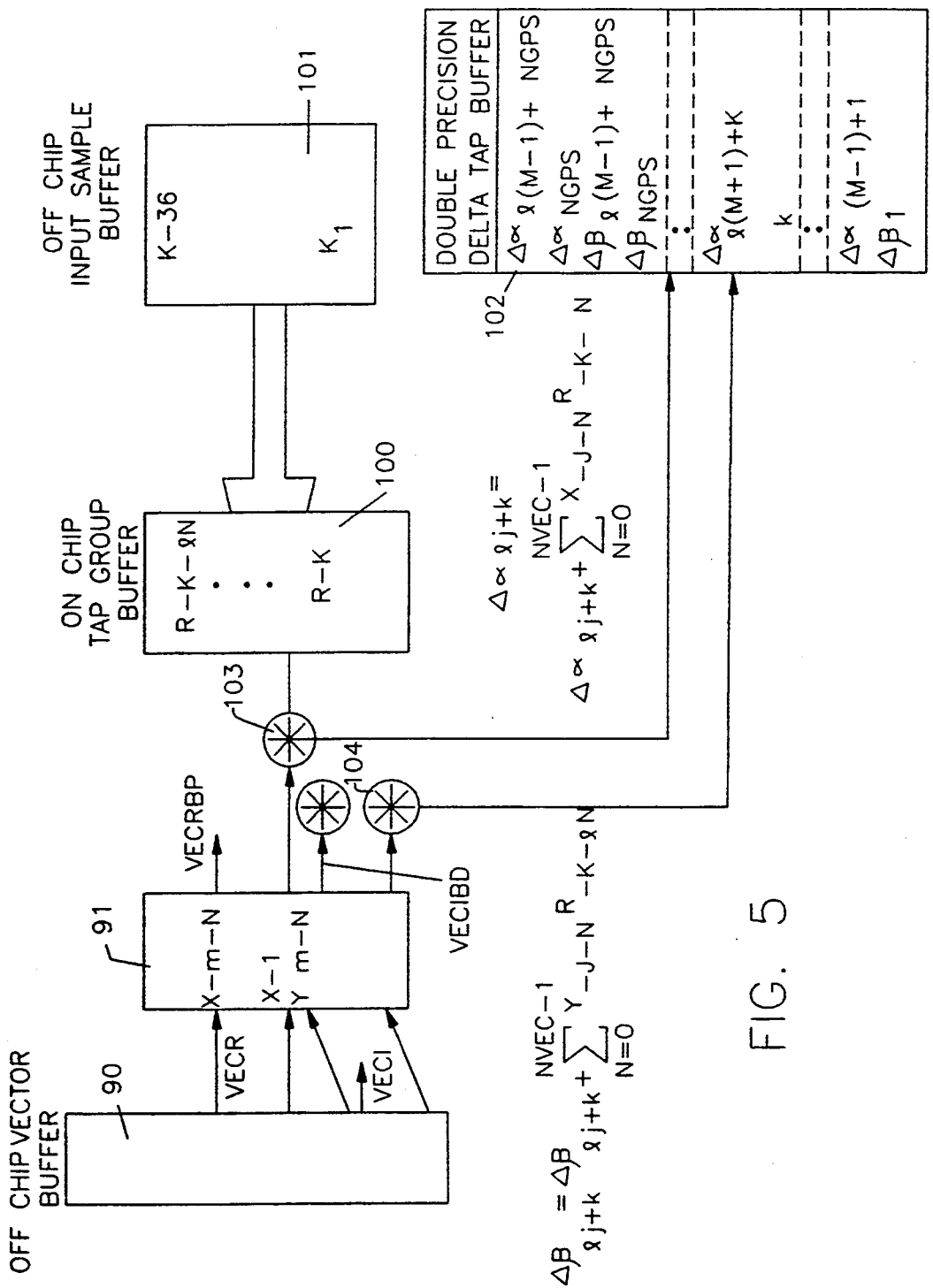
FIG. 5 is a block diagram depicting signal flow for training canceler taps according to this invention.

Referring to FIG. 5, there is shown a block diagram and signal flow for the sub-routine ECDTPU the $\Delta$ tap update subroutine. Again the off-chip vector buffer designated by reference numeral 90 interfaces with the on-chip vector buffer 91 to produce X and Y components which are going to be correlated by means of correlators 103 and 104 which interface respectively with sample group buffer 100 and sample group buffer 101. As indicated above, these buffers are shown on on-chip and off-chip buffers in order to facilitate processing and to allow for more rapid processing.

Figure 6A:
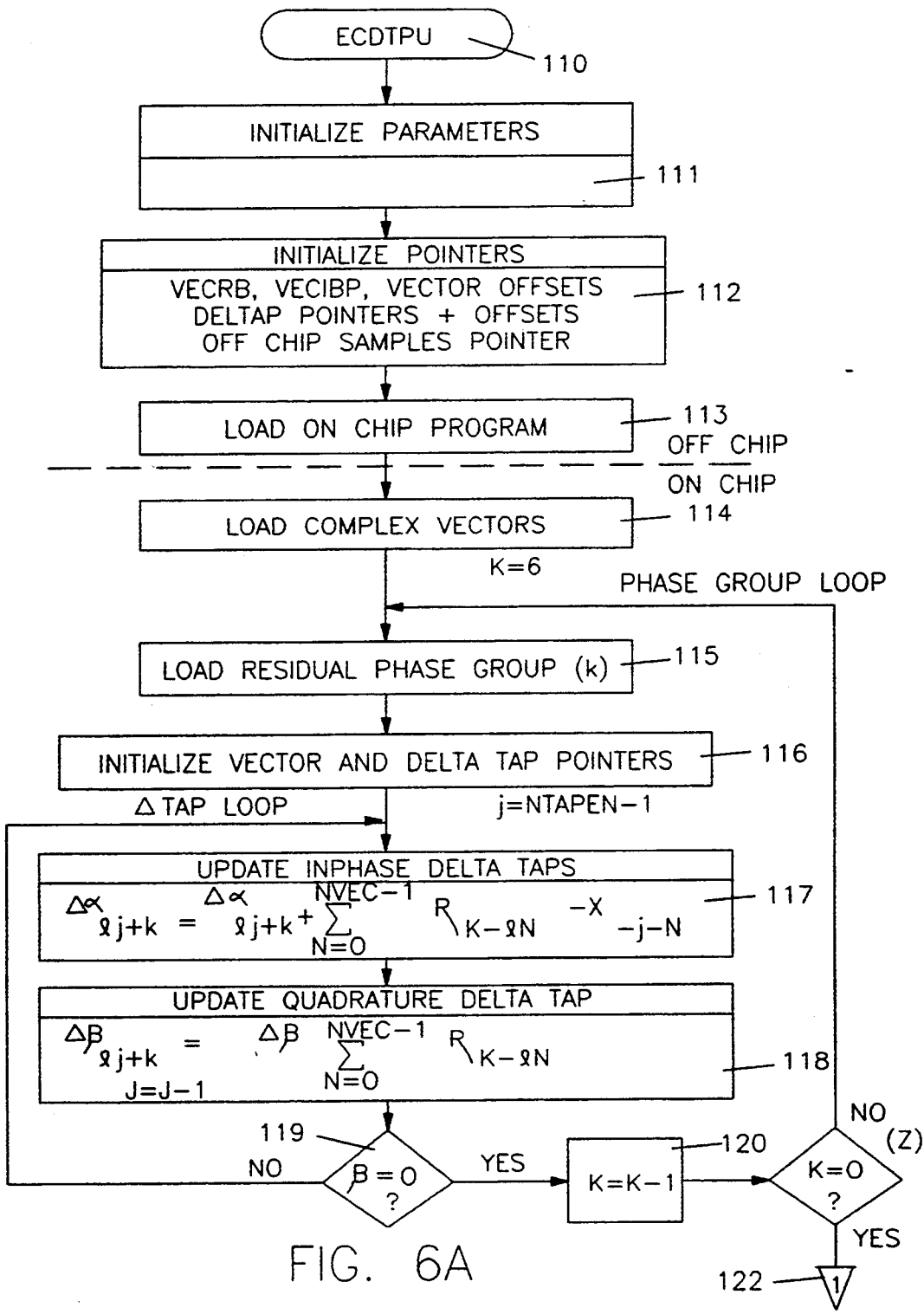
FIGS. 6A and 6B is a flow chart depicting the program ECDTPU for training and initializing taps for the delay lines employed in the remote and local echo cancelers according to this invention.
Figure 6B:
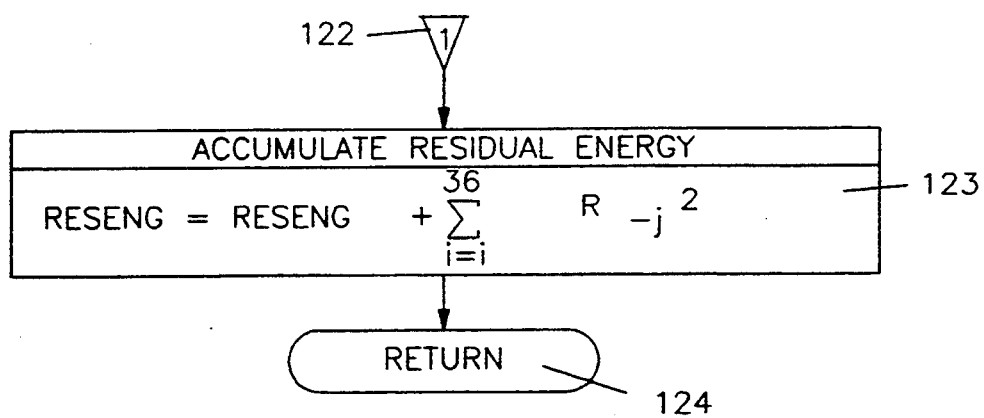

There is also a double precision delta tap buffer 102 which stores the tap values as indicated therein. This buffer 102 interfaces both with correlators 103 and 104 to complete the correlation algorithm as indicated in FIG. 5. Echo canceler taps are trained or updated on correlations between the vectors used to cancel echoes and the residual samples produced. The correlations are carried out on delta tap phase groups as indicated in FIG. 5. Program execution is shown in FIGS. 6A and 6B. The ECDTPU sub-routine 110 contains parameter and pointer initialization, vector load, residual phase group load, vector and residual correlations and delta tap updates. The routine contains tap and phase loops. ECDTPU also calculates the energy in the residuals, RESENG.RESENG is accumulated by ECDTPU and later used to censor taps.

Thus as seen in FIG. 6A the ECDTPU first initializes parameters from the state machine storage as evidenced by module 111. After initializing parameters the routine initializes the pointers as designated in the module 112 giving the names of the various pointers used in the routine. The program is then loaded on-chip as evidenced by module 113.

After loading the ECDTPU program as indicated in module 113, one then loads the complex vectors as indicated by module 114 and shown in FIG. 5 which is accomplished by buffer module 90 and buffer 91. Loading the complex vectors, as in module 114, then enables the loading of the residual phase group k, as indicated by module 115. After loading residual phase groups, the routine initializes the vector and delta tap pointers, as indicated by module 116. After initializing the vector and delta tap pointers, one enters module 117 where the update of in-phase delta taps are performed according to the algorithm specified therein and updating the $\alpha$ coefficient.

Thus, one updates each in-phase delta tap as evidenced by module 117 as a correlation between the double precision delta tap buffer components and the on-chip sample group buffer as well as the input sample buffer components as implemented by correlators 103 and 104. The program then updates the quadrature delta taps as evidenced by module 118 which are the $\beta$ coefficients. The program determines whether the operation has completed the update of all taps as indicated in module 119. If this does not occur then one goes back into the tap loop via module 117 and completes the update for the in-phase delta taps and the update for the quadrature delta taps. If all taps have been updated then one goes into the group determination as indicated by module 120. If all groups have not been updated, as indicated by decision module 121 then ones goes to the phase group loop load 115 and proceeds in loading the residual phase groups that have not been accommodated. If all groups have been accommodated, which means K is equal to zero (module 121), then one goes to FIG. 6B where one accumulates the residual energy in module 123 according to the formula depicted therein. After one accumulates the residual energy one returns as indicated in module 124. The calculation of the energy in the residuals, as will be indicated, is used to censor taps during the tap censor routine, ECCNSR.

Referring to FIG. 7 there is shown the ECCNSR sub-routine program 130. This program computes censor levels based on residual energy (RESENG) accumulated by the above-described routine ECDTPU. In the training mode, the threshold is proportional to the square root of residual energy. This relationship is shown in module 135 where SIGMA is defined and where LONGEN is equal to the residual energy in the train mode (module 132).

In the adapt mode the residual energy is integrated over 16 frames to obtain a long term energy measurement which is LONGEN and thresholds for active tap censoring (SIGMA) and censor tap admission (TTHRES) (module 134) are calculated from the square route of LONGEN.

Thus, referring to FIG. 7 one then immediately goes to decision module 131 to determine the canceler mode CN mode. If it is in the training mode then the long term energy measurement is set equal to the residual energy measurement in module 132 (LONGEN=RESENG) which immediately outputs to module 134 to obtain the tap admission threshold where this threshold is proportional to the square root of the residual energy. After computing the tap admission threshold, one then computes the censor level in module 135, also using the square root of the residual energy. Then one enters decision module 136 to again determine whether it is a training cycle or an adaptation cycle. If it is a first or other training cycle then one enters the module 138 where the training delays are set. If it is an adaptation cycle then one enters module 139 where suitable tap censorings are made. The various vectors shown are typical power vectors and are employed in the ECCNSR routine.

Figure 8A:
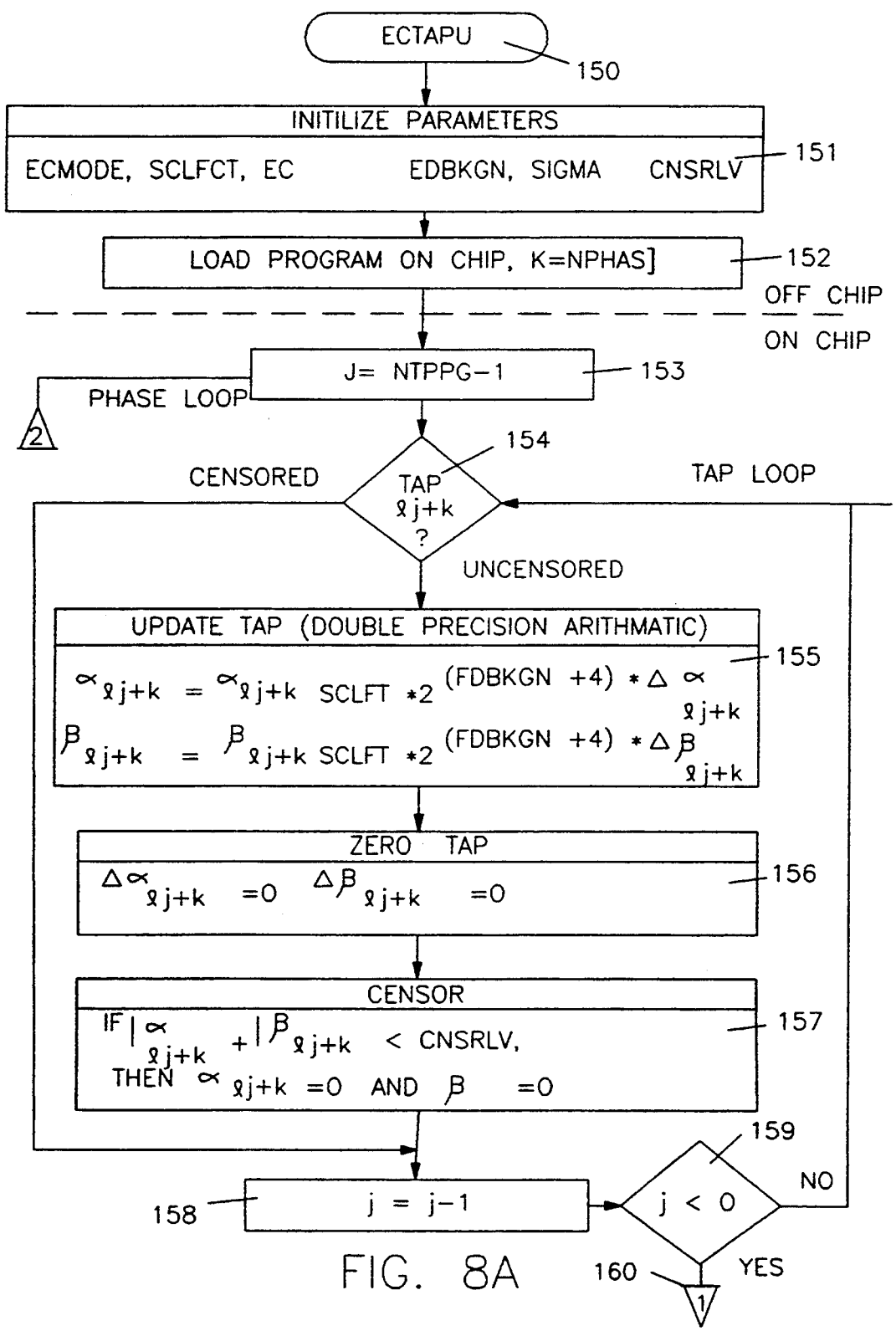
FIGS. 8A and 8B are flow charts of a program ECTAPU depicting how echo canceler taps are updated according to this invention.
Figure 8B:
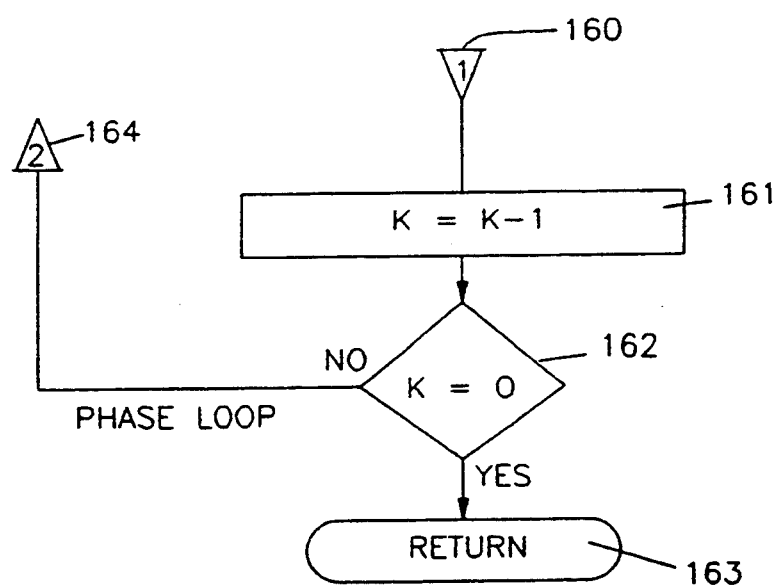

Referring to FIG. 8A and 8B there is shown a subroutine program for updating echo canceler taps ECTAPU. ECTAPU is implemented where echo canceler taps are updated by scaling the delta taps and subtracting them from the taps. In the training mode, all taps are declared uncensored, hence the scaled delta taps are subtracted from the taps. The taps are then censored and the delta taps are zeroed. In the adapt mode, taps that have been censored are not updated. ECTAPU updates taps one phase group at a time as indicated in FIG. 8A. As one can see, one enters ECTAPU module 150 and again initializes parameters in module 151 and loads the program on chip in module 152. The one enters module 153 with a number of taps j is set. Then one proceeds to the decision module 154 where it is determined whether all taps have been accommodated and whether this is a censored or uncensored operation.

If it is a censored operation then one proceeds to module 158 where the tap is then set to j=j−1 and decision module 159 determines whether the number of taps is less than zero. If the taps are not less than zero then one goes back to decision module 154 to complete the updating, depending on whether it is a censored or uncensored operation. If all taps have been completed, then one via arrow 160 goes to the group module 161 (FIG. 8B) to determine if all groups have been accommodated, as determined by module 162. If all groups are accommodated, then the program is ended at module 163. If all groups have not been accommodated, then the phase loop is implemented by returning to arrow 164 to each tap for that particular group, as indicated by module 153.

If the taps are uncensored then one updates the tap via module 155 using double precision arithmatic and updates both tap parameters as indicated by the algorithms given in module 155. After updating the taps one now zeroes the delta taps as indicated by module 156 and as indicated by module 157 then provides censoring of taps according to the algorithm given therein. Thus, as indicated, the scale delta taps are subtracted from the taps and the taps are then censored and the delta taps are zeroed. In the adapt mode, taps that have been censored are not updated. The program depicted in FIGS. 8A and 8B updates taps one phase group K at a time.

Figure 9A:
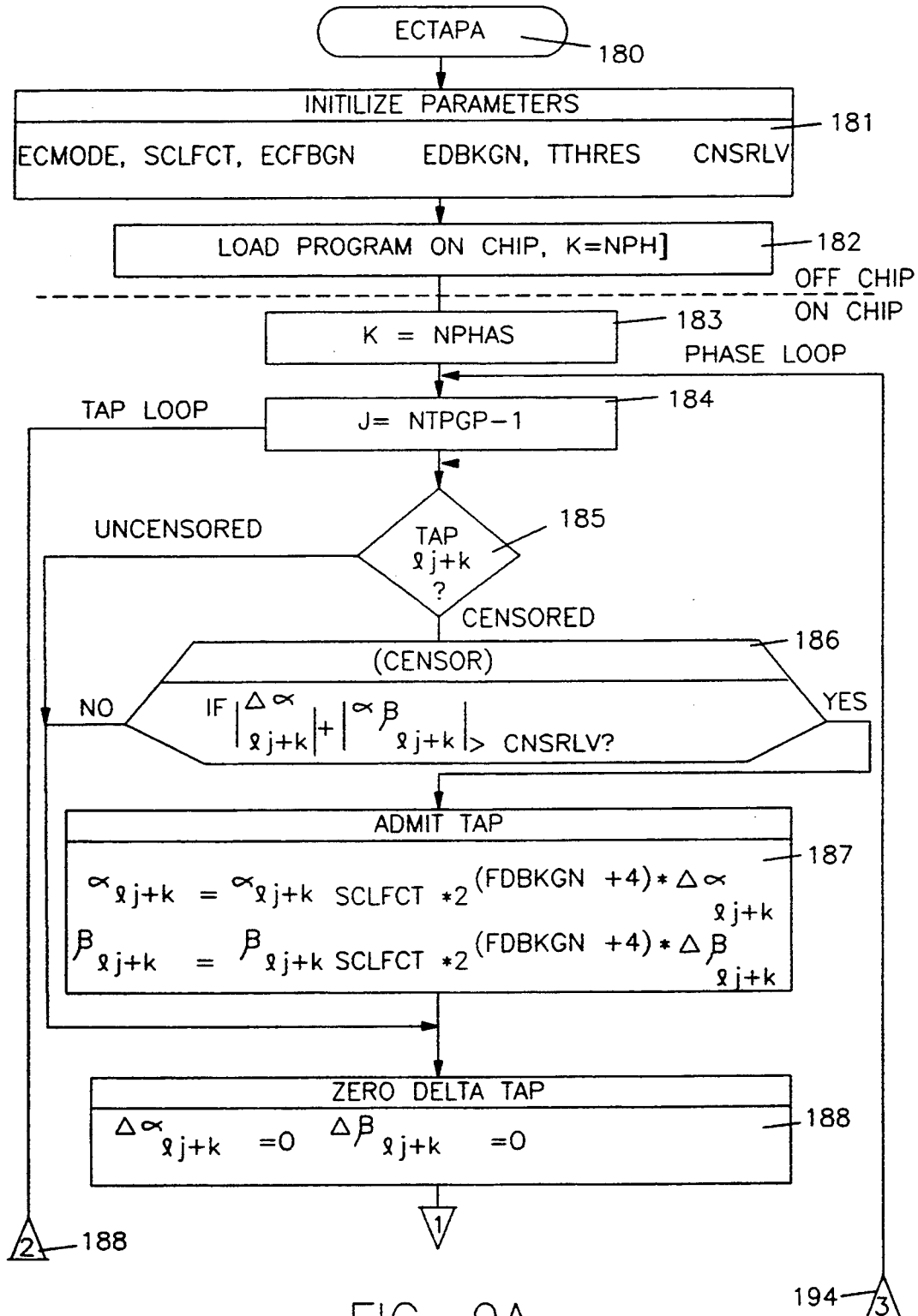
FIGS. 9A and 9B are flow charts of ECTAPA showing an adapt mode for updating echo canceler taps according to this invention.
Figure 9B:
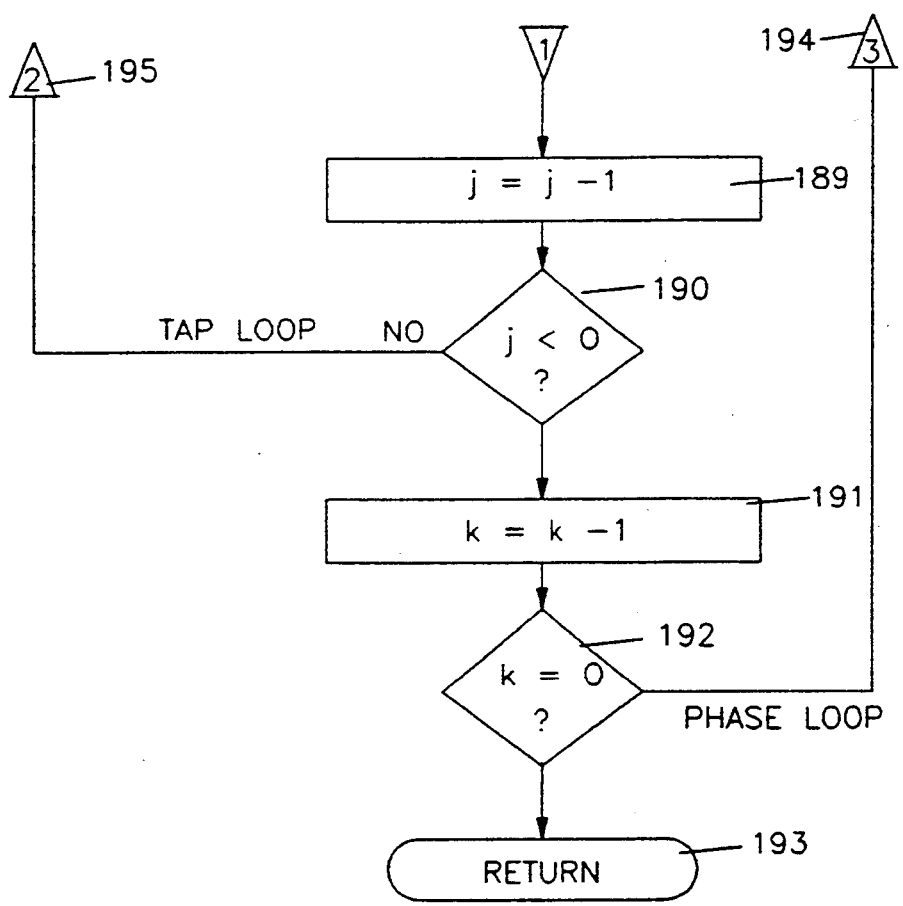

Referring to FIG. 9A and 9B, there is shown the traffic tap update mode ECTAPA program as referenced at module 180. In the adapt mode, when updating taps in traffic, this program is run to check on correlation at censor tap positions. If over a long period (20.48 seconds) significant correlations accumulate, for example, if the magnitude of the delta tap is greater than the censor level, then that tap is updated and declared uncensored. Following updates Δ taps are zero.

Thus, referring to FIG. 9A the program is entered into ECTAPA. Parameters are initialized in module 181 and the program is loaded on chip in module 182. One then enters into the group definition in module 183 to define the various phase groups. One then goes to the tap indicator in module 184 and goes into decision module 185 again to determine if taps are censored or uncensored. If taps are uncensored, the routine proceeds to module 188 which is the zero Δ tap format and sets taps to zero. One then, from module 188, goes to check each tap in module 189. If all taps are checked then j is less than zero, as indicated in module 190, and then all groups are checked, as defined in module 191. If all groups have been checked, as indicated by decision module 192 then one returns or exits from the program as shown in module 193. If groups have not been checked, then one returns via arrow 194 to the phase loop and again enters module 184 to determine whether all taps have been checked in each group.

If all taps have not been checked as indicated by module 190, then one goes back into the tap loop via arrow 195 and returns to decision module 185 to again determine whether it is a censored or uncensored tap. If it is a censored tap then one goes to module 186 where a censor absolute value is calculated to determine whether or not the modules for the tap exceed a stored value. If they do, then one goes to module 187 where the tap may be admitted as an uncensored tap according to the calculations performed. One then enters module 188 which again is the zero Δ tap. From module 188 one proceeds via triangle designated as 1 into FIG. 9B to determine whether all taps and all groups have been updated.

As was indicated before, a subroutine is also required to convert the compressed modulation history which is stored in TXHSBF buffer 32 of FIG. 2 to in-phase and quadrature vector components which components are modulated by a carrier with round trip frequency offset compensation. The implementation of the above is shown with reference to FIG. 10.

Figure 10:
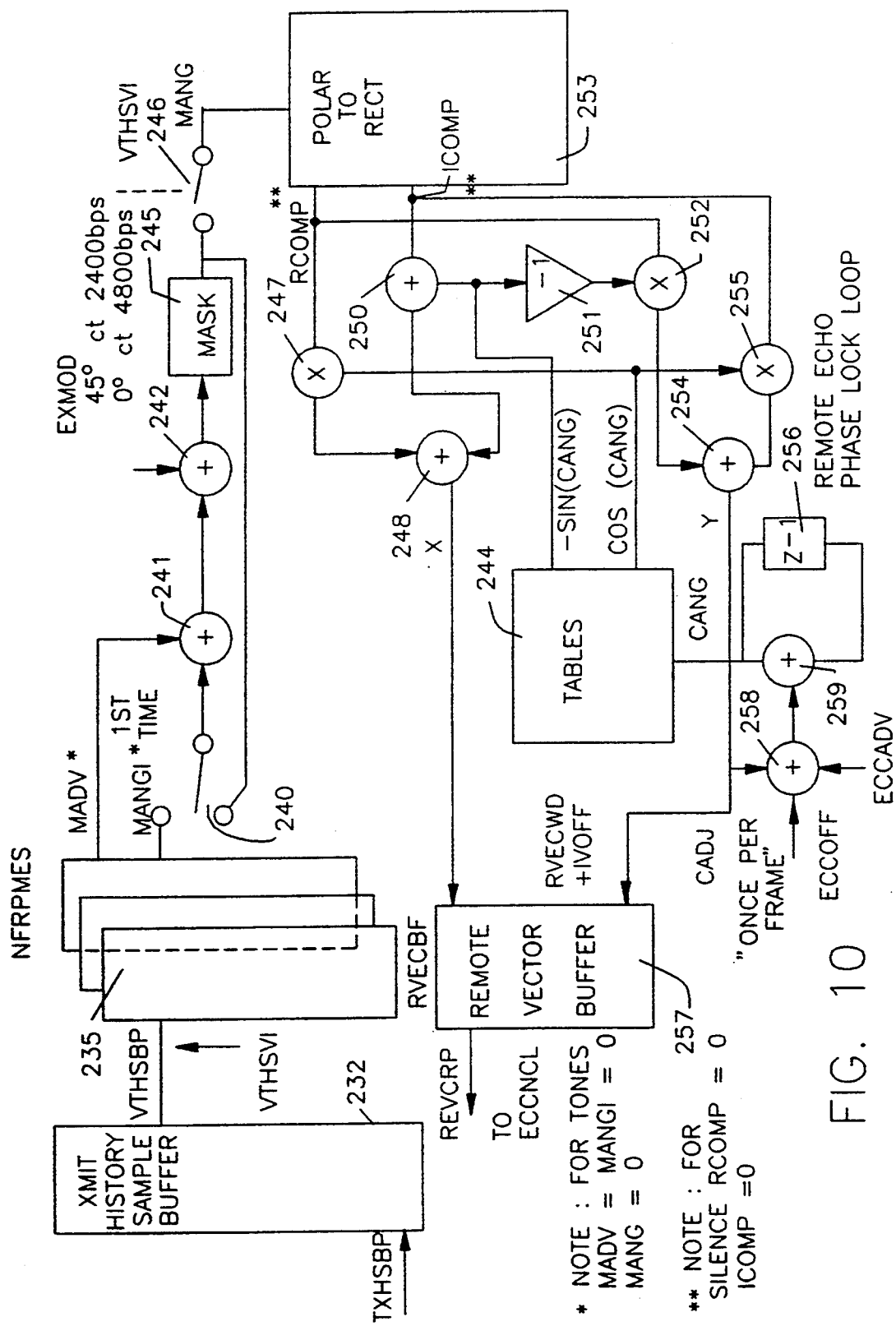
FIG. 10 is a block diagram depicting a complex vector generator signal flow apparatus operating according to this invention.

FIG. 10 denotes the transmit history sample buffer which is TXHSBF 32 of FIG. 2 and designates the same as 232. The buffer 232 receives the compressed modulation angle and angle changes from the complex signal generator TXCIG 30 of FIG. 2 and which is applied to the input designated as TXHSBP. The output of the transmit history sample buffer is directed to the input of the echo canceler vector generator 235. The echo delay is derived from correlations taken in a 50 millisecond interval surrounding the round trip delay.

The round trip delay is measured by the IOP processor 25 of FIG. 1A. Reference is made to the above-noted patent in describing how tone and signal detection subsystems are implemented by a digital signal processor (DSP1) is employed to measure the round trip delay. Echo delay is measured to the nearest baud by echo search software which is in the echo canceler subsystem. The echo search software also measures frequency offset on the return echo. This data is used to initialize the frequency offset phase lock loop. The oldest baud used by the remote canceler is the VTHSM1 index baud at VTHSPB which is stored in the TXHSDF buffer 232. The initial angle, prior to VTHSPB is loaded (the output MANGI of module 235) and advanced VTHSVI bauds using the loop consisting of adder 241, adder 242 and the mask module 245.

As one can see, the loop described above takes the advance signal from the buffer 235, which is MADV, and first correlates the signal with the initial angle signal, which is MANGI. This is added in adder 241 when switch 240 is in the upper (dashed) position. The output is then applied to adder 242 which receives the angles for either 2400 bps or 4800 bps. The adder 242 then provides an output signal which is compared with stored masks in module 245 to derive an error signal which is again fed back as the initial angle signal to the correlator or adder 241. This signal is then utilized as the initial angle signal.

The output switch 246 closes after the initial advance and the angles which are derived from the mask module are converted to in-phase (RCOMP) and quadrature (ICOMP) components. RCOMP and ICOMP are modulated by the remote phase lock carrier angle CANG as follows.

$$X=[RCOMP*\cos(CANG)]-[ICOMP*\sin(CANG)]$$

$$Y=[RCOMP*\sin(CANG)]-[ICOMP*\cos(CANG)]$$

Thus, as seen, the output of switch 246 is applied to the input of module 253 which is a polar to rectangular converter. Module 253 converts the angle obtained from the mask module into the two above-described components utilizing multipliers 247 and 250 which are coupled to adder 248 to produce the X vector which, again, is sent to the remote vector buffer (RVECAF) 257.

The table storage module 249 applies -SIN (CANG) and COS (CANG) angles to the multipliers 247, 250 and 255 which in conjunction with adders 248 and 254 produce, the X and Y vector components which are applied to the remote vector buffer 257. Sixteen bit twos complement X and Y values are loaded into the remote vector buffer RVECBF 257 at RVECWP and RVECWP+IVCOFF. The pointers to RVECBF and the modulation angle are advanced as follows.

$$RCECWP=RVECWP+1$$

$$CANG=CANG+ECCADV+ECCOFF$$

Referring to module 258 there is shown an adder where ECCADCV is applied to one input and is the nominal advance and ECCOFF is an additional advance from the phase lock loop (frequency offset plus first order term). The entire modulation loop is repeated until a number of words from TPXHSBF 232 have been modulated. Typically six bauds are modulated at 2400 bps and 12 bauds at 4800 bps. However, any number of words can be processed.

ECVECG modulates the first VTSHVI bauds of the last word processed, thus modulating a multiple of six bauds. When the control bit in a transmit history word is zero the nominal carrier is 1800 Hz (ECCADV=8000H at 2400 bps or ECCADV=c000 at 4800 bps). The modulation components RCOMP and ICOMP are derived as described above. If the control bit is set then ICOMP is zeroed and RCOMP, ECCADV, and CADJ are controlled as follows.

| THSWD | RCOMP | ECCADV | CADJ |
|---|---|---|---|
| 1 (silence) | 0 | 8000 or c000 | 0 |
| 3 (1100 Hz) | 36 be | eaab | fffe |
| 5 (1300 Hz) | 36 be | 1555 | 2 |
| 7 (1800 Hz) | 36 be | 8000 | 0 |
| 9 (2100 Hz) | 36 be | c000 | 0 |

As one can ascertain from the above, the object is to eliminate both the local and remote echoes by use of an echo canceler system. Both the remote and echo cancelers basically operate the same way and which remove echo by updating taps associated with a tapped delay line or transversal filter as also described in U.S. Pat. No. 5,005,168. A major difference between the present invention and the prior invention is the existence of the remote echo canceler and the phase lock loop associated therewith and the ability of the system to recognize a remote echo and deal with it.

In order to further explain system operation, an example of locating a remote echo in the vicinity ($\pm 25$ msec) of the round trip delay with a frequency offset in the range $-8$ Hz to $+8$ Hz. The time position of the echo is resolved within $+$ or $-417$ microseconds (i.e. $+$ or $-$ half a baud) and the frequency offset is determined within $+$ or $-0.05$ Hz.

The system incorporates a search procedure which allows one to determine the location of the remote echo and therefore to enable the remote echo canceler to cancel or substantially reduce the remote echo rapidly and reliably. The search procedure involves the following steps.

1. Measure the round trip delay. (Done by the IOP)
2. Save vectors and set a corresponding pointer to the transmit history buffer, TXHSBF (buffer 32 of FIG. 2, buffer 232 of FIG. 10) (RTHSBP=TXHSBP minus 4).
3. Train the local echo canceler.
4. Count down the round trip delay from step 2 and save the delayed samples.
5. Remove local echo from the delayed samples.
6. Correlate the saved vectors with the delayed samples. Get a number of sets of correlations displaced in time.
7. Spin or rotate the complex correlations at 5 Hz, and take the sum of the in-phase and the sum of the quadrature correlations. Take the sum of the squares of the in-phase and quadrature sums to obtain a magnitude square measurement. Do this at $-5$ Hz, 1.67 Hz and $-1.67$ Hz.
8. Integrate the magnitude squares over a 5 millisecond interval and search for the maximum.
9. Adjust the roundtrip history buffer (RTHSBP) pointer to compensate for the time position obtained in step 8. Put an offset on the carrier and generate a new set of vectors from the TXHSBF buffer 32 starting at the new roundtrip history buffer pointer. (RTHSBP)
10. Repeat steps 6, 7 and 8 with finer parameters at $\pm 2.7$ Hz, $\pm 2.1$ Hz, $\pm 1.5$ Hz, $\pm 0.9$ Hz, and $\pm 0.3$ Hz. Adjust the roundtrip history buffer pointer to compensate for the result of the fine search.
11. Interpolate magnitude squares at the maximum time position across at least three frequencies to obtain a frequency offset accurate to $\pm 0.05$ Hz.
12. Generate vectors from the search parameters, and train the remote canceler using the saved samples.
13. Reposition the roundtrip history buffer pointer (RTHSBP) to cancel the remote echo on incoming samples and run the local and remote cancelers using the parameters obtained from the search.

The steps outlined above will now be described in relation to events and routines called from the echo canceler state machine as shown in FIG. 1A.

As indicated above, the roundtrip delay is measured by the IOP processor 25 which controls DSPs of the state machine processor and the other subsystems. U.S. Pat. No. 5,005,168 describes measuring roundtrip delay. At the initiating terminal, roundtrip delay is based on the time lapse from the transmission of a given tone, for example, 1300 cycles, to detection of a start of message (SOM) preceding a CAP message. At the responding terminal it is based on the time lapse from transmission of an initial 1800 Hz tone to detection of the IESD tone.

After the line subsystem hybrid has been adjusted to minimize return signal (FIG. 2) and the AGC hardware setting has been finalized, the IOP processor sends the train command (ECTRN) to the echo canceler subsystem including local and remote cancelers 16 and 18 of FIG. 1.

Figure 11A:
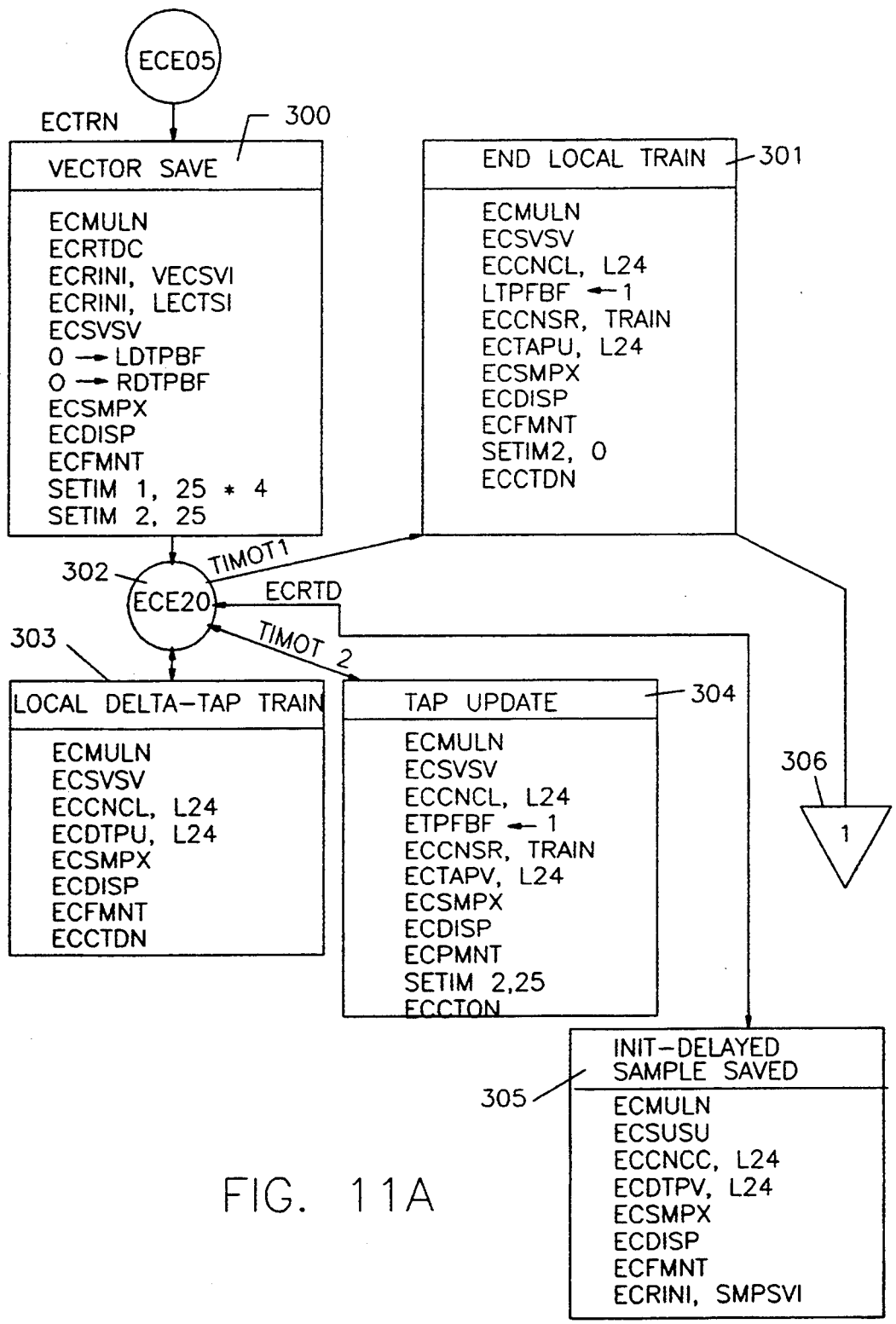
FIGS. 11A-11E are state level diagrams implemented by this system for use in both remote and local echo canceling.
Figure 11B:
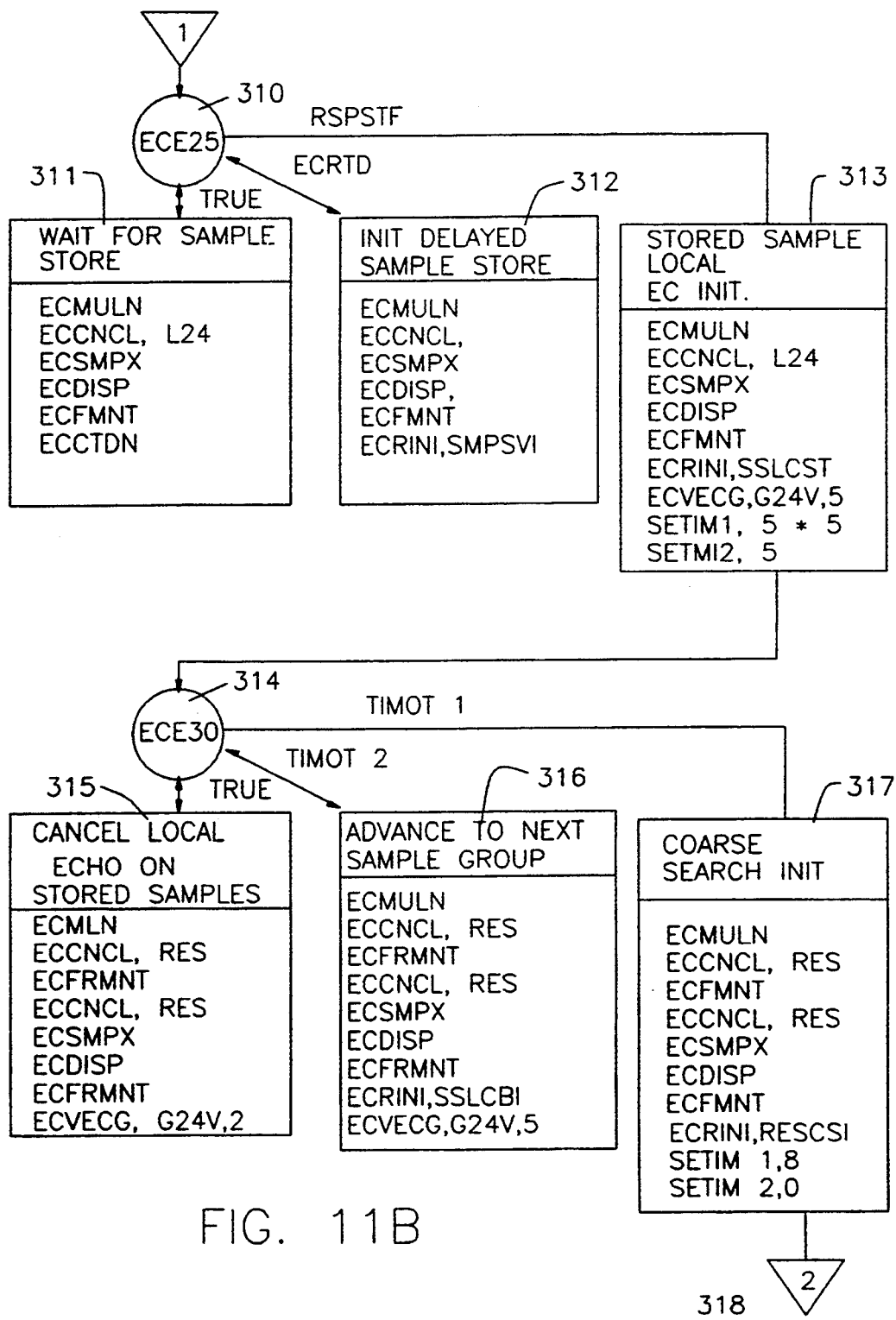

Referring to FIGS. 11A to 11E, there is shown a diagram of the echo canceler states associated with training the echo canceler machine local and remote cancelers (i.e. a subset of ECMACH). As seen in FIG. 11A, the ECTRN module 300 loads the round trip delay count from the IOP (ECRTDC), sets the vector save flag (ECINI, VECSVI) and initializes local canceler train (ECINI, LECTSI). Module 300 contains the various subroutines for setting timers (SETIM1, SETIM2) and for ongoing signal processing. FIG. 11A also shows the Local Train slate No. 30 (301) where the local echo canceler is trained using modules 303 and (304). Delta Tap correlations are carried out in 303 taps are updated and censored every 25 flames in module 304. If the round trip delay count expires, module 305 is invoked and sample storage for remote canceler train is initialized (ECRINI, SMPSVI). After 100 flames, timer 1 expires and local echo canceler train is completed in module 301.

There is shown a program arrow emanating from End Local Train module 301 and designated by reference numeral 306. The arrow 306 then proceeds to module 310 (state 25) in FIG. 11B which module interfaces with subroutine 311, which is the Wait For Sample Store. If the round trip delay expires after local canceler train, subroutine 312, initiates sample storage for the remote echo canceler. When all of the samples for the remote search have been stored, subroutine 313 initializes local echo cancellation on the delayed samples, in preparation for the remote echo search. Subroutine 312 is activated when the round trip delay exceeds local canceler training time. From module 313 control passes to module 314 (state 30) which interfaces with module 315, Cancel Local Echo on Stored Samples, and module 316, Advance to Next Sample Group, which cancel local echo on the delayed samples. When echo cancellation is completed control passes on to module 317, which is the Course Search Initiation. The various aspects of the remote echo search are carried out by special subroutines (ECRINI, ECSCOR, ECSMAG, ECSMAX, ECSFMNT, and ECSFRQ), which will be described in detail after a tour of the overall process. The Course Search Initiation ends with arrow 318 whereby, referring to FIG. 11C, arrow 318 interfaces with state module 319 (state 40). Module 319 couples to modules 320 and 321 which are respectively the Course Search Correlation and the End Course Search Correlation. It is indicated that in each of the modules the appropriate pointers and subroutines are further specified.

After the Course Search Correlation 321 is completed, one now proceeds to state module 325 (state 42) which couples to modules 326 and 327 specifying the Course Search Magnitude Squares and the End Course Search Magnitude Squares. After the End Course Magnitude Square computation is completed one now enters module 330 (State 44) which is coupled to the Course Search Integration module 341 where course search integration is performed and a course correction to the remote echo delay and frequency offset are obtained.

After course search integration is performed one now goes to module 342 (state 50) where the Fine Search Initiate 343 is depicted. The Fine Search subroutine 343 is coupled to arrow 344 to take one to FIG. 11D where control module 350 (state 52) is now accessed and interfaces with modules 351, 352 and 353 which are designated as Fine Search Correlation, Fine Search Block Initiation and End Fine Search Correlations. Thus the fine search correlations are performed on all blocks and taps and when completed one now enters module 354 (state 54), which is coupled to modules 355, 356 which are designated as Fine Search Magnitude Squares and End Fine Search Magnitude Squares.

Thus, at the end of computing the magnitude squares for the fine frequency step mode, one now enters module 358 (state 56) which interfaces with modules 356 and 360. Module 360 specifies the fine search integration. After the search magnitude squares have been finely integrated and searched for a maximum point, one now proceeds to module 361 (state 58) whereby module 361 specifies entering module 362, which is the Frequency Interpolation subroutine. Frequency Interpolation is carried out at the delay obtained in the fine search. When frequency interpolation is completed as designated by arrow 363 control proceeds to FIG. 11E where one enters module 364 (state 60) which interfaces with modules 365, 366 and 367, respectively designated as Remote Delta Tap Update, Remote Tap Update and Censor and Complete Remote Canceler Train. Modules 365, 366 and 367 train the remote canceler on the stored signal where local echo has been canceled. The remote canceler is trained wherein the remote taps are updated. The remote taps are updated according to the frequency obtained from the phase lock loop which now specifies the phase corrected or offset carrier frequency for operating with the vectors which are processed in the remote echo canceler as compared to the local carrier frequency as used by the local echo canceler.

Each coarse search correlation is the sum of the product of 30 vectors and 30 samples taken over a 25 millisecond interval. Three hundred and sixty of these are taken at four time positions, spaced 25 milliseconds apart. The stored vectors are rotated at the nominal carrier frequency (1800 Hz). Frequency errors of up to $+/-8$ Hz are anticipated. When these complex correlations are spun and the magnitude squares of the sum of the components is taken frequency differences of 3.33 Hz are clearly detectable.

Each fine search correlation is the sum of 60 vectors and 60 samples, taken over a 50 millisecond interval. Two hundred and sixteen of these are taken at 5 time positions, spaced over a 3.6 second interval. The stored vectors are rotated at the rate derived during the course search (1795 to 1805 Hz in 3.33 Hz steps. Frequency errors up to $+/-1.67$ Hz are anticipated. When these complex correlations are spun and the magnitude squares of the sums of components are taken, frequency differences of 0.6 Hz are clearly detectable.

Basically correlations with a fixed carrier error are limited in time by the size of the anticipated frequency error; hence, short correlations yield data for coarse estimates. When the carrier is corrected using the coarse estimate, then correlations can be taken over longer intervals, and frequency estimates can be made more accurately.

Figure 12A:
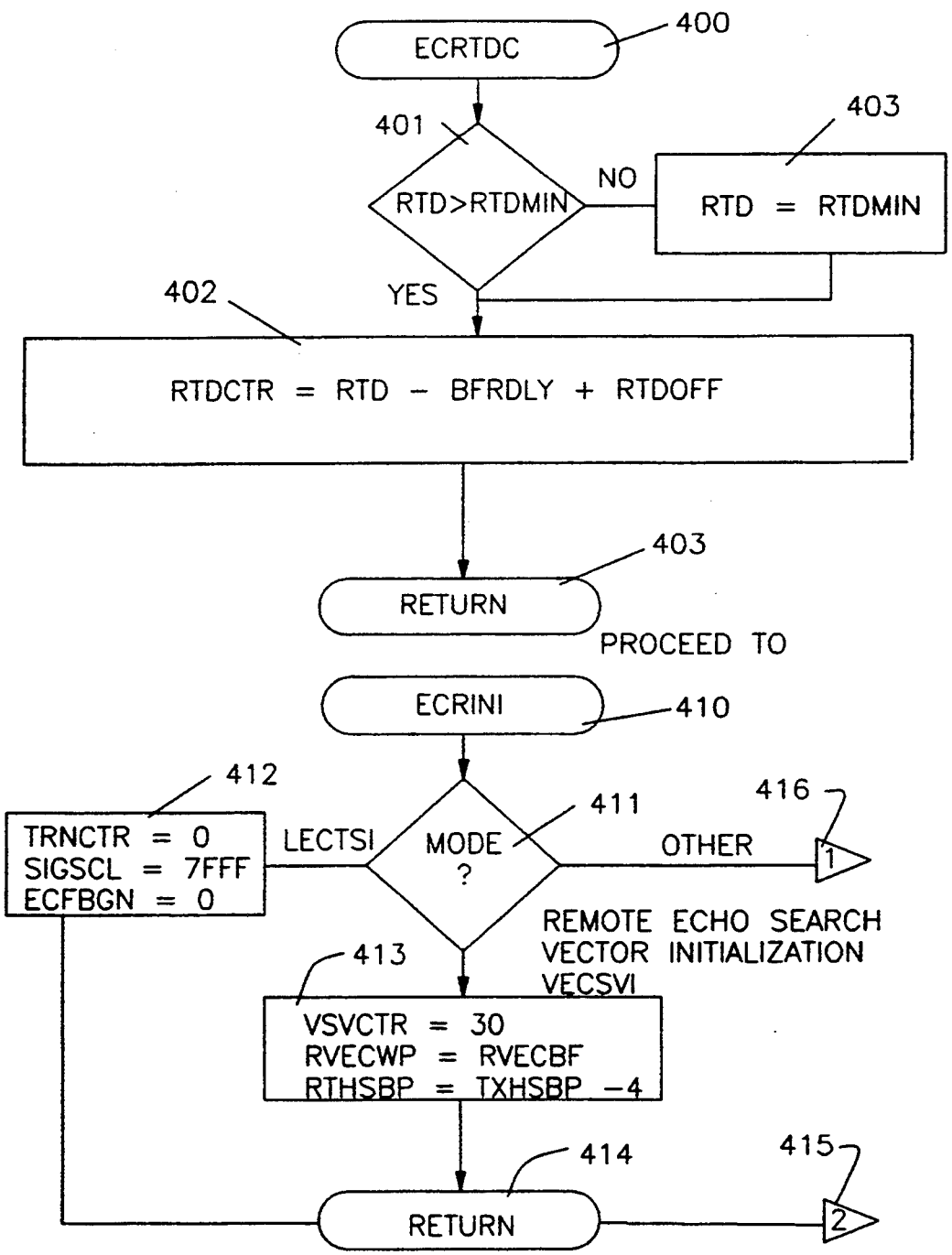
Figure 12B:
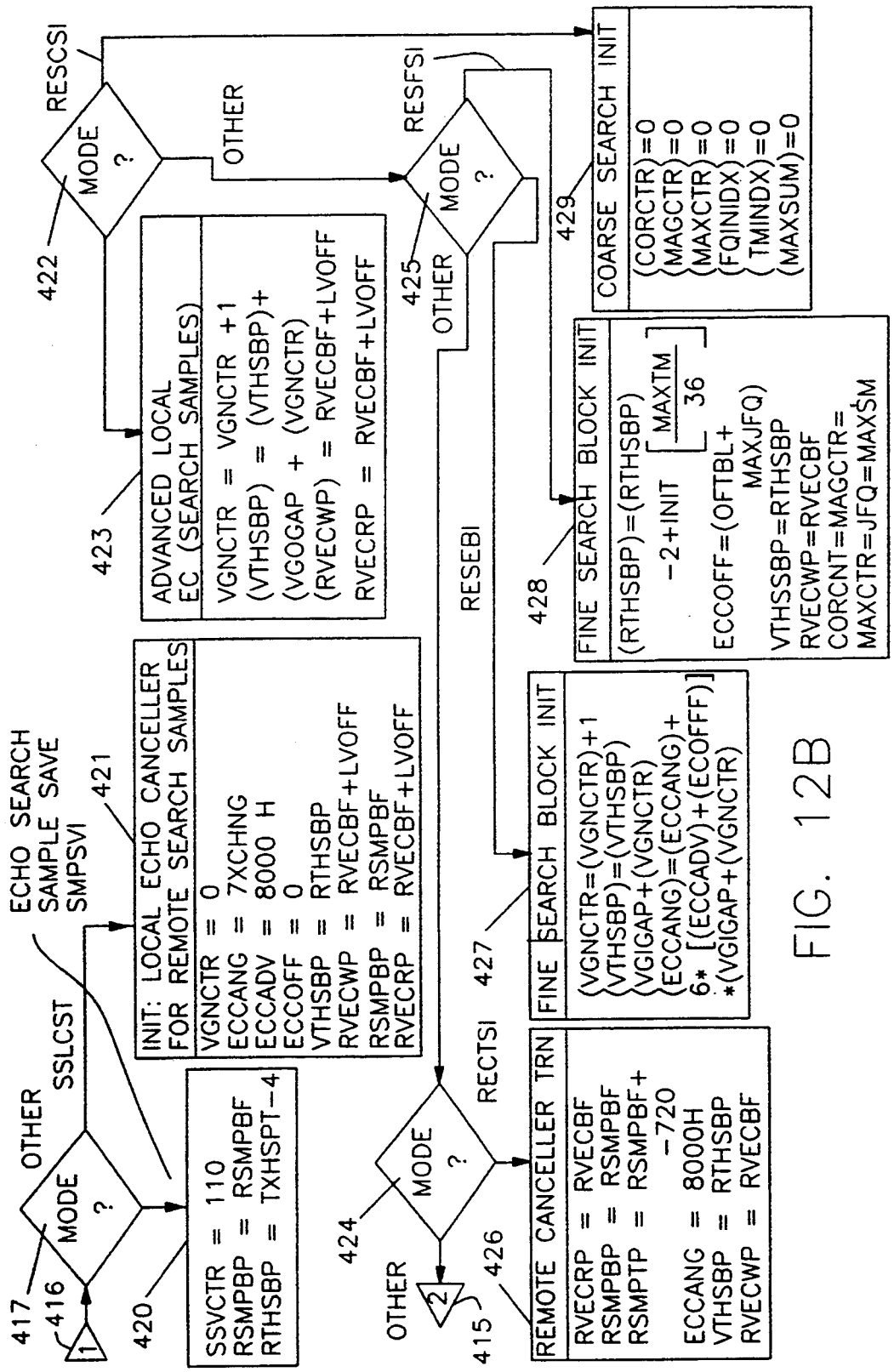
Figure 12C:
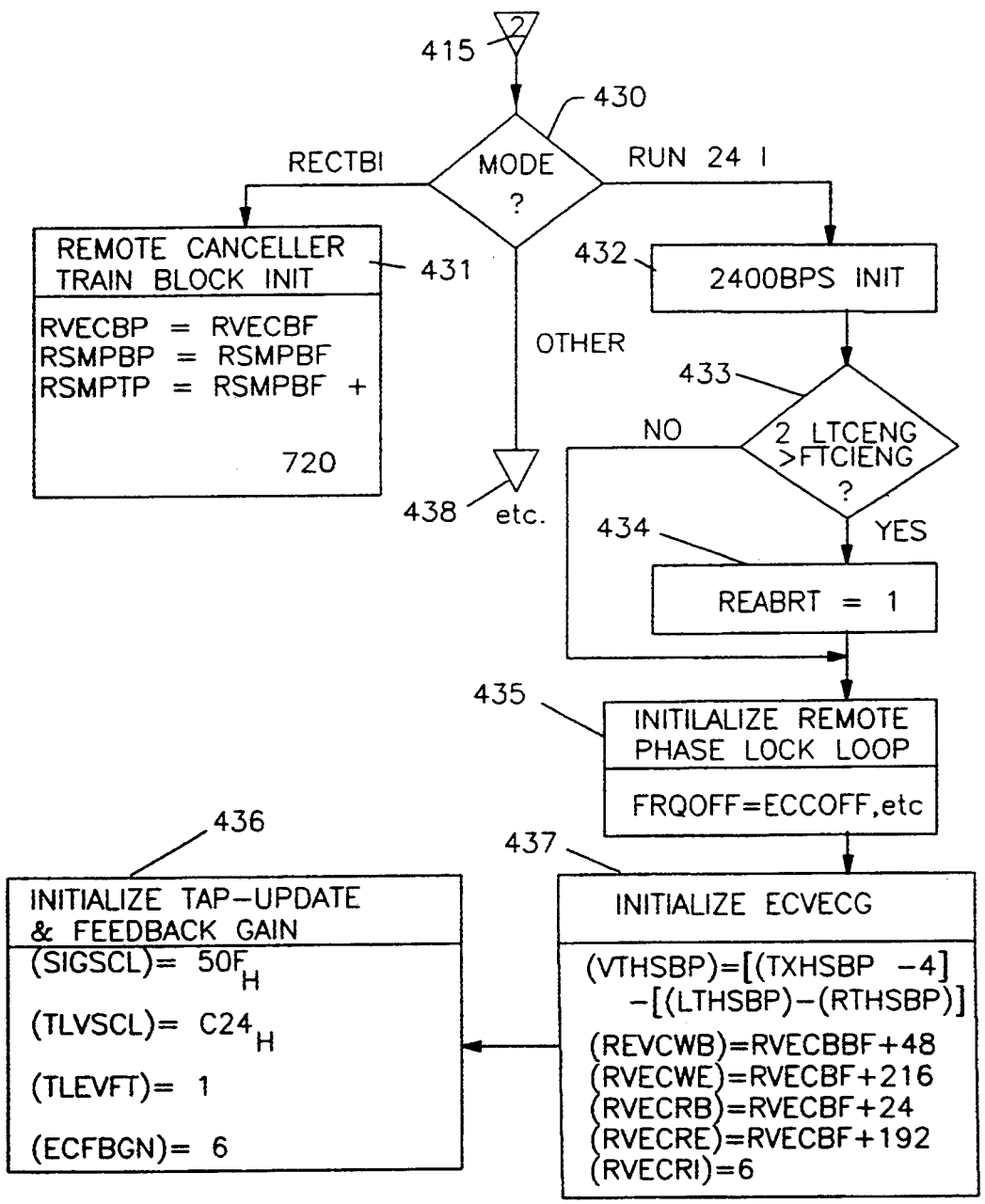

Referring to FIGS. 12A to 12C, there is the flow chart for the ECRTDC subroutine. The ECRTDC subroutine 400, as specified in FIG. 12A, initializes a roundtrip delay counter based on the value passed down from the IOP processor when the ECTRN command is received. Thus when the ECRTDC subroutine 400 is entered into, as shown in FIG. 12A, the first decision module 401 determines whether the roundtrip delay RTD is greater than a roundtrip delay rain or RTDMIN. If it is greater, then one enters module 402 where the roundtrip delay counter, which is RTDCTR, is set equal to the RTD minus BFRDLY plus RTDOFF, which is the RTD offset. Essentially, the flow chart of ECRTDC, as shown in FIGS. 12A, 12B and 12C, is indicated where RTDMIN is a minimum delay of four frames, RTDCTR is the counter,. RTD is the value passed from the IOP processor, BFRDLY is a buffer delay of three frames and RTDOFF is a centering offset of five frames.

If the roundtrip delay is greater than the minimum, then the counter is set in module 402. If it is not greater than the minimum, then one proceeds to module 403 where the roundtrip delay is set equal to the roundtrip delay minimum. After module 402 the program ends, as specified by module 403.

The Vector Save program, ECRINI, designated by module 410 in FIG. 12A, is executed immediately after the roundtrip delay counter was initialized by the ECRTDC 400. As will be explained, vector save, ECRINI 410 and Local Echo Canceler Train Initialization programs are executed immediately after ECRTDC and six vectors are saved. The saved vectors are used for operating on the echo cancelers. When ECRINI 410 is executed one enters decision module 411 which specifies the mode. One immediately can specify the local echo canceler training mode, which is LECTSI of module 412. Entering module 412 operates to initialize the local echo canceler with proper parameters. The mode module 411 can enter the remote echo search and vector initialization as depicted in module 413 where remote echo search begins with appropriate initializations. Modules 413 and 412, both terminate in the return. 414 which also receives arrow 415 from FIG. 12B.

Referring to FIG. 12B, it is shown that arrow 416 emanating from the mode decision module 411 initiates access to another mode module 417, wherein in a first mode one proceeds with the Echo Search Sample Save by entering subroutine 420 wherein samples formulated during the echo search are now saved. The other mode from module 417 enters module 421 which is the Local Echo Canceler Initialization for Remote Canceler Search Samples. In this mode the local echo canceler is initialized with search samples based on local residuals which are to be sent to the remote echo canceler for remote echo canceling. The mode module 417 accesses mode module 422 where module 422 at one output can now enter module 423 which module specifies the Advance Local Echo Canceler Search Samples. During this mode, search samples are used to advance the tap positions in the local echo canceler as described for FIG. 10.

Module 422 also enters another module 429 which is the Course Search Initialization. As one will understand, the system can perform both course and fine searches. Module 429 is the subroutine with the necessary initial parameters for the commencing of a course search. Module 422 also accesses multiple decision module 425. A first decision is associated with module 428 which is the Fine Search Initialization. Module 428 and the subroutine initializes the system for the fine search according to the relations specified therein. Decision module 425 can also access module 427 which is the Fine Search Block Initialization. As indicated, one initializes and searches for both taps and blocks. Module 427 specifies the block search. Module 425 then has an output which accesses another decision module 424. Module 424 interfaces with arrow 415 which again is directed to FIG. 12A into the return module. Module 424 can also initiate a Remote Canceler Train mode by accessing module 426.

As one will understand, the local echo canceler is trained and thereafter the remote echo canceler is trained, as specified by module 426 with the proper vector bits, as specified therein. Arrow 415 (triangle 2), as specified in FIG. 12B, also enters FIG. 12C and accesses a new decision mode module 430. Module 430 can access module 431 to initiate a subroutine designated as Remote Canceler Train Block Initialization whereby the remote canceler is now initialized with the training parameters. The module 430 can also access module 432 where it can perform an initialization run for 2400 bps by entering module 433 where parameters are now set and determined for that particular data rate. The decision module 433 determines whether the system has the proper control parameters for the 2400 bps run. If it does then the remote phase lock loop is initialized, in module 435, after it has been trained. Module 435 interfaces with module 437 where the vectors are initialized for the remote control loop and module 436 then specifies that the taps are updated and the feedback and gain factors are implemented for the remote echo canceler at the 2400 bps rate.

ECRINI is the echo canceler system initialization program. As indicated in FIG. 12 is operates off input parameters, which activate particular procedures contained in modules 412 through 437, where the parameters and functions are as given in FIG. 12D.

This completes a description of the software structure used to train the local and remote echo cancelers. We will now describe the process from a functional point of view starting with individual modules as they are encountered by the state machine (ECMACH) in FIG. 11.

Figure 13:
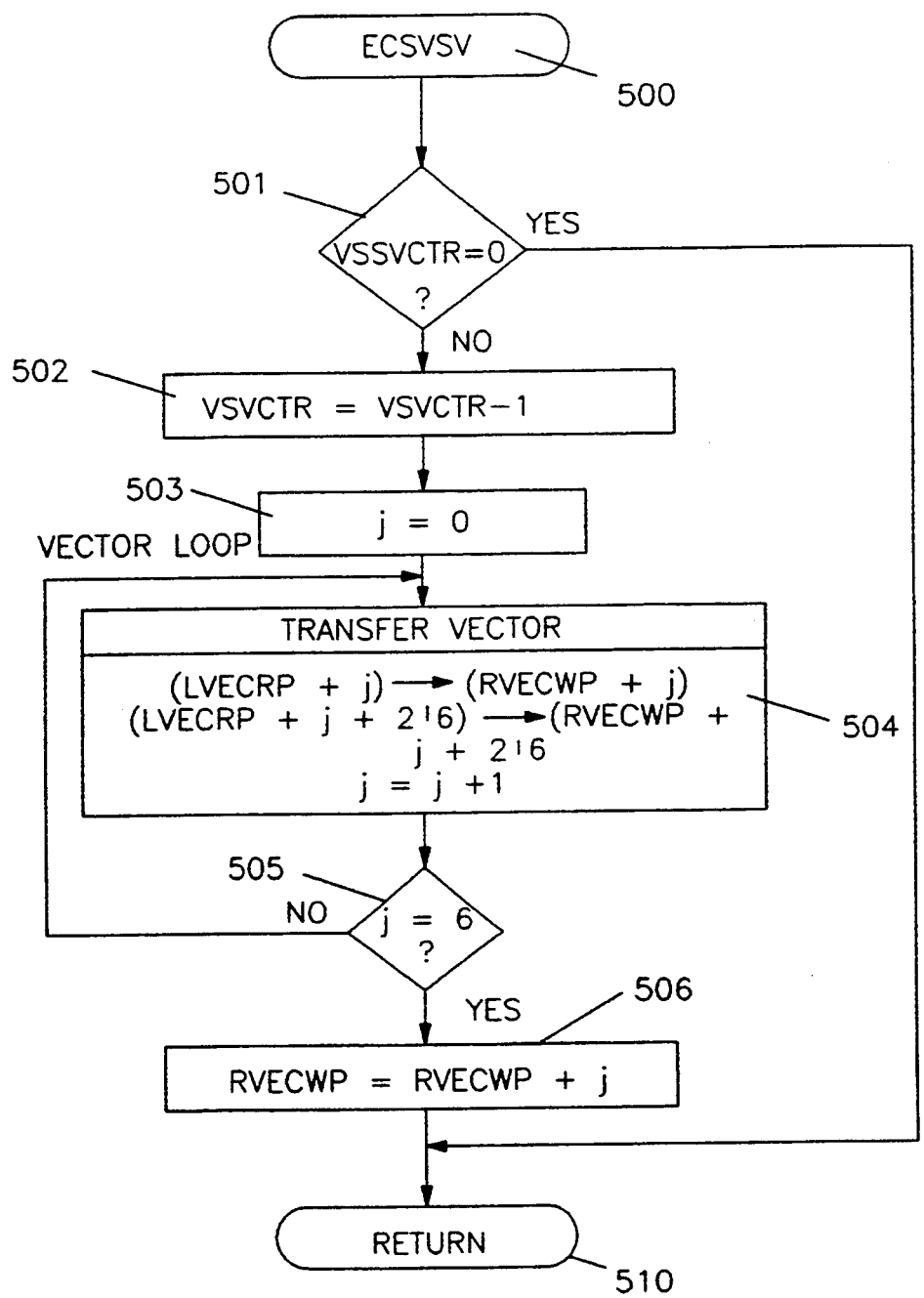
FIG. 13 is a flow chart of the ECSVSV subroutine which operates to save vectors employed with this invention.

Immediately after the train command from the IOP, vectors are saved for the remote echo search and canceler train. Referring to FIG. 13 there is shown the vector save program designated as ECSVSV 500. One goes from module 500 to decision module 501 which interrogates the vector counter to see how many vector groups are to be accumulated. If there are no vectors to be saved (VSVCTR=0) then one returns via module 510 to the main program. If vectors are to be saved (VSVCTR>0), then VCVCTR is decremented in module 502 and six vectors are saved by looping through modules 504 and 505 starting with j=0 in 503. In module 506 a transfer vector procedure is performed to generate the next vector from the transmit history sample buffer which eventually will be transferred to the remote vector buffer, as shown in FIG. 10 which stores 6 vectors per frame until the vector count (VSVCTR) goes to zero.

A vector delay is implemented in module 506 and control returns to the state machine via module 510. The number of frames of vectors (i.e. groups of six) to be saved is set by the initialization program (ECRINI, VECSVI).

The local echo canceler train is initialized at the same time as the vector save; hence local canceler train and vector save proceed concurrently. Local canceler train is as described earlier.

While in state 20 (local canceler train, FIG. 11A) or in state 25 (wait for sample store, FIG. 11B), the round trip delay count set at the beginning of the process (see ECRTDC in FIG. 11A module 300) will expire. When this happens the sample save counter is set by ECRINI, SMPSVI. The MU to linear conversion module described in FIG. 14 then stores samples over a 110 frame interval, while counting down on the sample save counter (SSVCTR). When the sample save counter expires, MULN sets the RSPSTF (remote samples storage flag), and the state machine initializes local echo cancellation on the saved samples (see ECRINI, SSLCST, FIG. 11B, module 313).

Vector save is always completed first, followed by local canceler train and sample storage.

Figure 14A:
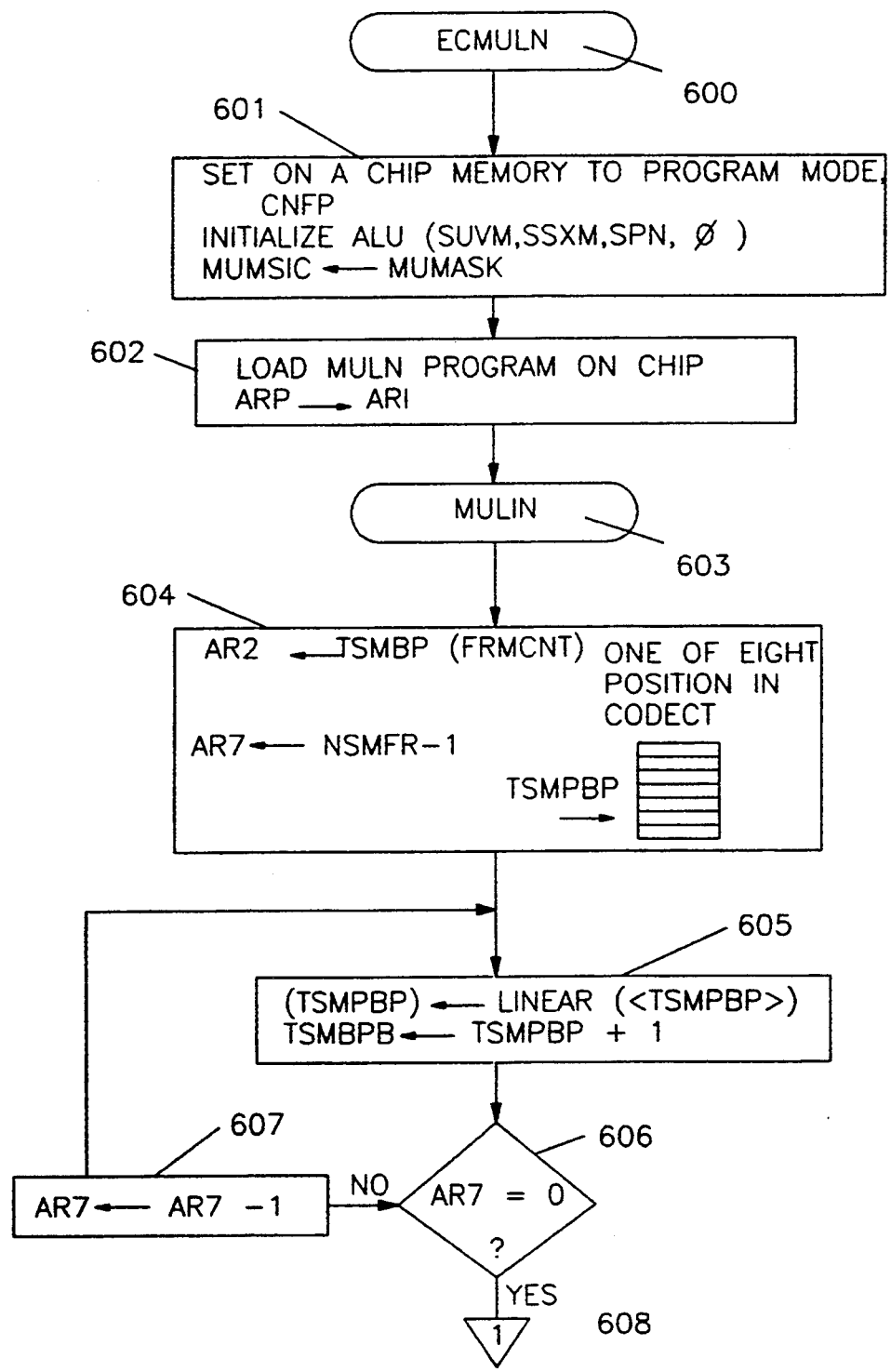
FIGS. 14A-14C depict the ECMULN and MULN subroutines where samples are processed and stored according to frame location to be employed in conjunction with the echo cancelers according to this invention.
Figure 14B:
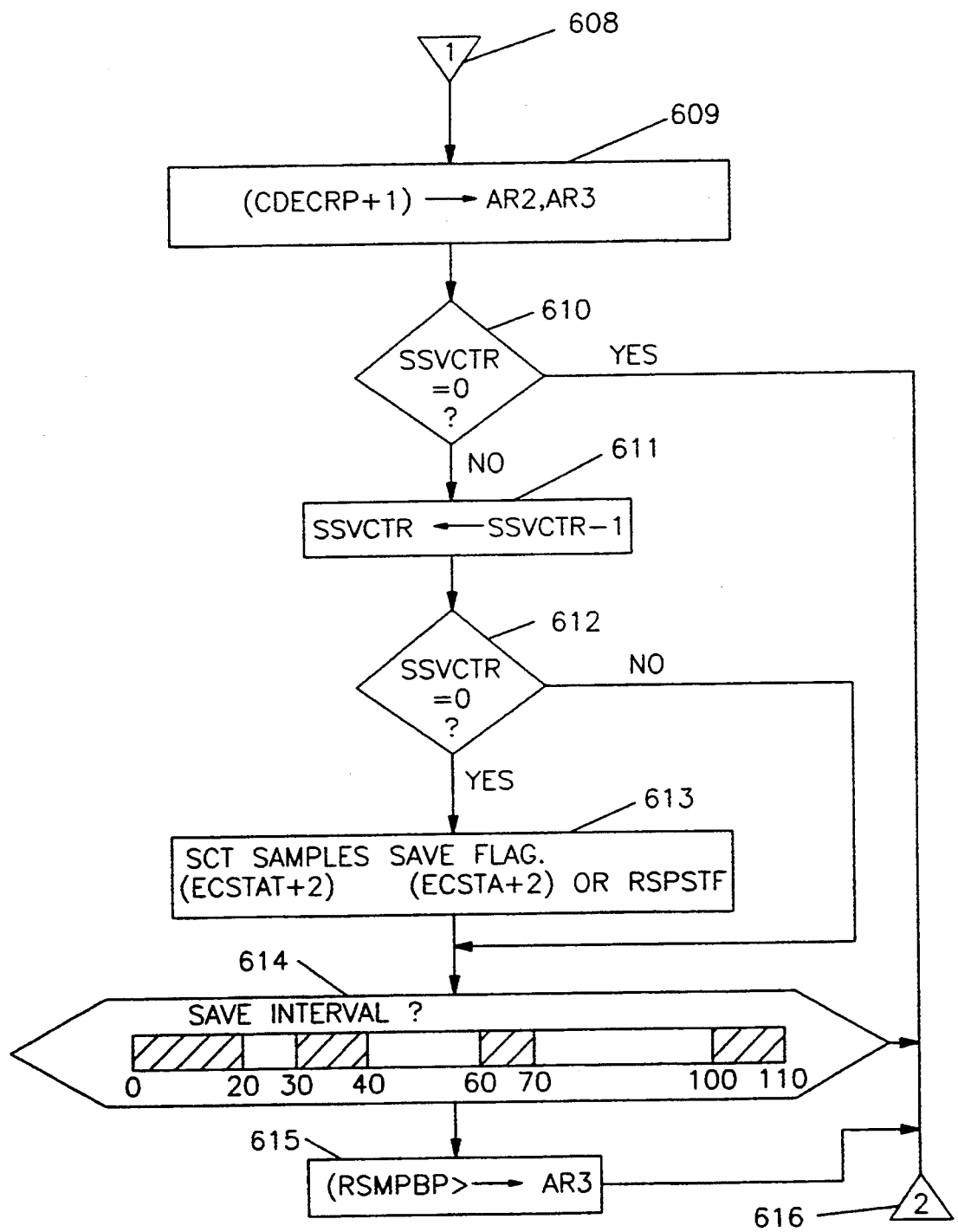
Figure 14C:
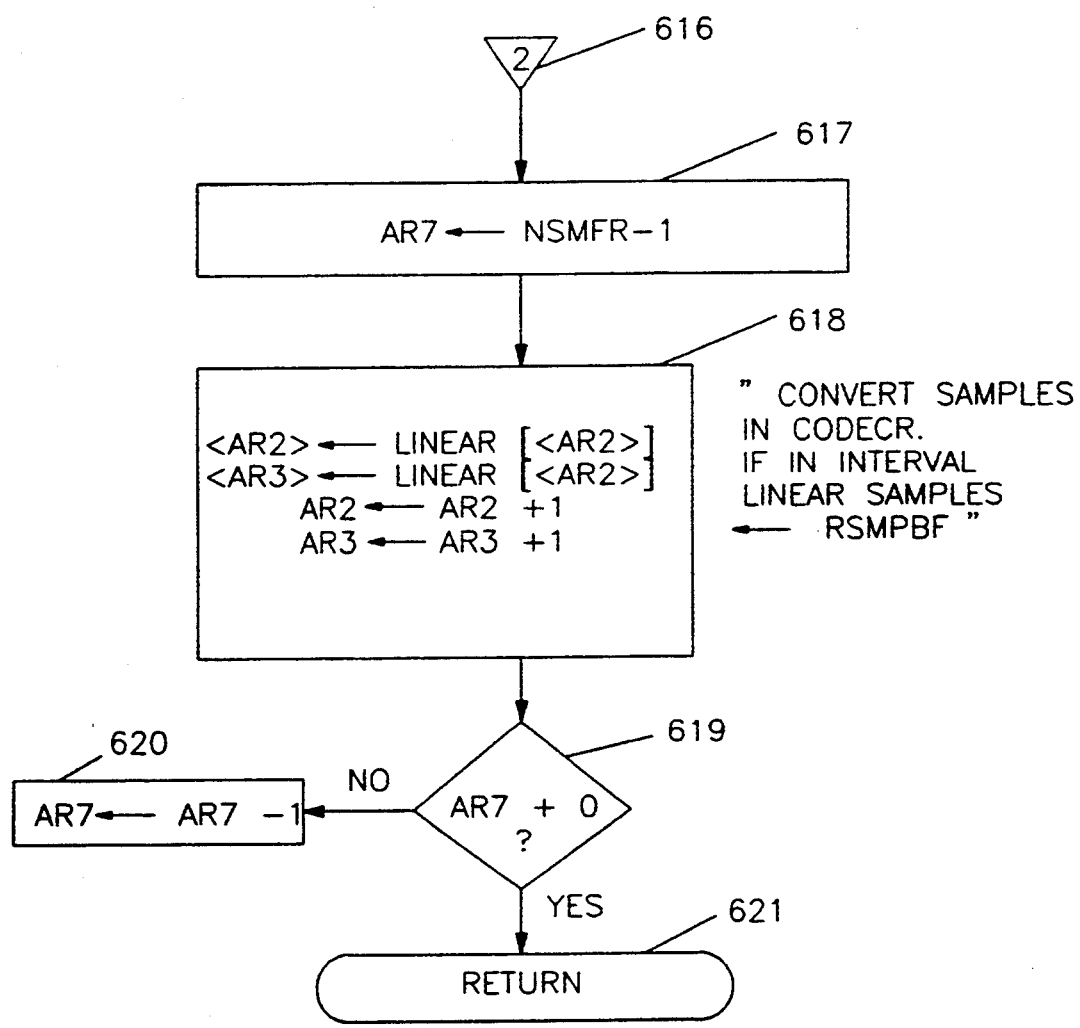

Referring to FIG. 14A to 14C there is shown the ECMULN program 600 which enters module 601 where one sets the on chip memories to the program mode, initializes the arithmetic logic units associated with the data processors and now proceeds to load the MULN program as indicated in module 602. One then enters the MULN program 603 which is designated MULN for MU law to linear conversion and operates for both the remote and local cancelers with different parameters. Module 604 specifies the selection of one of the 8 frame positions in the CODECT buffer 34 of FIG. 2. One can also note the output TSMBP which goes to the hybrid adjustment network 35 shown in FIG. 2.

The appropriate word is then converted to linear by table hook up via module 605 (i.e. a MU law word in CODECT is replaced with its linear equivalent). The process is repeated through module 606 until all the samples in a frame are transferred to module 606 to determine whether all converted in CODECT, where the number of samples per frame, NSMFM, is 36. When a frame of transmit samples has been converted to linear, control passes on to 608.

In FIG. 14B control passes to module 609 where a pointer to the receive sample buffer (CDECRP+1) is loaded into auxiliary registers 2 and 3. Module 610 is a decision module which determines if there are samples to be saved for the remote echo search. If all samples have been taken care of (i.e. if SSVCTR=0), then control passes to FIG. 14C via path 616. If SSVCTR>0 then control passes through modules 611, 612, 614 and 615. If samples must be saved (i.e. if SSVCTR>0 and SSVCTR is on a save interval, see module 614) then a pointer to the save buffer is loaded into auxiliary register 3. FIG. 14C shows a sample loop where NSMFR=36 samples are loaded to the addresses in auxiliary registers 2 and 3 (see modules 617, 618, 619 and 620). If samples are to be saved, samples from the receive buffer are converted to linear and put back in the receive buffer and into the save buffer. If no, both pointers point to the receive buffer and none are saved. When the last sample is saved the remote sample storage event (RSPSTF) is set and the state machine initializes the local echo canceler for removal of local echo on the stored samples (see ECRINI, SSVCST in module 313, FIG. 11B). Return from MULN is via module 621.

The flow chart of ECMULN, as specified in FIGS. 14A to 14C, shows that samples at frames 0-19, 30-39, 60-69 and 100-109 on a 110 frame interval are stored in RSMBPF. (See module 615 of FIG. 14B).

FIG. 15 shows the remote echo search sample store whereby it shows each of the stored samples for each of the frames including sample numbers. Hence, FIG. 15 is a remote echo search sample store table which essentially is stored in memory. When all the delayed samples are stored, the remote sample store flag event RSPSTF is set in MULN as indicated in FIG. 14B. When this occurs, the local echo canceler parameters are set up to cancel local echoes on the saved samples. See module 315 of FIG. 11B and module 421 of FIG. 12B.

Thirty vectors are generated from the TSHSBF buffer 32 and put into the RVECBF buffer 57 of FIG. 2. Timers are set and control passes on to state 30 designated by numeral 314 of FIG. 11B. In state 30 the local echo canceler is run off RVECBP and RSMPBP at two times real time to remove local echo on the delayed samples. After each cancellation run, 12 vectors are generated from RTHSBP to keep the local canceler supplied with vectors. Every five frames the vector position is reinitialized to skip over time gaps in the sample store. See module 316 in FIG. 11B and module 423 in FIG. 12B. After a lapse of 25 frames the TIMOT1 event occurs. See modules 319, FIG. 11C and 325, 330, 354, 364 of FIGS. 11A-11E.

The TIMOT1 event marks the end of local echo cancellation on the delayed samples. Upon leaving state 30, as 314 of FIG. 11B, the system is initialized for the course remote echo search. See modules 320, 321, 326, 327 of FIG. 11C. See module 429 in FIG. 12B. The course search is carried out in three steps, Correlation in state 40 which is specified in FIG. 11C as module 319; Magnitude Squares in state 42, which is module 325 in FIG. 11C; and Integration in state 44, which is module 330 in FIG. 11C. Dot products of vector components in RVECBF (57 of FIG. 1) with samples from RSMPBF are taken to obtain complex correlations at 360 sample delays (T-354 through T+5), using a general purpose correlator routine designated as ECSCOR.

Figure 17:
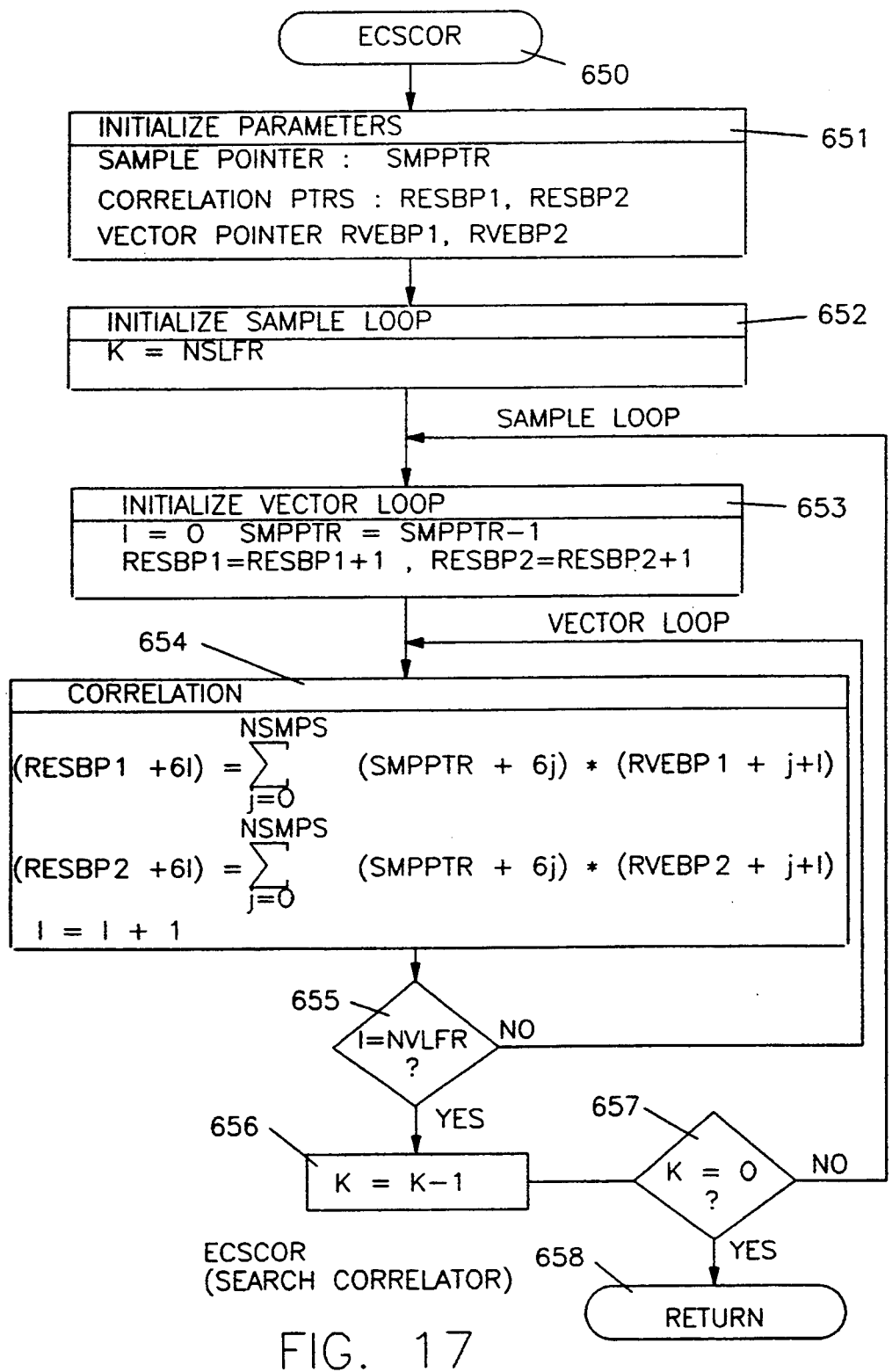
FIG. 17 is a flow chart depicting the ECSCOR subroutine which is a search correlation routine implemented by this system.

Referring to FIG. 17 there is shown a flow diagram of ECSCOR which is the search correlator. The subroutine commences at module 650. Basically the ECSCOR routine 650 is driven from a parameter table which is mode dependent. A call to ECSCOR 650 uses the course parameters table shown in FIG. 18. There is also shown course search vectors which were derived previously and are shown in FIG. 16. The ECSCOR 650 enters module 651 where the parameters are initialized, sample, vector and correlation pointers are specified. In module 652 the sample loop is initiated which sets the number of groups equal to NSLFR. One then enters module 653 where the vector loop is initialized and one then enters module 654, which is the correlation algorithm. Correlation is performed in module 654 where the decision module 655 is entered to determine whether or not all samples and vectors have been correlated. If they have not been then one returns to either the vector loop and performs vector correlation in module 654 or one then enters the group determination module 656 to determine whether K is zero. If it is not zero then one goes and continues the sample loop by entering module 653 again. If all groups have been taken care of then one returns to the main program as indicated by module 658.

The ECSCOR loads 90 vectors which are correlated with NSLFR+1 equals three groups of 30 samples at NVLFR=60 lags to obtain 60 complex correlations spaced six samples apart. This is shown in FIG. 17 within the vector loop depicted in module 653. There are eight separate calls to the ECSCOR program 650 which yields four sets of complex correlation displaced by 180 samples in time. The coarse search correlations are shown in FIG. 19 which basically shows the 8 calls specified in call counts and shows the vectors in regard to time position and correlation lag. FIG. 19 thus shows a depiction of the course search correlations which are generated by the ECSCOR search correlator subroutine of FIG. 17 utilizing the course search parameters depicted in FIG. 18.

Figure 11C:
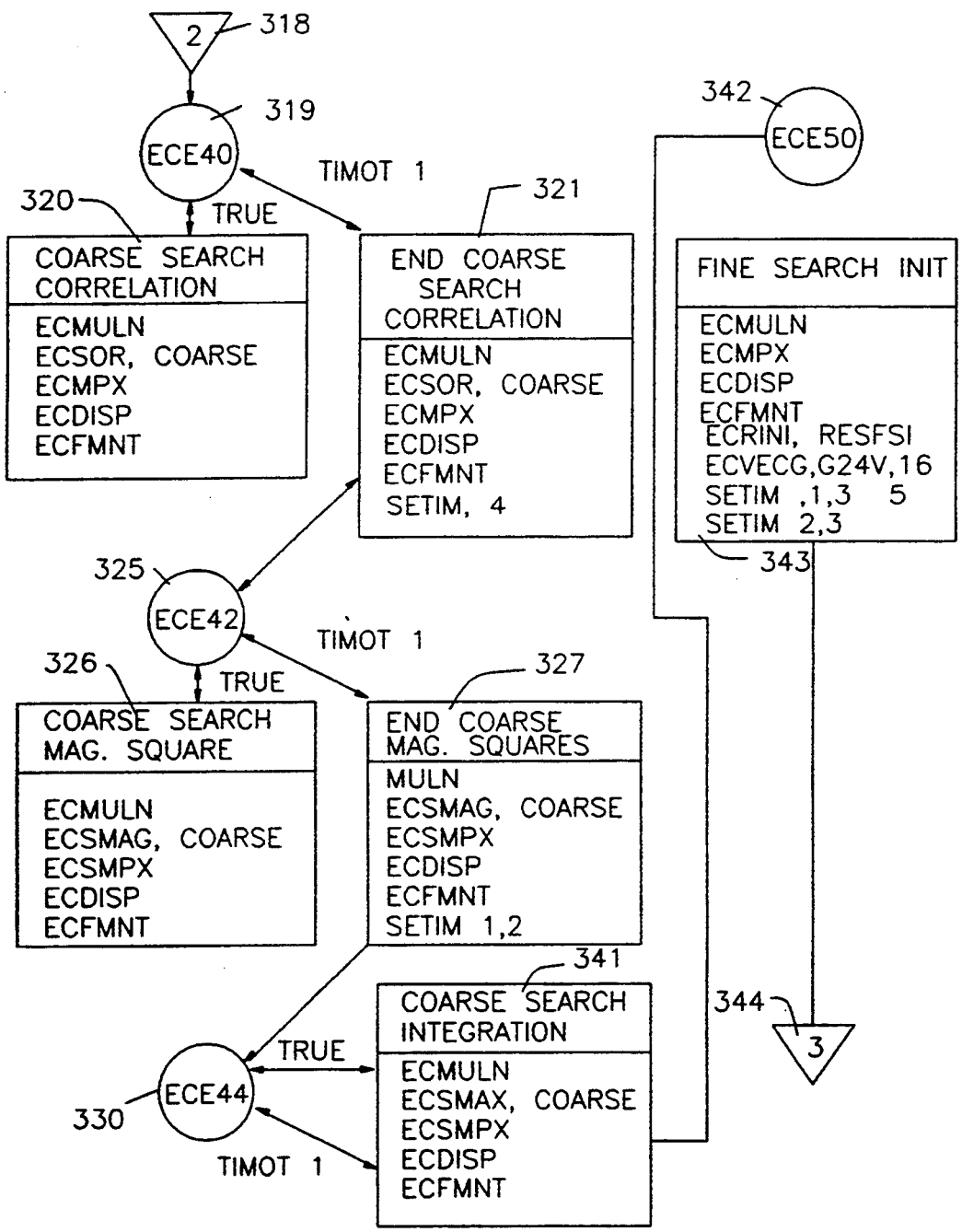

After eight flames the ECMACH program moves on to state 42 which is shown in FIG. 11C as module 325. State 42 converts the complex correlations thus described into magnitude squares (module 326 of FIG. 11C). In the course mode an ESCMAG routine depicted in FIG. 20 is implemented. The routine uses the parameters specified in FIG. 21. As will be explained, the ESCMAG loads NBLKS equal 4 complex correlations at each of NSMFR equal 90 sample lags, and finds the sum of the in-phase and quadrature components with the correlations rotated as a function of time displacement using the TRIGT equal CTRITG tables.

Figure 20A:
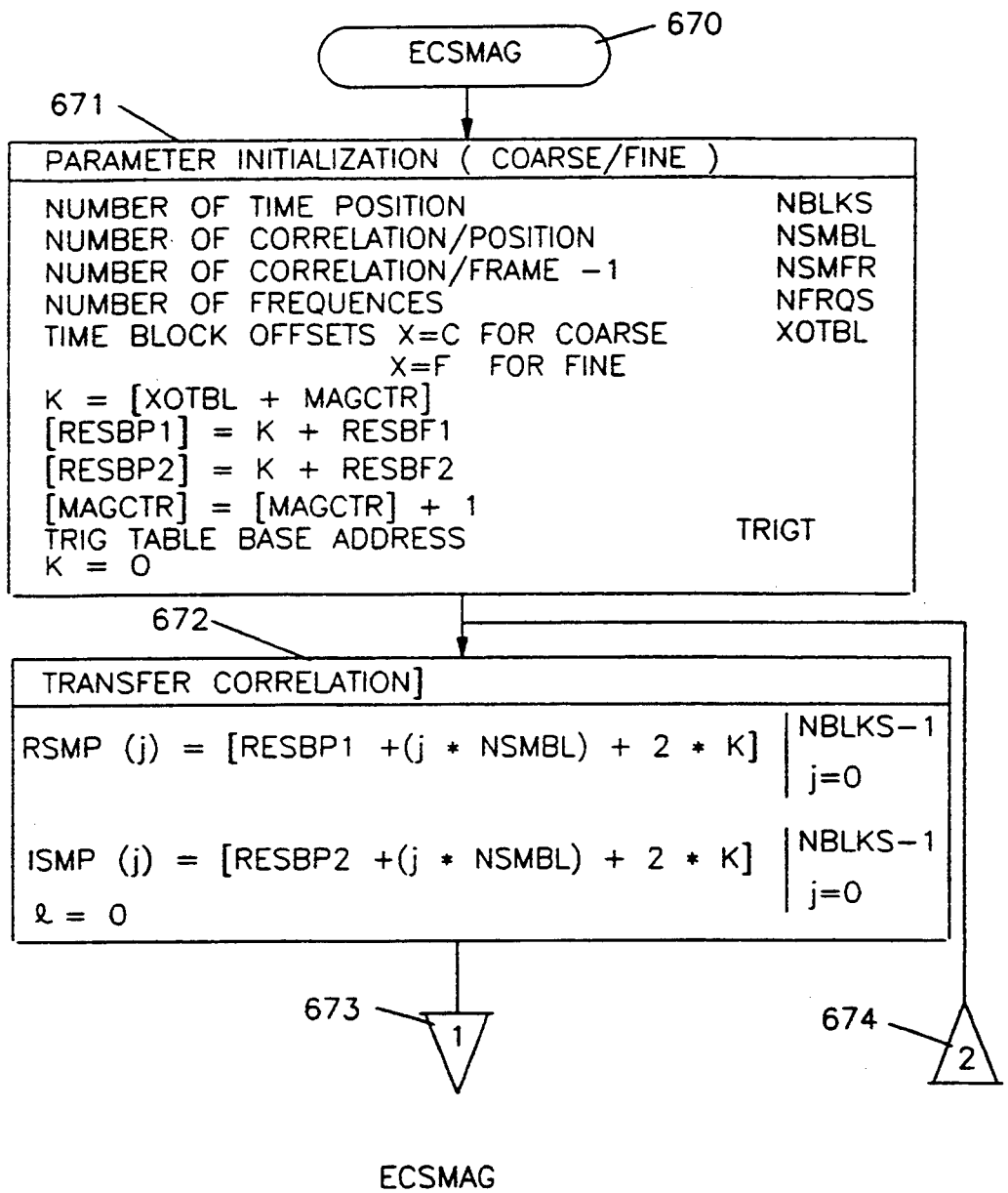
FIGS. 20A and 20B are flow charts showing subroutine ECSMAG which is employed to compute the magnitude of squares present at four different frequencies for use in this system.
Figure 20B:
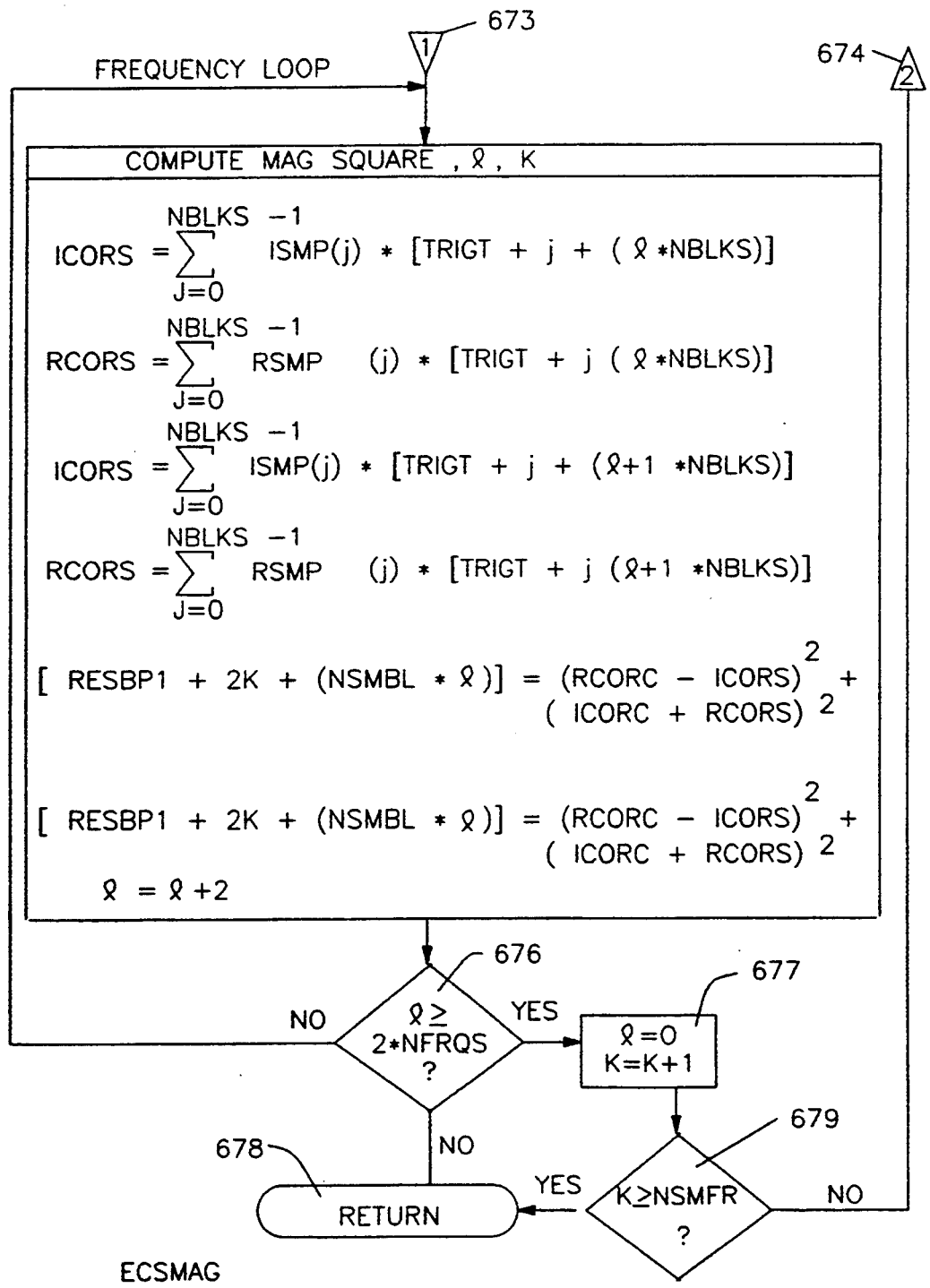

The sum of the in-phase components is squared and added to the square of the sum of the quadrature components as shown in FIG. 20B. Magnitude squares are calculated for +5 Hz, −5 Hz, +1.67 Hz and −0.167 Hz rotation rates and stored in RESBF1 and RESBF2 spaced at intervals of NSMBL=360 samples. Pointers to RESBF1 and RESBF2 are advanced as a function of MAGCTR, a call counter which points to an offset table (XOTBL=COTBL). Using this mechanism four calls to ECSMAG are required to generate 360 double precision magnitude squares spun at 4 frequencies formatted as indicated and shown in FIG. 22.

Referring to FIGS. 20A and 20B there is shown the ECSMAG subroutine 670 which enters a parameter initialization module 671 where the number of time positions, number of correlations, the number of correlations per frame and the number of frequencies are all defined. The parameter initialization enters Transfer Correlations module 672 where the various parameters are now transferred and correlated according to the algorithms depicted therein. Once finished one now enters module 675 in FIG. 20B where one computes the magnitude square of the various samples and groups according to the algorithms depicted therein. Module 676 determines whether or not all samples have been processed. If they have then one determines whether or not all transfer correlations and all groups have been computed in module 679 according to the NSMFR number as indicated. If all groups have been accommodated then one returns to the main program via 678. If they have not been accommodated then one goes from module 679 via arrow 674 back to the transfer correlations in module 672, thus continuing the ECSMAG routine.

As shown in FIG. 21, the course search magnitude square or parameters tables are those parameters which are employed by the ECSMAG routine. These parameters are stored in suitable memory and revolve the sine/cosine functions which, as indicated, are stored in Table 249 depicted in FIG. 10. The course search magnitude squares which are generated by the ECSMAG routine are depicted in FIG. 22 for the address and contents at each address.

Thus, after completing the double precision magnitude squares, which are spun at four different frequencies and formatted as indicated in FIG. 22, one now enters state 44 which is depicted in FIG. 11C as module 330. In state 44 the controller calls ECSMAX, which is a parameterized subroutine which integrates magnitude squares over a number of samples (NSMSM) and finds the maximum point in the time/frequency array generated by ECSMAG. In the course mode, ECSMAX takes the sum of NSMSM=36 magnitude squares at NSMFQ=325 lags and stores the maximum value (MAXSM) and its time position, MAXTM. Upon completion of this task the task is repeated NFQFR−1=1 times. The frequency group where the maximum is found (MAXJFQ), as well as the time position within that group (MASTM), and the maximum value (MAXSM) is saved. Two calls are made to ECSMAX. On the first call the ±5 Hz groups are searched and on the second call the ±1.67 Hz are searched.

Figure 23A:
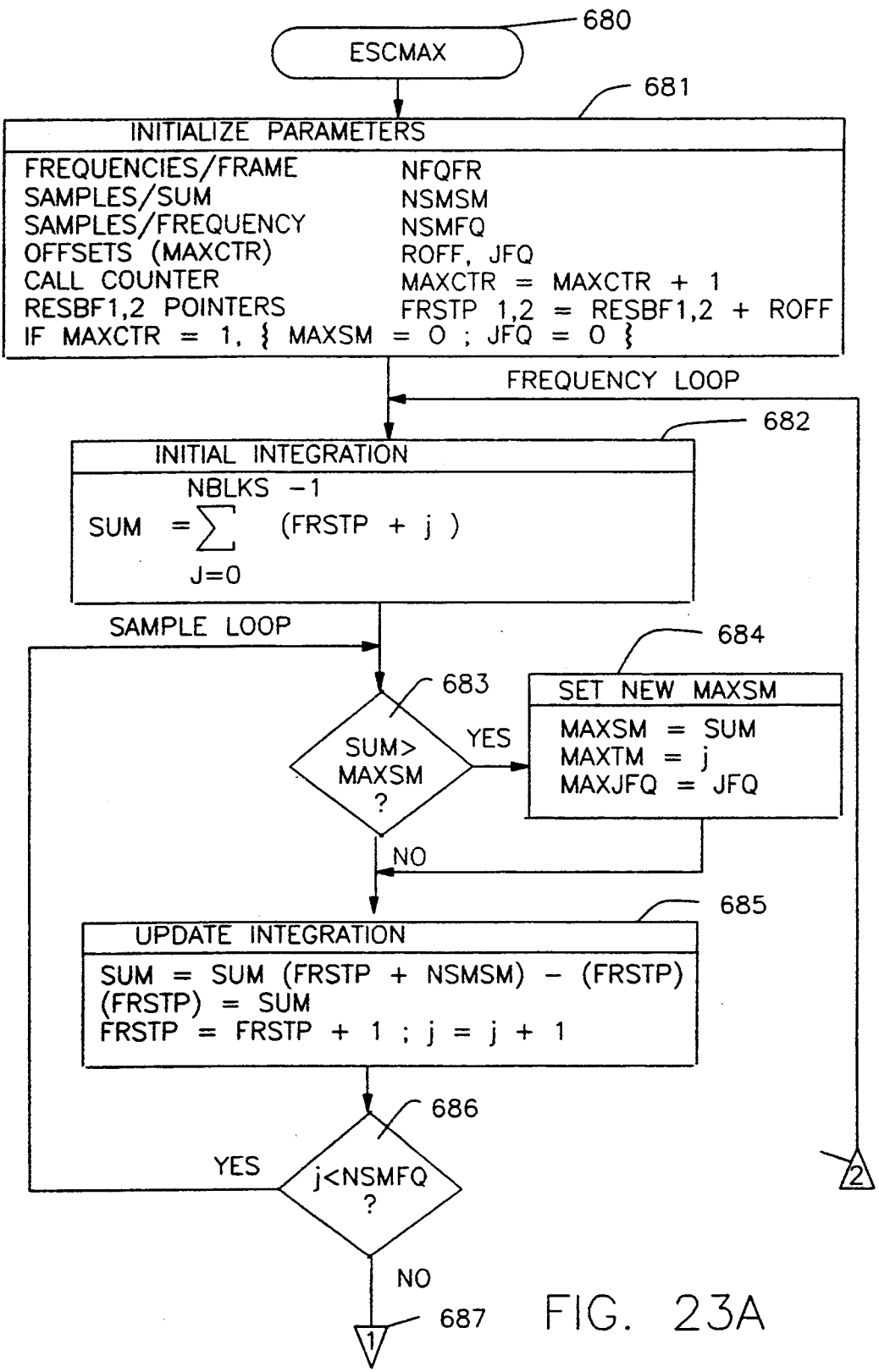
FIGS. 23A and 23B are flow charts depicting subroutine ECSMAX which integrates magnitude squares over a number of samples to find the maximum point in a time frequency array generated by ECSMAG program.
Figure 23B:
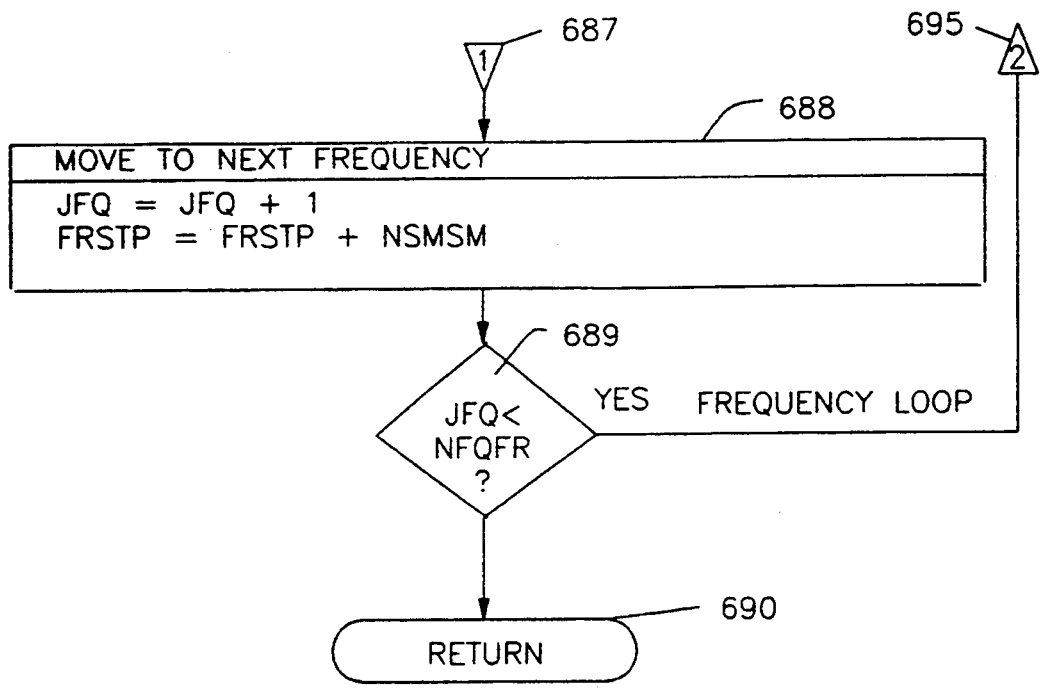

A flow chart of ESCMAX is shown in FIGS. 23A and 23B and parameters for the course search utilized by ECSMAX is depicted in FIG. 24. Referring to FIG. 23A, ECSMAX of module 680 enters module 681 where parameters are initialized as shown, frequencies per frame, samples per sum and so on as indicated in module 681. After initialization of the parameters one now enters module 682 where initial integration is performed. After initial integration is performed on a given number of samples, one then enters into the sum decision module 683 to determine whether the sum exceeds the given value MAXN. If the sum exceeds the given value then one sets a new maximum sum in module 684, as specified therein. If one does not exceed the sum then one enters module 685 where it updates the integration. After updating the integration one enters decision module 686 to determine whether or not the NSMFQ exceeds the number of samples. If it does then one goes to the sample loop and enters decision module 683 again. If it does not, one then enters 687 which enters module 688 (FIG. 23B) and one moves to the next frequency, as defined in module 688. After moving to the next frequency one then determines whether all frequencies have been accommodated. If they have been accommodated then one goes via arrow 691 back to the frequency loop. If all frequencies have been accommodated then one returns to the main program, as 690.

FIG. 24 shows the course search parameters used for the ECSMAX program depicted in 23A and 23B. The course search is completed in 14 frames or 70 milliseconds.

Returning to FIG. 11C the system now enters state 50 which is depicted by module 342 where a fine search is initiated, as shown in module 343. Initialization for the fine search is completed in state 50. See module 428 of FIG. 12B and module 343 of FIG. 11C. The remote history buffer pointer (RTHSBP) is adjusted based on the course search time position (MAXTM) and the carrier offset (ECCOFF) is adjusted to reflect the frequency offset obtained in the course search (MAXJFQ). See module 428 of FIG. 12B. The vector generator is initialized to read from RTHSBP and write to RVECBF. The ECSCOR, ECSMAG and ECSMAX call counters and the search constants are zero.

Following this initialization the vector generator is run 16 times to produce 96 complex vectors in RVECBF as indicated in FIG. 25, flames 0 through 2. Thus FIG. 25 shows the X and Y complex outputs for each of the flames depicted in the columns 0-2, 3-5 . . . 12-14. This is the vector buffer used for the fine search where the X and Y outputs are obtained from the complex generator as for example generator TXCIG 30 of FIG. 2.

Figure 11D:
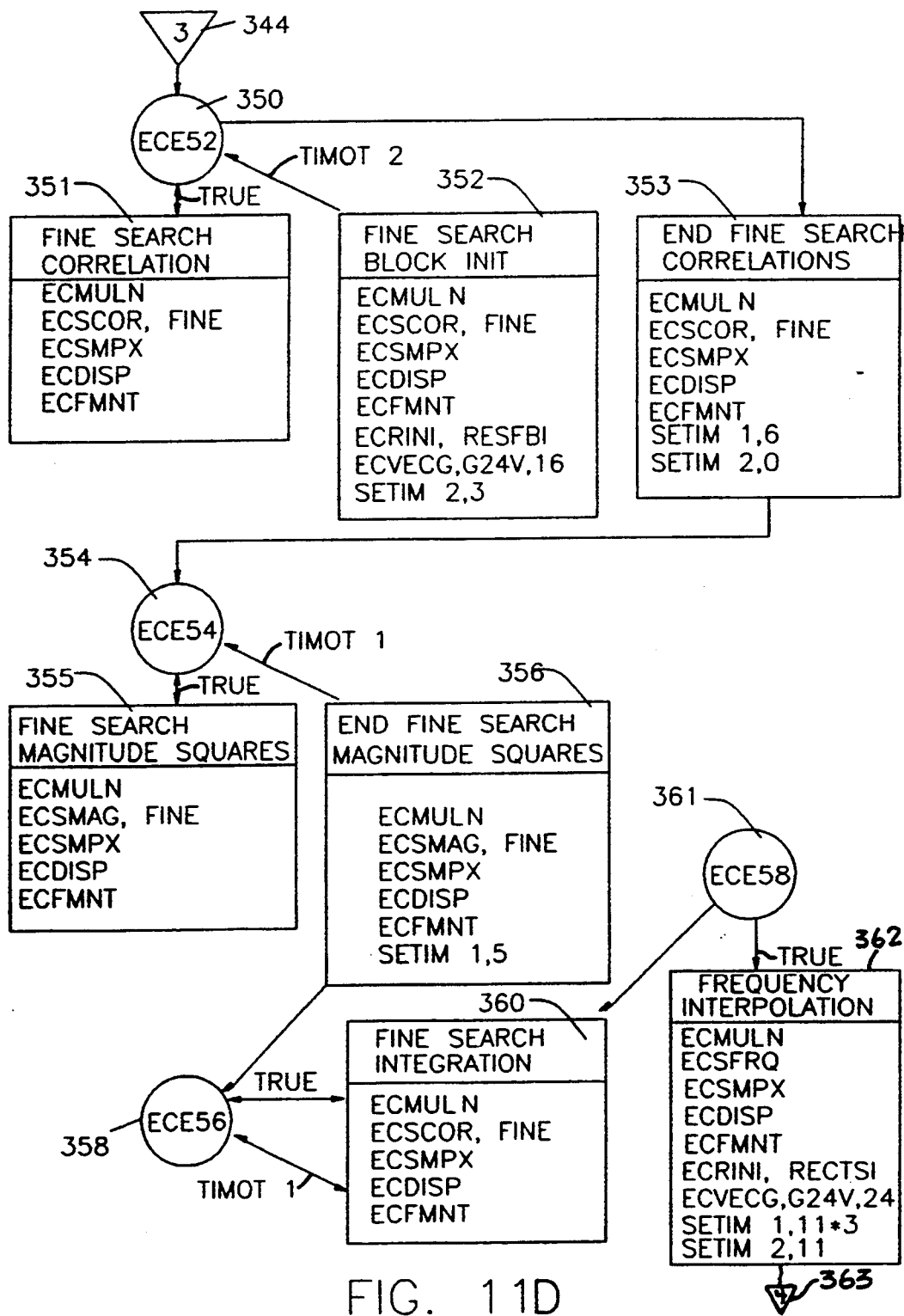

Referring to FIG. 11D, one now enters state 52 depicted by module 350. In state 52 the ECSOR routine correlates 60 vectors with 60 samples spaced six samples apart to obtain a fine search correlation in module 351. This takes dot products at 36 lags and stores the resulting correlations at every six locations in RESBF1 and RESBF2. The sample pointer (SMPPTR) is then incremented and the process is repeated for samples shifted by 1. In this manner ECSCOR completes 216 complex correlations on the first block of samples after three calls (TIMER2=3). Initialization for successive blocks is carried out in ECRINI, RESBFI, where a block counter (VGNCTR) is used to access VTHSBP increments and to calculate carrier angle advance across the gap. Immediately after ECRINI, RESFBI the vector generator is run 16 times to produce 96 vectors in RVECBF as indicated in FIG. 25. ESCOR processes 5 blocks using the vectors indicted in FIG. 25, the samples in FIG. 15 and the parameters shown in FIG. 26.

Complex correlations for the fine search are completed after 15 flames (i.e. following TIMOT1) and are stored in RESBF1 and RESBF2 as indicated in FIG. 27. FIG. 27 shows the address where each correlation component is stored and the processing flames. In FIG. 27 $\tau$ (tau) is the round trip delay plus the course search adjustment. The complex correlations are converted to spun magnitude squares using the ECSMAG routine of FIG. 20A and 20B. The fine parameters employed in this routine are those shown in FIGS. 28A and 28B which depict the fine search magnitude square parameter tables.

As one can see from FIG. 11D, module 354 depicts state 54, the ECSMAG routine is called 6 times in that state. On each call ECSMAG converts NSMFR=36 complex correlation in five time positions to 36 magnitude square spun at 2*NFRQS=10 frequencies. After six calls, 216 double precision magnitude squares at 10 frequencies are stored, as indicated in FIG. 29 where there is shown the address and contents of the fine search magnitude squares. The least significant parts of the magnitude squares are stored at RESBF2 in exactly the same format shown for the most significant words in FIG. 29.

Referring to FIG. 11D there is shown module 358 which refers to state 56. In state 56 the ECSMAX routine is called five times with fine search parameters (see FIG. 11D, modules 360 and FIG. 30 where the fine search parameters for ECSMAX are shown). On each call NFQFR=2 frequency groups are integrated and searched. The integrations are the sum of groups NSMSM=36 samples taken at 181 time positions in each of two frequency arrays. The search is completed after five calls. In addition to locating the maximum integrated time position, MAXTM, and frequency index, MAXJFQ, the ECSMAX routine 680 of FIGS. 23A and 23B stores the integrated sums in RESBF1 and RESBF2 as shown in FIG. 31 which shows the stored sums for each of the different time delays and sample numbers.

After the integration and search in ECMACH state 56 or module 358 of FIG. 11D control passes on to state 58 shown as module 361 of FIG. 11D where frequency interpolation is accommodated as shown in module 362. State 58 provides a call to ECRINI, RECTSI which is depicted in module 362 and module 426 of FIG. 12B. The vector generator ECVECG is then run 24 times to produce 144 vectors for the remote canceler train. Timers are then set, as indicated in FIG. 11D and ECMACH control passes on to state 60.

Figure 11E:
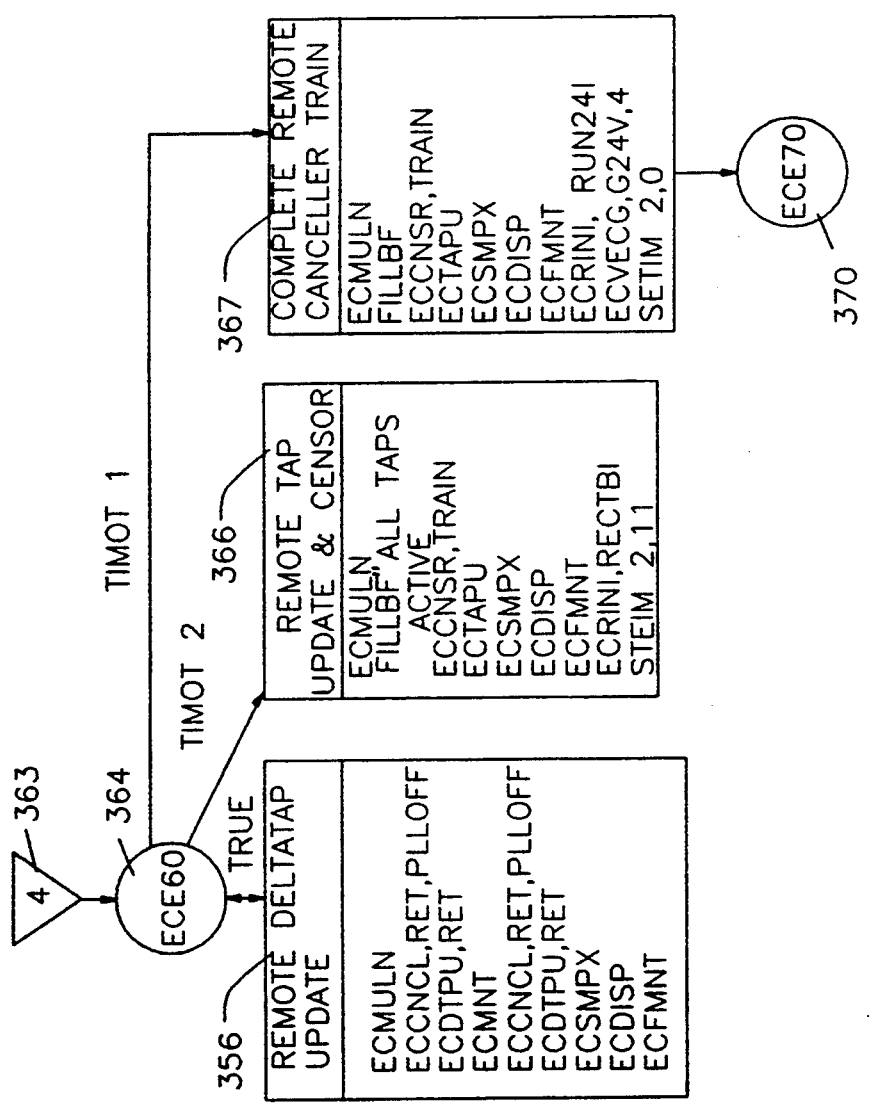

Depicted in FIG. 11E is module 364. In state 60 the remote canceler is trained three times on the first 720 samples in RSMBPF, as shown in module 367. The output is to RSMPBF +720 and above. The input samples and vectors remain fixed. The normal training procedure is used with delta tap updates proceeding at two times real time (FIG. 11E). When the three training cycles are completed, the system is initialized to run at 2400 bps (FIGS. 11E and 12C). Remote echo energy before (FTCENG) and after (LTCENG) remote echo training is compared. If the energy has not been reduced to half its initial value or less, the remote canceler abort flag is set (REABRT=1). The vector generator pointer VTHSBP is set at the proper distance from the transmit point, TXHSBP, for cancellation of remote echo on receive samples at (CDECRP+1), and the tap update parameters are initialized for traffic. (This is shown in FIG. 12C. See modules 432, 433, 434, 435 and 437.) This completes the remote echo search.

Hence, as one can ascertain from the above, a remote echo search is performed whereby remote echoes are responded to and then canceled. The remote echo canceler uses the same canceling procedures and delay line arrangements as the local echo canceler but utilizes a phase lock loop operative with an offset carrier frequency which carrier frequency is substituted for the carrier frequency utilized in the local echo canceler loop. The vectors that are provided for by the remote echo canceler are rotated or spun based on the frequency of the phase lock loop.

Figure 32:
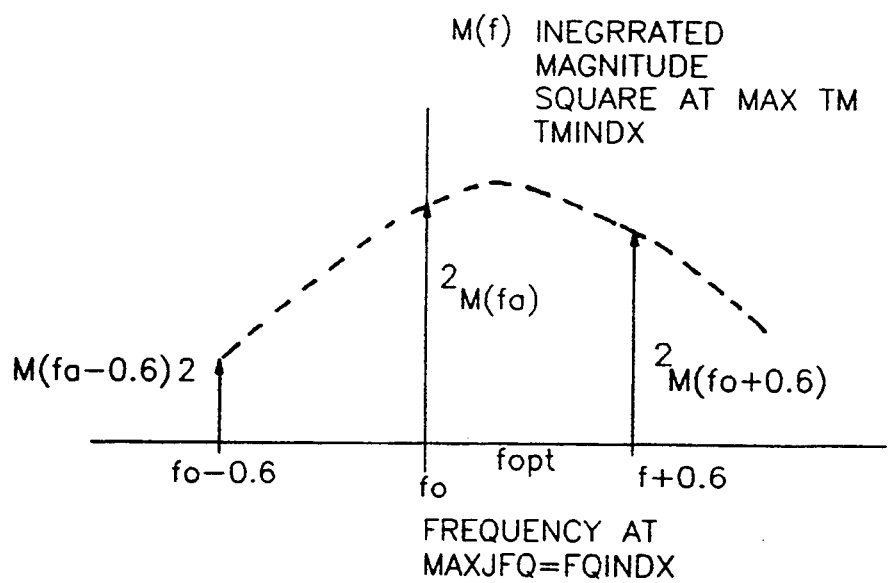
FIG. 32 is a graph depicting frequency interpolation according to this invention.
Figure 33:
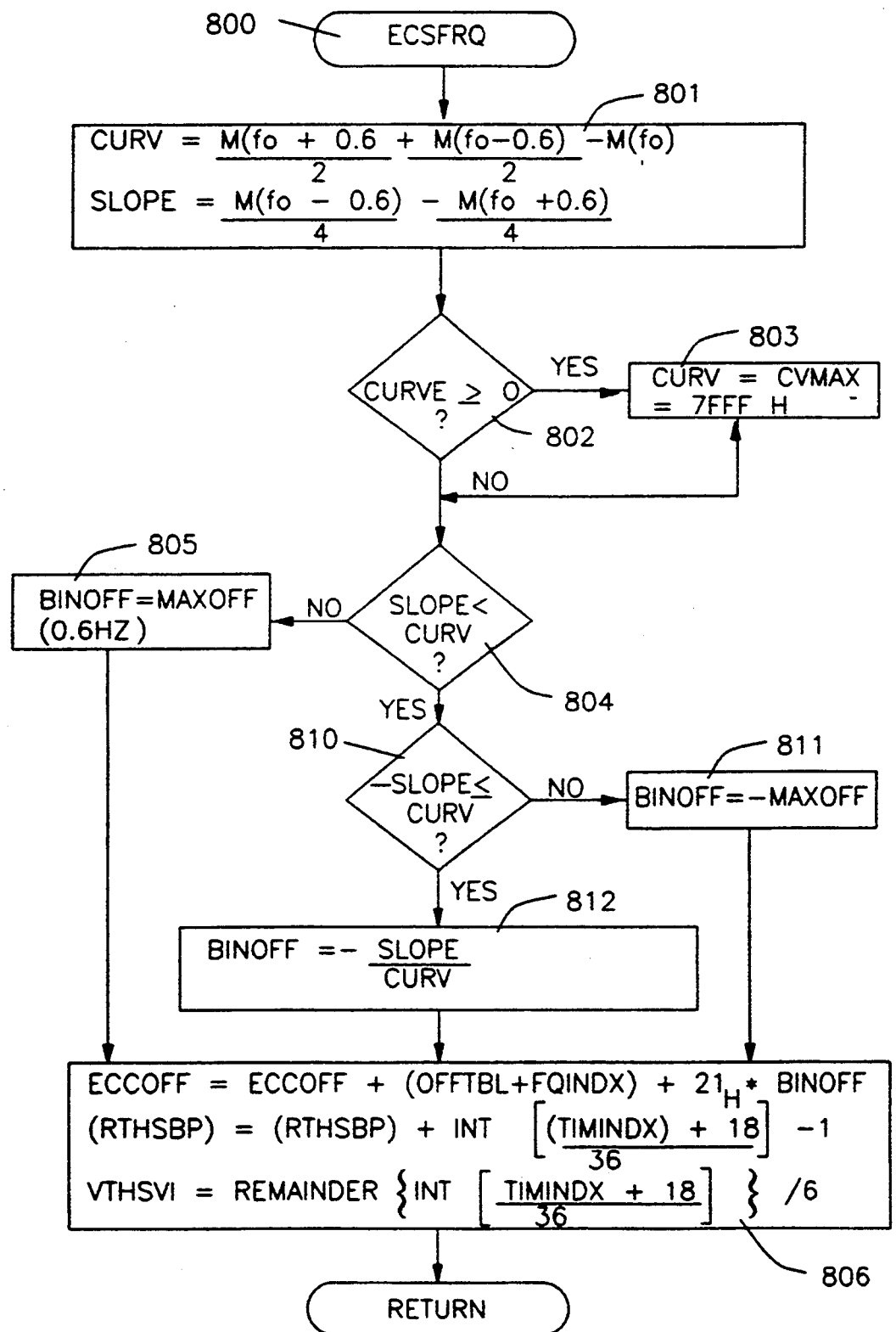
FIG. 33 is a flow chart depicting the subroutine ECSFRQ for computing the final correction to the carrier frequency according to this invention.

Referring to FIG. 32, there is shown a graph which shows the integrated square at MAXTM which basically shows the frequency at MAXJFQ and the optimum frequency which is the frequency basically that the phase lock loop will operate with during frequency interpolation. Referring to FIG. 33, there is shown a flow diagram of the frequency interpolation routine, ECSFRQ. Basically this subroutine executes after integration and search in the ECMACH state 56 which is depicted in FIG. 11D by module 358. The ECSFRQ routine executes frequency interpolation and computes the final correction to the carrier advance as indicated in FIGS. 32 and 33. The fine integration and search is restricted to $-2.1$ Hz$\leq$to $\leq 2.1$ Hz. The interpolator is restricted to F0$\pm$0.6 Hz as indicated in FIG. 33. Therefore the fine search corrects for offsets of $\pm[2.1+0.6]=\pm 2.7$ Hz with an error less than $\pm 0.5$ Hz.

As one can ascertain from FIG. 33, ESFRQ depicted by module 800 enters into module 801 where the slope and frequency CURV are computed. The terms computed are then applied to module 802 which is the decision module which determines whether CURV is greater than or equal to zero. If it is then CURV is set in module 803 to CVMAX which is maximum frequency. If it is not, then module 804 is accessed where the slope is measured to see whether or not it is less than CURV. If it is not less than CURV then 805 is accessed where the offsets are now changed and from 805 one goes to module 806 where ECCOF, which is the frequency offset, is computed according to the algorithm.

If the CURV is greater than the slope, then one enters decision module 810 where the negative slope is again compared with CURV. If CURV is equal to or greater than the negative slope then one defines the new BINOFF threshold which is equal to the ratio defined in module 812. If it is not, then the threshold is equal to the negative maximum offset as indicated by module 811 which again enters module 806 to compute ECCOFF which is shown in FIG. 10 as one input to the adder 258 and which essentially operates to control the adder 257 associated with the remote echo phase lock loop to develop the CANG signal.

Basically, the above described echo canceler operates both in the hardware and software environment and the echo canceler state machine processor implements most of the above-described programs which can be implemented in separate digital signal processors as DSP1 and DSP2 described in the above-noted U.S. Pat. No. 5,005,168. The state machine scans a list of events which are obtained from the IOP processor 25 or locally and used in the echo canceler system and modem subsystems. For each event there is a list of action routines which the echo canceler subsystem executes during the current data frame. As indicated herein, the various signals and so on have been processed according to these subroutines. It is noted that the same routines are operated on and by both the remote and local echo cancelers until both remote and local echo cancellation occurs.

What is claimed is:

1. In a modem system for receiving and transmitting data over a communications path, said path having a calculated delay between a local end at which said modem is located and a remote end to provide a delay between transmitted and received data which path may undesirably provide remote and local echo disturbances, which disturbances interfere with reliable data transmission and reception, in combination therewith an echo canceling apparatus comprising:

local echo canceling means including a tapped delay line having a plurality of adjustable taps said tapped delay line adapted to receive data signal to be transmitted;

means responsive to said calculated delay for generating a series of tap coefficients for said delay line and according to the data signal to be transmitted to provide a series of values indicative of said local echo delay of said path and operative to vary the tap coefficients of said line according to said local echo, and means responsive to said signals at said taps as varied to provide a local echo delayed signal;

means for combining said local echo delayed signal and a received signal to cancel said local echo signal from said received signal according to said local echo delayed signal at an output of said local echo canceling means;

remote echo canceling means coupled to said output of said local echo canceling means for receiving said local echo canceled signal which signal contains remote echo signals not canceled by said local echo canceling means and including a remote canceler tapped delay line for receiving said local echo canceled received signal and means responsive to said local echo canceled signal to generate a series of new values from both prior transmitted stored data symbols and said local echo canceled signal and operative to vary said tap delays of said remote echo canceler delay line in accordance with said new values to provide an output remote cancellation signal for remote echo cancellation;

phase lock loop means, including means responsive to said local echo delayed signal to provide a phase locked carrier frequency output according to a transmitted carrier signal for application to said remote echo canceling means; and means responsive to said local echo canceled signal and said output remote cancellation signal to provide an output received signal having both the remote and local echo substantially canceled therefrom.

2. The apparatus according to claim 1 wherein said tapped delay lines are transversal filters.

3. The apparatus according to claim 1 wherein said modem system is capable of transmitting and receiving data at different bit rates and wherein said transmitted and received data are modulated on a desired carrier frequency.

4. The apparatus according to claim 1 wherein said data signal to be transmitted is a multibit data signal.

5. The apparatus according to claim 4 wherein said modem converts said multibit signal into a phase shift and amplitude signal.

6. The apparatus according to claim 1 wherein said remote echo canceling means includes buffer means responsive to said transmitted data to store a series of phase angles indicative of said prior stored transmitted data signals.

7. The apparatus according to claim 1 wherein said means responsive to said calculated delay includes means for providing the dot products of said local echo canceler tapped delay line with local vectors derived from said data transmitted.

8. The apparatus according to claim 1 wherein said local echo canceled signal at said output of said local echo canceling means contains residuals due to remote echo disturbances.

9. The apparatus according to claim 8 wherein said means responsive to said local echo canceling means includes means responsive to said residuals to provide tap update information for said tapped delay line in said remote echo canceling means.

10. The apparatus according to claim 9 wherein said delay line in said local echo canceling means has more taps than said delay line in said remote echo canceling means.

11. The apparatus according to claim 10 wherein said local echo canceler delay line has 108 taps as opposed to 72 taps in said remote echo canceler.

12. The apparatus according to claim 1 wherein said local echo canceling means provides a first set of vectors indicative of said series of values, and means for rotating said vectors to compensate for frequency offset.

13. The apparatus according to claim 12 wherein said remote echo canceling means provides a second set of vectors indicative of said series of values and means for rotating said second set of vectors according to said frequency output from said phase lock loop.

14. Echo cancellation apparatus for use with a communications system such as a modem for receiving and transmitting digital data modulated on a given carrier frequency at any one of a given number of rates over a communications path, said path having a calculated delay between a local end at which said modem is located and a remote end to provide a delay between transmitted and received data, which path may undesirably provide remote and local echo disturbances, which disturbances interfere with reliable data transmission, comprising:

complex generator means responsive to digital data to be transmitted for converting said data into angle modulated outputs each having an X and Y coordinate;

history buffer means responsive to said angle modulated outputs for storing predetermined angle modulated outputs from said generator means indicative of prior transmitted digital data;

modulator means coupled to said generator means and adapted to receive said angle modulated outputs to provide at an output spun modulation signals which are rotated by said given carrier frequency, to provide vector values indicative of said spun signals;

vector buffer means coupled to said modulator means for storing said vector values;

receive storage means responsive to received digital data for storing said received digital data;

local echo canceler means coupled to said receive storage means and to said vector buffer means, said local echo canceler means including a first transversal filter having a first plurality of adjustable taps, means responsive to said stored vector values for providing coefficient values for each tap of said filter, and including means responsive to said values for adjusting each tap to provide at an output a local echo estimate signal;

adder means for adding said local estimate signal to said stored received digital data to provide an output received signal having local echo cancellation, said output signal including residuals due to said remote echo;

remote echo canceler means coupled to said adder means and said display buffer means, said remote echo canceler means including a second transversal filter having a second plurality of adjustable taps;

phase lock loop means responsive to said local echo canceler output signal to provide a locked carrier frequency signal according to said residual signals in said local echo canceler output signal, means responsive to said locked carrier signal and said stored angle modulated outputs to provide spun vector output values used for updating said remote canceler taps, means responsive to said updated remote taps to provide a remote echo cancellation signal; and output means responsive to said remote cancellation signal and said local echo canceler output signal to provide a final output signal having local and remote echo cancellations.

15. The apparatus according to claim 14 wherein said means responsive to digital data includes a complex impulse generator adapted to receive multibit signal of digital data at an input for providing a predetermined angle and magnitude output at an output, which angle output is different for each multibit, and where magnitudes of various multibit bauds may differ.

16. The apparatus according to claim 14 wherein said first and second transversal filters are tapped delay lines, with said first plurality of adjustable taps being greater than said second plurality of adjustable taps.

17. The apparatus according to claim 16 wherein said remote echo canceler includes 72 taps with said local echo including 108 taps.

18. The apparatus according to claim 16 further including means responsive to said output received signal for calculating the residual energy of signals in said local echo signal and means responsive to said value of residual energy for providing said predetermined threshold indicative of censored taps.

19. The apparatus according to claim 18 means responsive to censored taps to determine whether any censored taps exceed said given threshold to enable a censored tap to be admitted for tap variation during echo cancellation.

20. The apparatus according to claim 18 wherein said threshold is proportional to the square root of said residual energy during said canceler training.

21. The apparatus according to claim 20 including integrating means for integrating said calculated residual energy over a given number of data flames to provide said threshold.

22. The apparatus according to claim 14 wherein said history buffer means stores at least six modulation phase shifts, an initial modulation angle and a control bit.

23. The apparatus according to claim 14 wherein said given carrier frequency is 1800 Hz.

24. The apparatus according to claim 23 wherein said given rates of digital data are 2400 bps, 4800 bps or greater.

25. The apparatus according to claim 14 further including:

quadrature echo canceler means responsive to said spun modulation signals to provide at outputs in phase and quadrature coordinates of said signals for storage in said vector buffer means, said quadrature signals being correlated with the local echo canceler residuals to provide a phase measurement for the remote canceler, carrier phase lock loop.

26. The apparatus according to claim 14 including means coupled to said local echo canceler means for training said local echo canceler by updating said taps according to the dot product of said local echo canceler taps and said vectors stored in said vector buffer means.

27. The apparatus according to claim 21 including training means coupled to said remote echo canceler means for training said remote echo canceler means according to residuals formed in training said local echo canceler means.

28. The apparatus according to claim 14 including output storage means located in said local echo canceling means for storing data samples having local echo cancellation applied thereto.

29. The apparatus according to claim 14 further including:

tap censoring means responsive to said adjusted tap values in said local and remote canceler means to eliminate taps whose adjusted value does not vary beyond a predetermined threshold for a given number of frames of data, whereby eliminated taps are not updated during canceler operation.

30. A method of providing echo cancellation in a communications system employing a transmitter for transmitting digital data modulated at a given carrier frequency via said path from a local to a remote end and a receiver for receiving digital data from said remote end via said path, said path providing a delay between said transmitted and received data which undesirably provides both a local and remote echo, which echoes interfere with reliable data transmission and reception, comprising the steps of:

- measuring the round trip delay of data transmitted from said local end to said remote end and back for said carrier frequency;
- storing a set of vectors indicative of data previously transmitted, at said given carrier frequency;
- storing a set of delayed data samples to be transmitted;
- adjusting taps on a first delay line according to said round trip delay and said stored vectors;
- applying said delayed stored samples to said first delay line to provide delayed samples according to said tap values indicative of a local echo;
- removing said local echo from said delayed samples to provide a signal with local echo removed;
- correlating said stored vectors with said delayed samples to obtain a set of complex correlations displaced in time;
- spinning said set of complex correlations at at least one selected frequency value;
- taking the sum of in-phase and quadrature correlations from said spun correlations and squaring and summing these components to obtain a magnitude squares function for locating a maximum energy; and then
- generating a new carrier frequency offset from said given carrier frequency, by a new estimated round trip delay according to located said maximum energy sum;
- storing a new set of vectors for said offset carrier frequency;
- adjusting taps on a second delay line according to said new estimated round trip delay and said new set of vectors to provide a remote echo signal; and
- removing said remote echo signal from said signal with local echo removed to obtain an output signal with both said remote and local echoes removed.

31. The method according to claim 30 wherein said step of spinning said frequency value is selected from ±5 Hz, ±1.67 Hz, ±2.7 Hz, ±2.1 Hz, ±1.5 Hz, ±0.9 Hz and ±0.3 Hz.

32. The method according to claim 30 wherein the step of generating a new carrier frequency includes the step of interpolating magnitude squares of said in-phase and quadrature components over frequencies bordering the maximum integrated magnitude squares point in time and frequency to obtain an offset accurate to ±0.05 Hz.

33. The method according to claim 30 wherein the step of spinning includes spinning said set of complex correlations at each one of a set of specified frequencies.

34. The method according to claim 30 wherein the step of correlation includes correlating said stored vectors with said plurality of different delayed samples at time positions each spaced from one another by a given interval.

35. The method according to claim 34 wherein as said plurality of time position increases the frequency error difference decreases.

36. In a modem system for receiving and transmitting data over a communicatin path, said path having a calculated delay between a local end at which said modem is located and a remote end to provide a delay between transmitted and received data which path may undesirably provide remote and local echo disturbances, which disturbances interfere with reliable data transmission and reception, in combination therewith an echo canceling apparatus comprising:

- local echo canceling means including a tapped delay line having a plurality of adjustable taps said tapped delay line adapted to receive data signal to be transmitted,
- means responsive to said calculated delay for generating a series of tap coefficients for said delay line and according to the data signal to be transmitted to provide a series of values indicative of said local echo delay of said path and operative to vary the tap coefficients of said line according to said local echo, and means responsive to said signals at said taps as varied to provide a local echo delayed signal,
- means for combining said local echo delayed signal and a received signal to cancel said local echo signal from said received signal according to said local echo delayed signal at an output of said local echo canceling means,
- remote echo canceling means coupled to said output of said local echo canceling means for receiving said local echo canceled signal which signal contains remote echo signals not canceled by said local canceler means and including a remote canceler tapped delay line for receiving said local echo canceled received signal and means responsive to said local echo canceled signal to generate a series of new values from both prior transmitted stored data symbols and said local echo canceled signal and operative to vary said tap delays of said remote echo canceler delay line in accordance with said new values to provide an output remote cancellation signal for remote echo cancellation, further including buffer means responsive to said transmitted data to store a series of phase angles indicative of said prior stored transmitted data signals, and
- means responsive to said local echo canceled signal and said output remote cancellation signal to provide an output received signal having both the remote and local echo substantially canceled therefrom.

37. In a modem system for receiving and transmitting data over a communications path, said path having a calculated delay between a local end at which said modem is located and a remote end to provide a delay between transmitted and received data which path may undesirably provide remote and local echo disturbances, which disturbances interfere with reliable data transmission and reception, in combination therewith an echo canceling apparatus comprising:

- local echo canceling means including a tapped delay line having a plurality of adjustable taps said tapped delay line adapted to receive data signal to be transmitted,
- means responsive to said calculated delay for generating a series of tap coefficients for said delay line and according to the data signal to be transmitted to provide a series of values indicative of said local echo delay of said path and operative to vary the tap coefficients of said line according to said local echo, and means responsive to said signals at said taps as varied to provide a local echo delayed signal, including means for providing the dot products of said local echo canceler tapped delay line taps with local vectors derived from said data transmitted, means for combining said local echo delayed signal and a received signal to cancel said local echo signal from said received signal according to said local echo delayed signal at an output of said local echo canceling means, remote echo canceling means coupled to said output of said local echo canceling means for receiving said local echo canceled signal which signal contains remote echo signals not canceled by said local canceler means and including a remote canceler tapped delay line for receiving said local echo canceled received signal and means responsive to said local echo canceled signal to generate a series of new values from both prior transmitted stored data symbols and said local echo canceled signal and operative to vary said tap delays of said remote echo canceler delay line in accordance with said new values to provide an output remote cancellation signal for remote echo cancellation, and means responsive to said local echo canceled signal and said output remote cancellation signal to provide an output received signal having both the remote and local echo substantially canceled therefrom.

38. In a modem system for receiving and transmitting data over a communications path, said path having a calculated delay between a local end at which said modem is located and a remote end to provide a delay between transmitted and received data which path may undesirably provide remote and local echo disturbances, which disturbances interfere with reliable data transmission and reception, in combination therewith an echo canceling apparatus comprising:

local echo canceling means including a tapped delay line having a plurality of adjustable taps said tapped delay line adapted to receive data signal to be transmitted, means responsive to said calculated delay for generating a series of tap coefficients for said delay line and according to the data signal to be transmitted to provide a series of values indicative of said local echo delay of said path and operative to vary the tap coefficients of said line according to said local echo, and means responsive to said signals at said taps as varied to provide a local echo delayed signal, means for combining said local echo delayed signal and a received signal to cancel said local echo signal from said received signal according to said local echo delayed signal at an output of said local echo canceling means, wherein said local echo canceled signal at said output of said local echo canceler means contains residuals due to remote echo disturbances, remote echo canceling means coupled to said output of said local echo canceling means for receiving said local echo canceled signal which signal contains remote echo signals not canceled by said local canceler means and including a remote canceler tapped delay line for receiving said local echo canceled received signal, wherein said delay line in said local echo canceler has more taps than said delay line in said remote echo canceler, and means responsive to said local echo canceled signal to generate a series of new values from both prior transmitted stored data symbols and said local echo canceled signal and operative to vary said tap delays of said remote echo canceler delay line in accordance with said new values to provide an output remote cancellation signal for remote echo cancellation, and wherein said means responsive to said local echo canceling means includes means responsive to said residuals to provide tap update information for said tapped delay line in said remote echo canceler, and means responsive to said local echo canceled signal and said output remote cancellation signal to provide an output received signal having both the remote and local echo substantially canceled therefrom.

39. The apparatus according to claim 38 wherein said local echo canceler delay line has 108 taps as opposed to 72 taps in said remote echo canceler.

40. In a modem system for receiving and transmitting data over a communications path, said path having a calculated delay between a local end at which said modem is located and a remote end to provide a delay between transmitted and received data which path may undesirably provide remote and local echo disturbances, which disturbances interfere with reliable data transmission and reception, in combination therewith an echo canceling apparatus comprising:

local echo canceling means including a tapped delay line having a plurality of adjustable taps said tapped delay line adapted to receive data signal to be transmitted, means responsive to said calculated delay for generating a series of tap coefficients for said delay line and according to the data signal to be transmitted to provide a series of values indicative of said local echo delay of said path and operative to vary the tap coefficients of said line according to said local echo, and means responsive to said signals at said taps as varied to provide a local echo delayed signal, and wherein said local echo canceling means provides a first set of vectors indicative of said series of values, and means for rotating said vectors to compensate for frequency offset, means for combining said local echo delayed signal and a received signal to cancel said local echo signal from said received signal according to said local echo delayed signal at an output of said local echo canceling means, remote echo canceling means coupled to said output of said local echo canceling means for receiving said local echo canceled signal which signal contains remote echo signals not canceled by said local canceler means and including a remote canceler tapped delay line for receiving said local echo canceled received signal and means responsive to said local echo canceled signal to generate a series of new values from both prior transmitted stored data symbols and said local echo canceled signal and operative to vary said tap delays of said remote echo canceler delay line in accordance with said new values to provide an output remote cancellation signal for remote echo cancellation, and means responsive to said local echo canceled signal and said output remote cancellation signal to provide an output received signal having both the remote and local echo substantially canceled therefrom.

41. The apparatus according to claim 40 wherein said remote echo canceling means provides a second set of vectors indicative of said series of values and means for rotating said second set of vectors according to said frequency output from said phase lock loop.

* * * * *